(12) United States Patent
Matsuo et al.

(10) Patent No.: US 10,663,704 B2
(45) Date of Patent: May 26, 2020

(54) ZOOM LENS, IMAGING DEVICE AND METHOD FOR MANUFACTURING THE ZOOM LENS

(71) Applicant: Nikon Corporation, Minato-ku, Tokyo (JP)

(72) Inventors: Taku Matsuo, Kawasaki (JP); Haruo Sato, Kawasaki (JP)

(73) Assignee: Nikon Corporation, Tokyo (JP)

( * ) Notice: Subject to any disclaimer, the term of this patent is extended or adjusted under 35 U.S.C. 154(b) by 88 days.

(21) Appl. No.: 15/256,740

(22) Filed: Sep. 6, 2016

(65) Prior Publication Data

US 2017/0068074 A1    Mar. 9, 2017

Related U.S. Application Data

(63) Continuation of application No. PCT/JP2015/001717, filed on Mar. 26, 2015.

(30) Foreign Application Priority Data

Mar. 27, 2014  (JP) .................................. 2014-067071
Mar. 27, 2014  (JP) .................................. 2014-067075

(Continued)

(51) Int. Cl.
*G02B 15/17*  (2006.01)
*G02B 15/14*  (2006.01)
(Continued)

(52) U.S. Cl.
CPC ............. *G02B 15/17* (2013.01); *G02B 5/005* (2013.01); *G02B 15/144109* (2019.08); *G02B 27/0025* (2013.01); *G02B 27/646* (2013.01)

(58) Field of Classification Search
CPC ...................... G02B 15/17; G02B 15/144109
(Continued)

(56) References Cited

U.S. PATENT DOCUMENTS 4,576,445 A    3/1986  Inadome
4,696,553 A    9/1987  Tsuji et al.
(Continued)

FOREIGN PATENT DOCUMENTS

JP    58-150926 A    9/1983
JP    59-219710 A   12/1984
(Continued)

OTHER PUBLICATIONS

Office Action dated Mar. 14, 2018, in Chinese Patent Application No. 201580016773.1
(Continued)

*Primary Examiner* — Zachary W Wilkes
(74) *Attorney, Agent, or Firm* — SGPatents PLLC

(57) ABSTRACT

The art has, disposed in order from an object, a first lens group (G1) having positive refractive power, a second lens group (G2) having negative refractive power, a third lens group (G3) having negative refractive power, and a fourth lens group (G4) having positive refractive power, in which zooming is made by varying an air distance between the first lens group (G1) and the second lens group (G2), and the following conditional expression (1) is satisfied:

$0.60 < f4/fw < 1.15$   (1)

where f4 denotes a focal distance of the fourth lens group (G4), and fw denotes a focal distance of a zoom lens in a wide-angle end state upon focusing on infinity.

22 Claims, 52 Drawing Sheets

(30) Foreign Application Priority Data

Mar. 27, 2014 (JP) ................................ 2014-067077
Mar. 27, 2014 (JP) ................................ 2014-067078

(51) Int. Cl.
G02B 27/64 (2006.01)
G02B 5/00 (2006.01)
G02B 27/00 (2006.01)

(58) Field of Classification Search
USPC ................................................. 359/688, 557
See application file for complete search history.

(56) References Cited

U.S. PATENT DOCUMENTS

| | | | |
|---|---|---|---|
| 4,824,226 A | 4/1989 | Tanaka | |
| 5,502,594 A * | 3/1996 | Suzuki | G02B 15/17 359/557 |
| 5,760,957 A | 6/1998 | Suzuki | |
| 6,002,527 A | 12/1999 | Ohtake | |
| 6,229,962 B1 | 5/2001 | Imamura | |
| 6,236,516 B1 | 5/2001 | Misaka | |
| 8,023,814 B2 * | 9/2011 | Uchida | G03B 17/14 359/688 |
| 8,031,409 B2 * | 10/2011 | Sato | G02B 13/24 359/676 |
| 8,472,123 B2 * | 6/2013 | Miyazaki | G02B 15/17 359/683 |
| 9,588,324 B2 * | 3/2017 | Takada | G02B 15/17 |
| 2005/0099699 A1 | 5/2005 | Nurishi | |
| 2010/0091173 A1 | 4/2010 | Miyazaki et al. | |
| 2010/0091174 A1 | 4/2010 | Miyazaki et al. | |
| 2010/0195207 A1 | 8/2010 | Uchida et al. | |
| 2011/0273780 A1 | 11/2011 | Hosoi et al. | |
| 2012/0162361 A1 | 6/2012 | Yoshinaga et al. | |
| 2013/0107089 A1 | 5/2013 | Hatada | |
| 2013/0222922 A1 | 8/2013 | Atsuumi et al. | |
| 2014/0029111 A1 | 1/2014 | Shibata | |
| 2015/0160444 A1 | 6/2015 | Koizumi et al. | |
| 2016/0216496 A1 * | 7/2016 | Shibayama | G02B 15/22 |

FOREIGN PATENT DOCUMENTS

| | | |
|---|---|---|
| JP | 59-219711 A | 12/1984 |
| JP | 63-044615 A | 2/1988 |
| JP | 63-049719 A | 3/1988 |
| JP | 63-278013 A | 11/1988 |
| JP | 63-298210 A | 12/1988 |
| JP | 07-27978 A | 1/1995 |
| JP | 2000-028923 A | 1/2000 |
| JP | 2000-121942 A | 4/2000 |
| JP | 2005-141056 A | 6/2005 |
| JP | 2009-251113 A | 10/2009 |
| JP | 2009-251118 A | 10/2009 |
| JP | 2010-175954 A | 8/2010 |
| JP | 2011-203293 A | 10/2011 |
| JP | 2011-203420 A | 10/2011 |
| JP | 2011-237588 A | 11/2011 |
| JP | 2012-141598 A | 7/2012 |
| JP | 2013-024936 A | 2/2013 |
| JP | 2013-097184 A | 5/2013 |
| JP | 2013-210398 A | 10/2013 |
| WO | WO 2011/099248 A1 | 8/2011 |
| WO | WO 2014/030304 A1 | 2/2014 |

OTHER PUBLICATIONS

Office Action dated Jan. 9, 2018, in Japanese Patent Application No. 2014-067077.
Office Action dated Jan. 9, 2018, in Japanese Patent Application No. 2014-067078.
Office Action dated Nov. 28, 2017, in Japanese Patent Application No. 2014-067071.
Office Action dated Nov. 21, 2017, in Japanese Patent Application No. 2014-067075.
International Preliminary Report on Patentability from International Patent Application No. PCT/JP2015/001717, dated Sep. 27, 2016.
International Search Report from International Patent Application No. PCT/JP2015/001717, dated Jun. 23, 2015.
Extended European Search Report dated Aug. 31, 2017, in European Patent Application No. 15769538.8.
Office Action dated Aug. 28, 2018, in Japanese Patent Application No. 2014-067075.
Decision of Refusal dated Oct. 16, 2018, in Japanese Patent Application No. 2014-067078.
Office Action dated Oct. 2, 2018, in Japanese Patent Application No. 2014-067077.
English translation of Office Action dated Mar. 14, 2018, in Chinese Patent Application No. 201580016773.1.
Office Action dated Nov. 13, 2018, in Chinese Patent Application No. 201580016773.1.
Examination Report dated Aug. 21, 2019, in Indian Patent Application No. 201617036766.

* cited by examiner

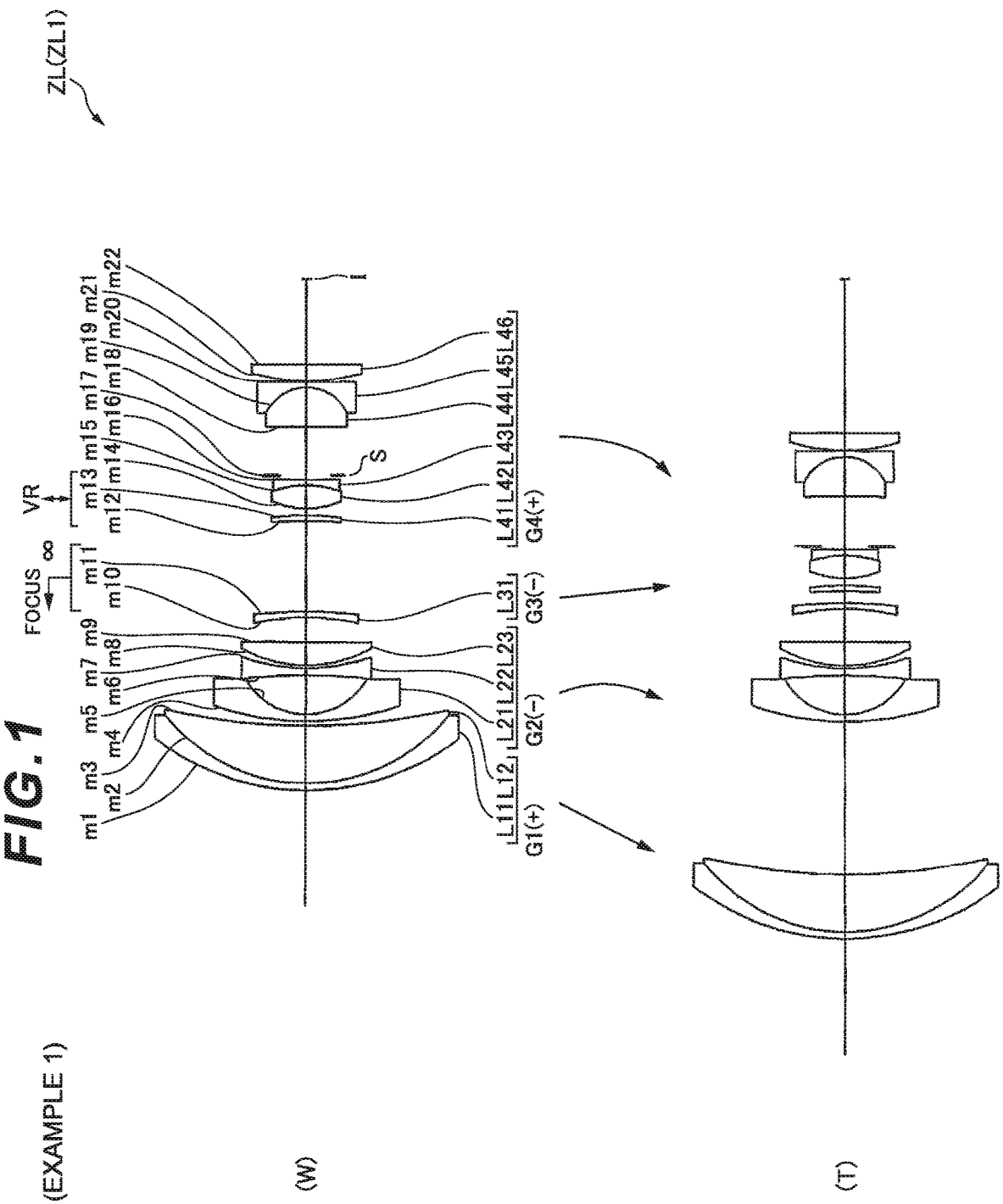

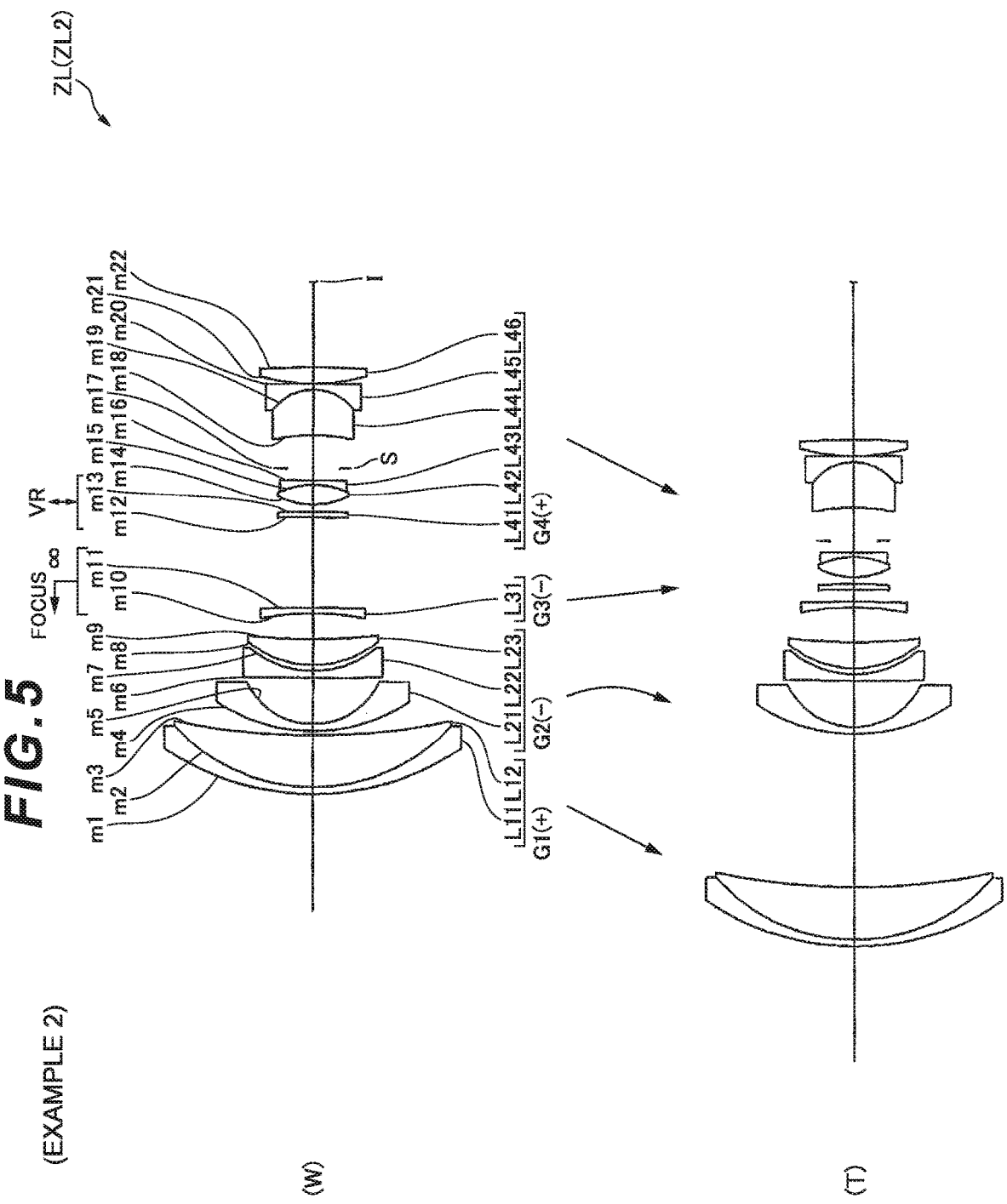

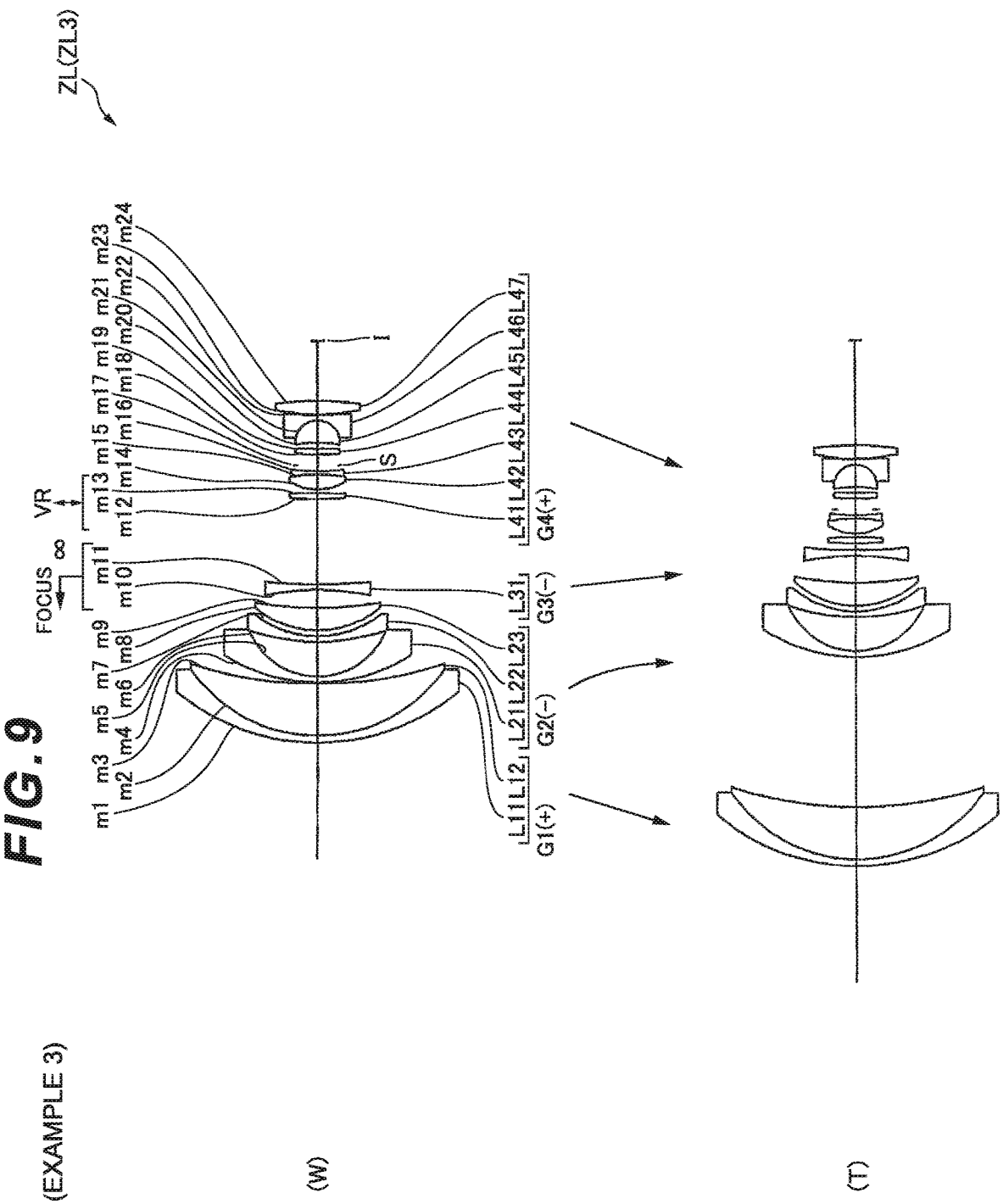

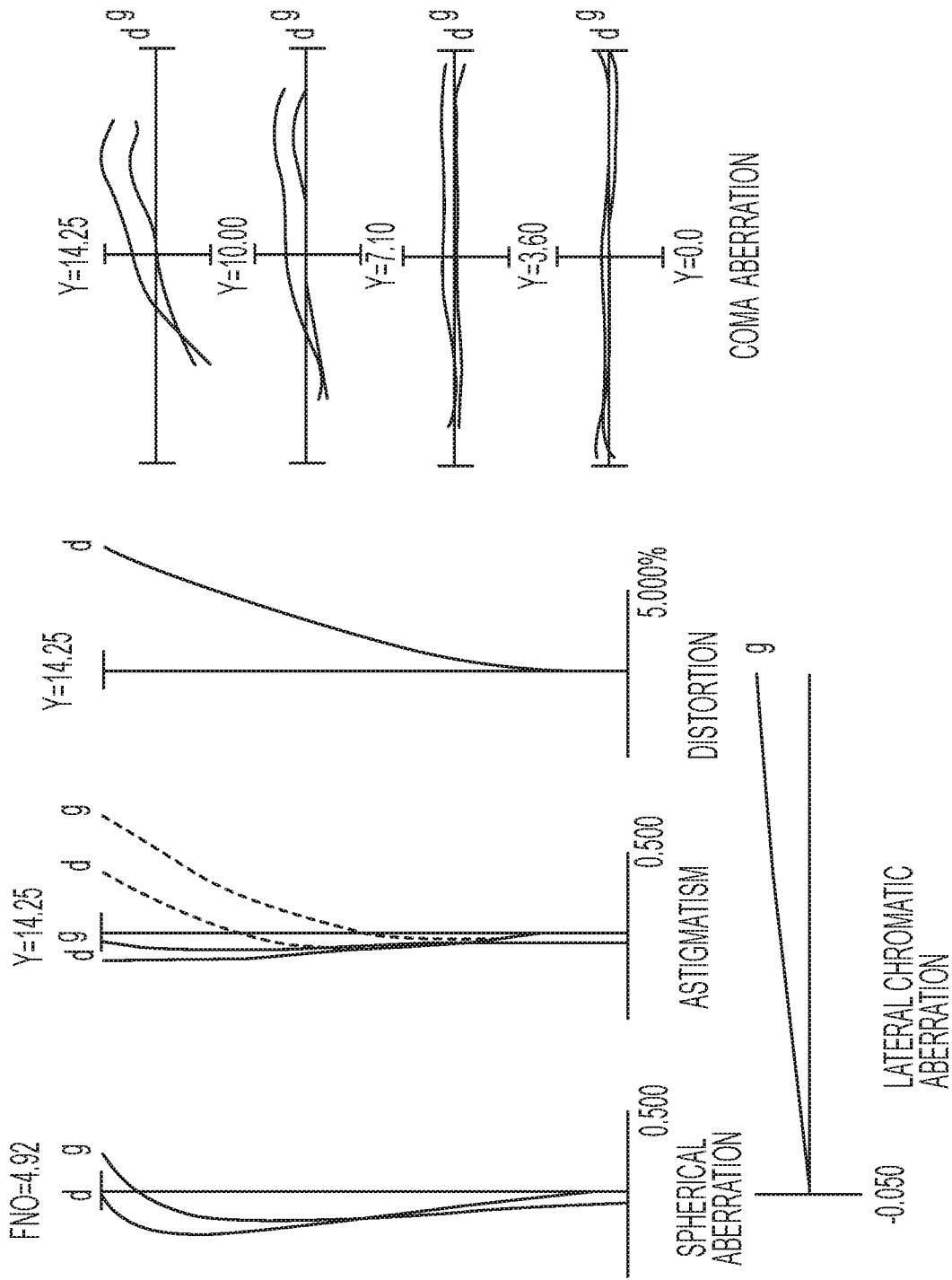

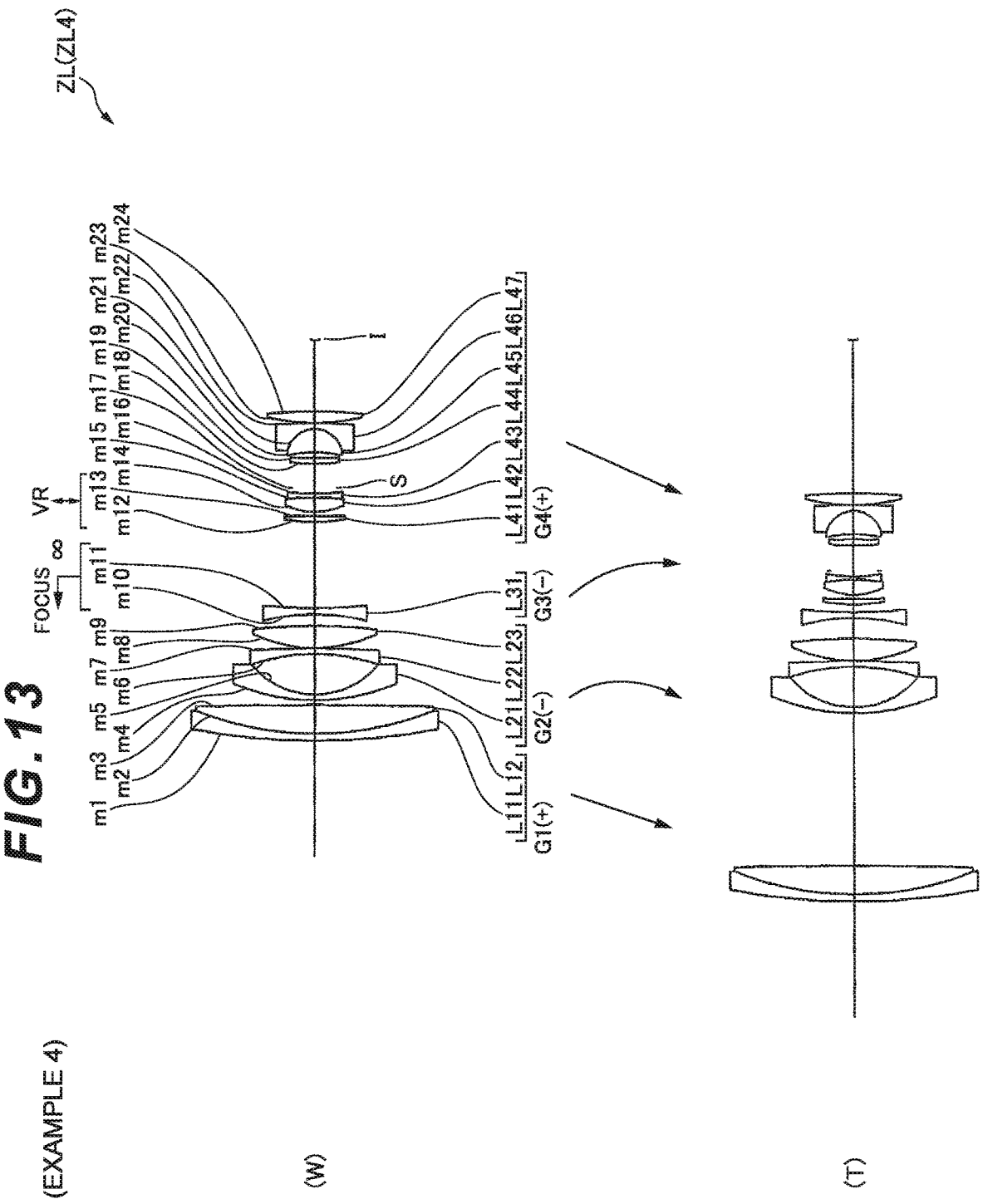

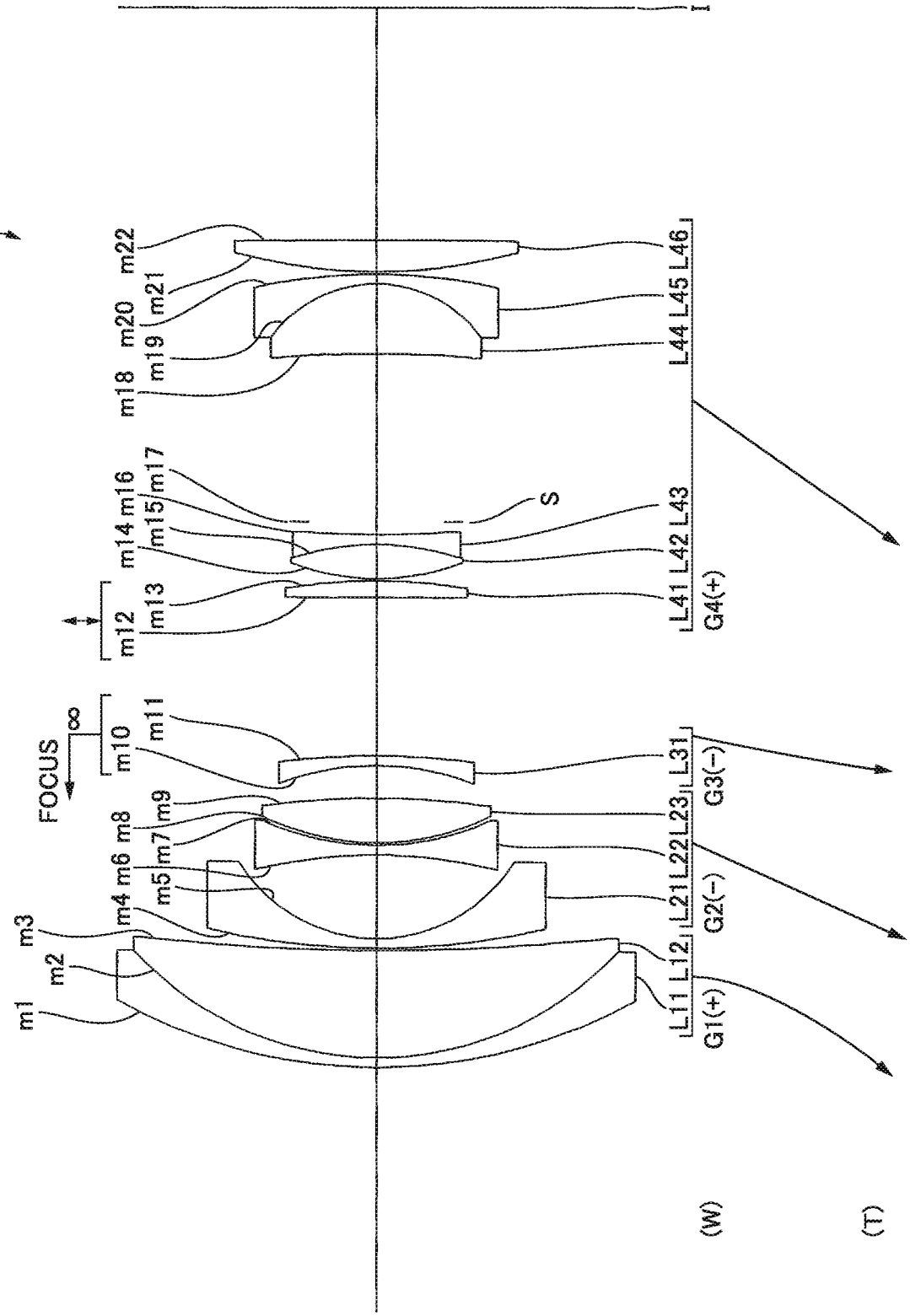

COMA ABERRATION

COMA ABERRATION

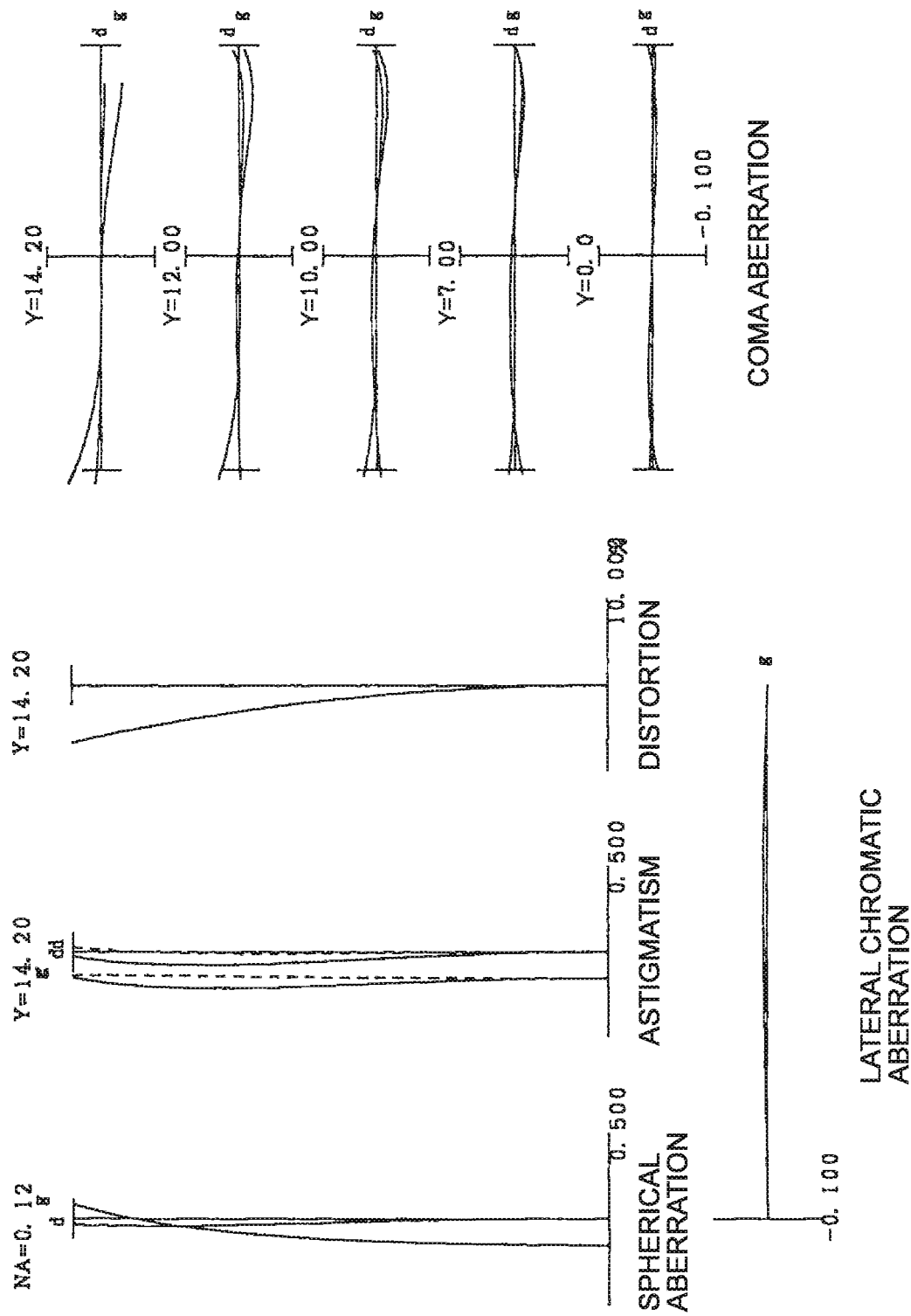

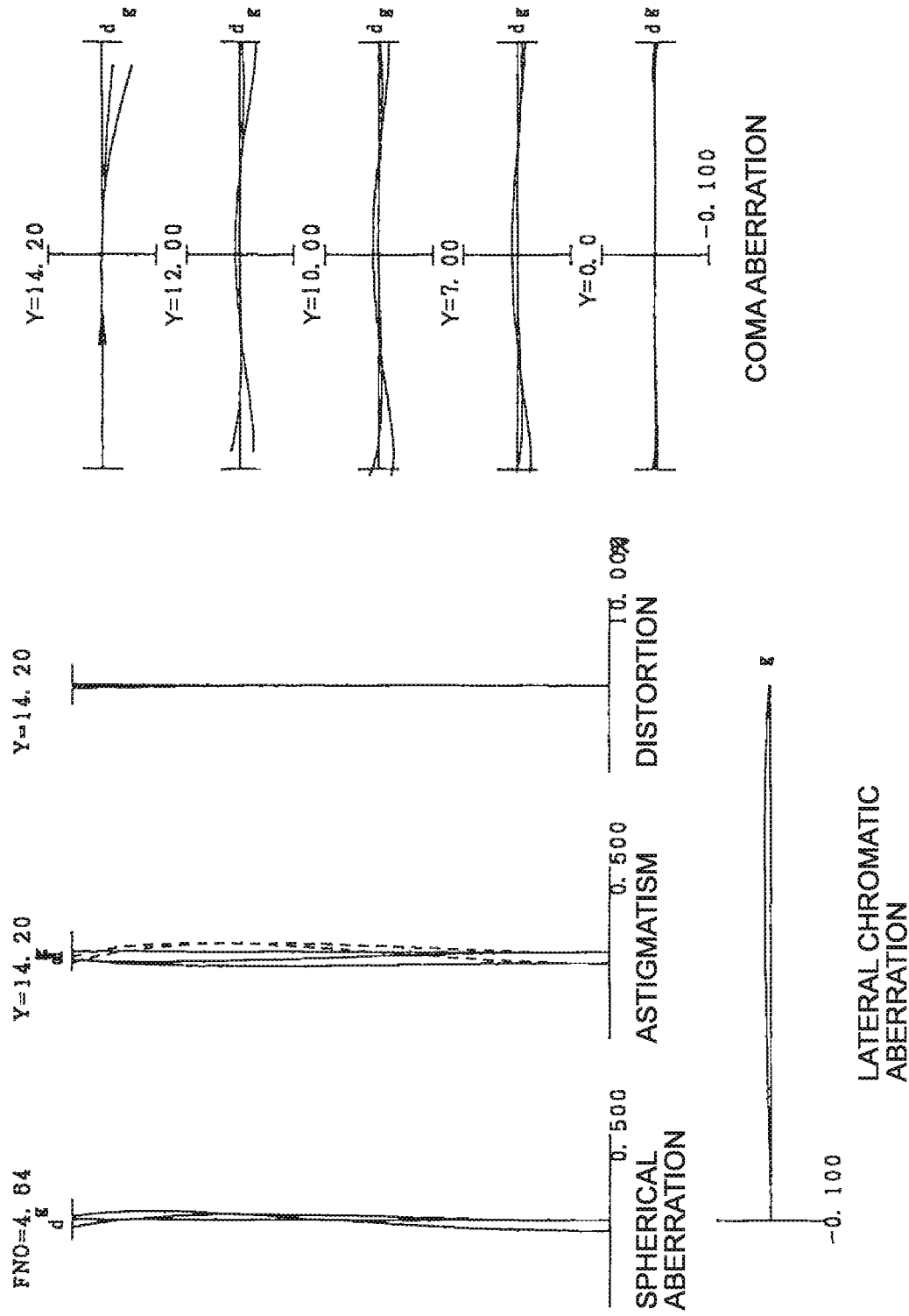

COMA ABERRATION

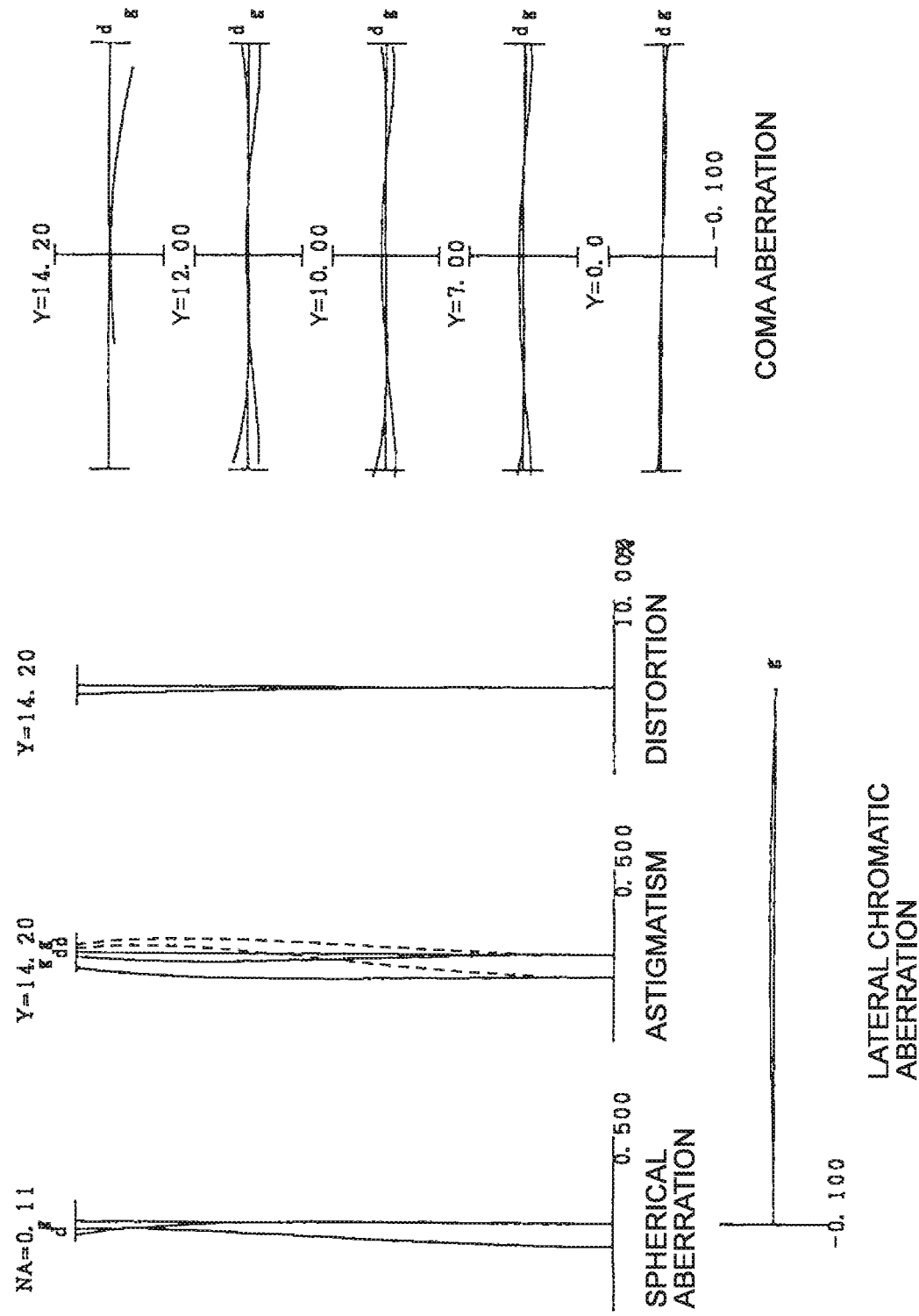

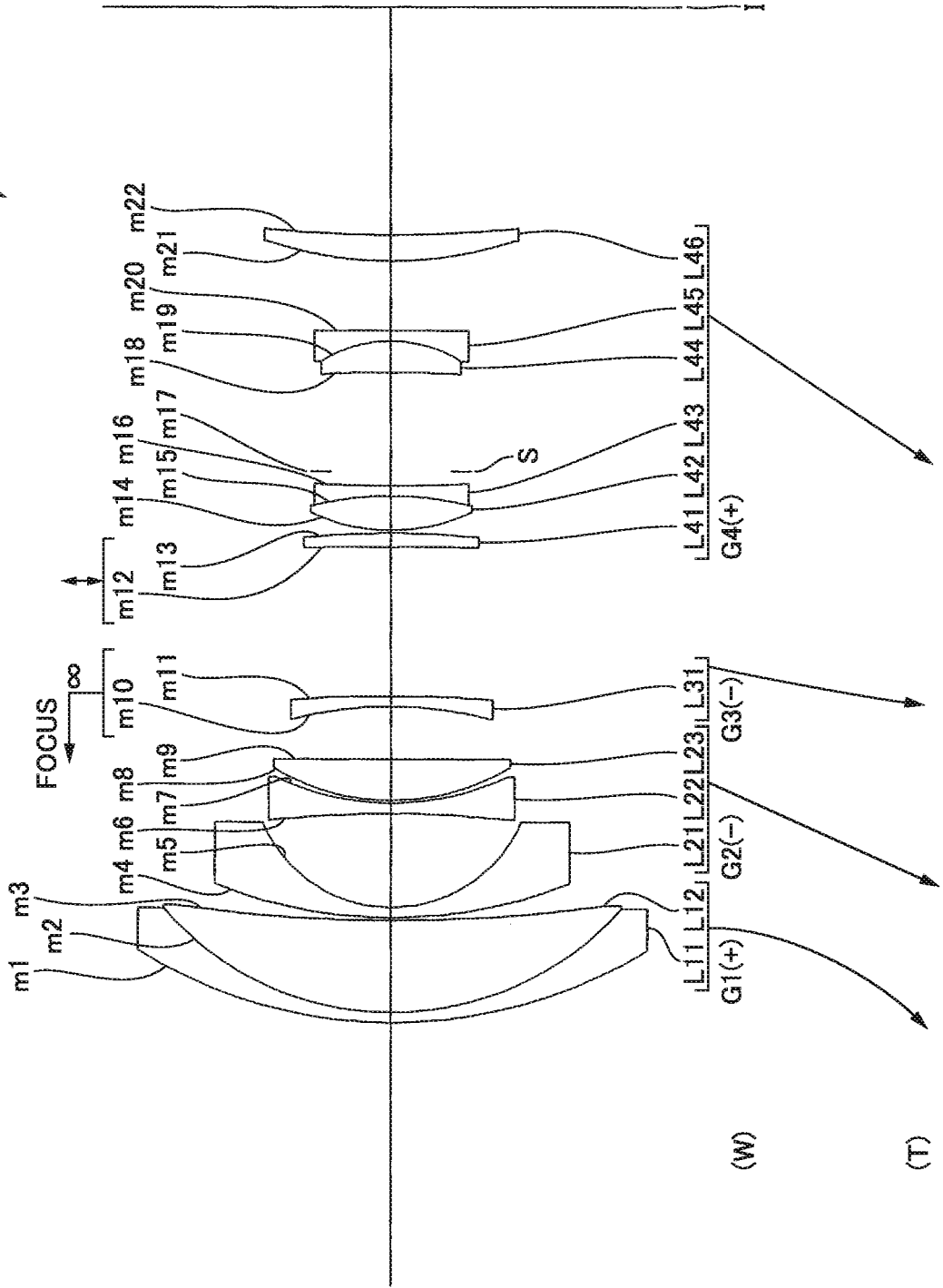

COMA ABERRATION

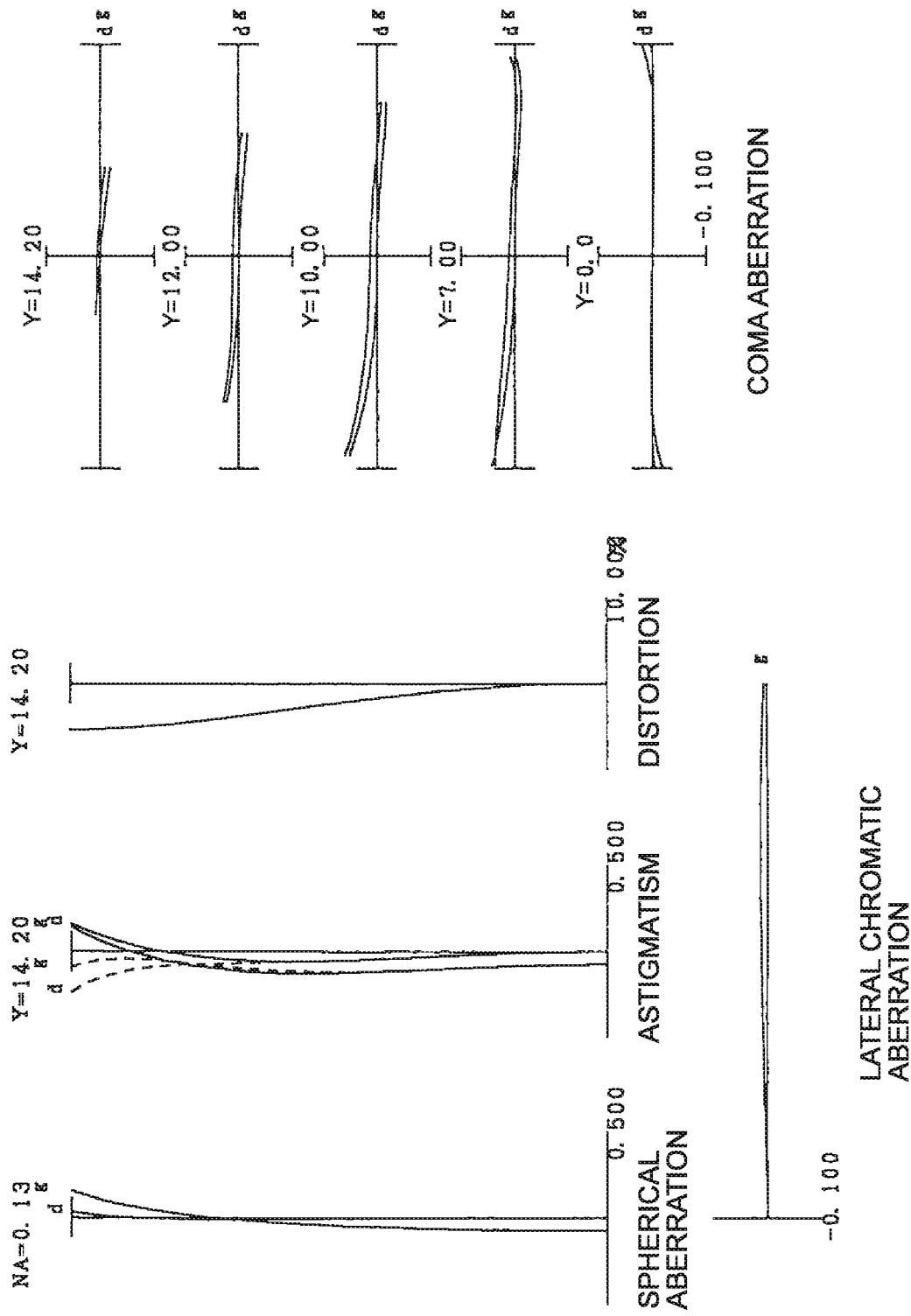

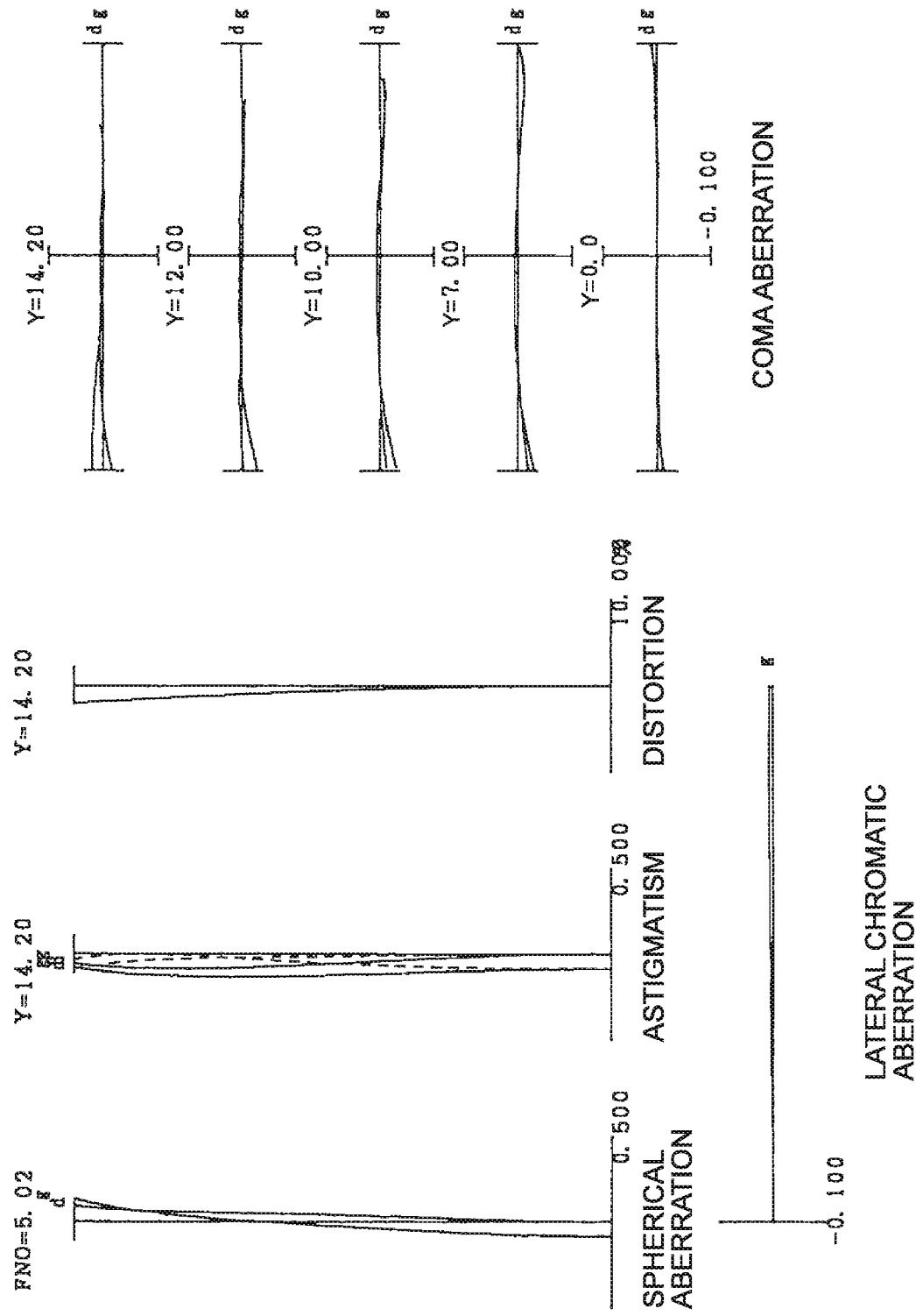

COMA ABERRATION

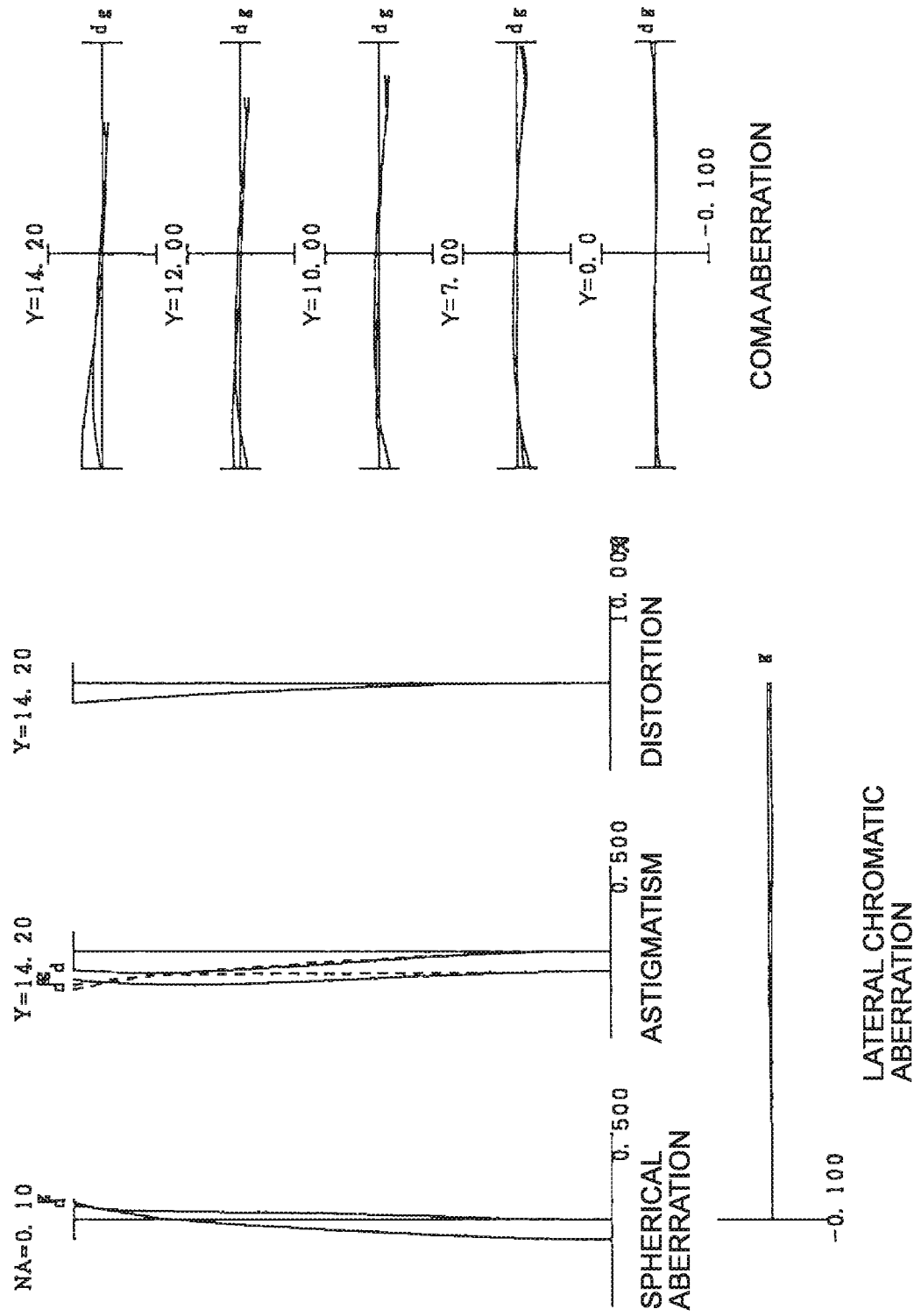

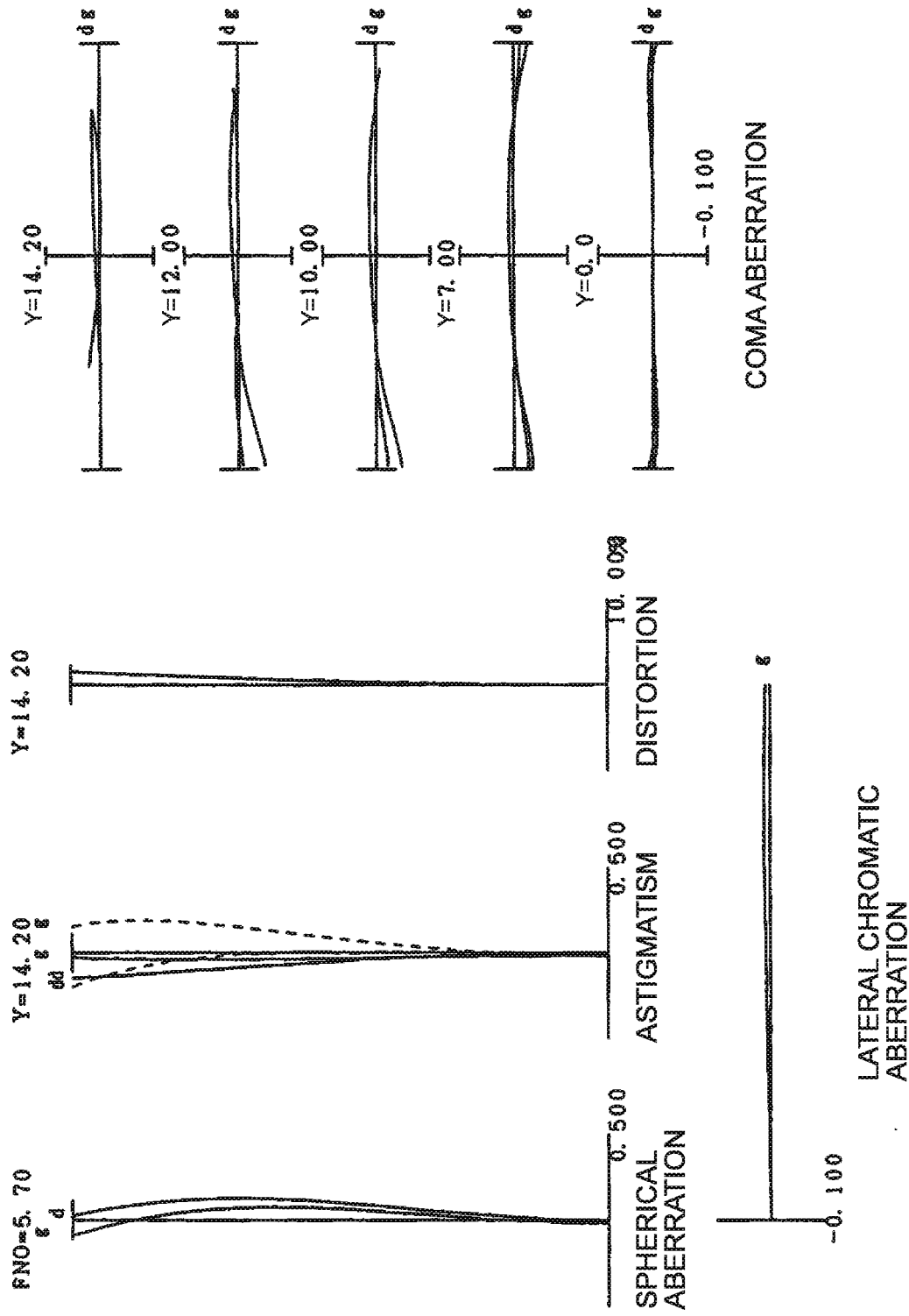

COMA ABERRATION

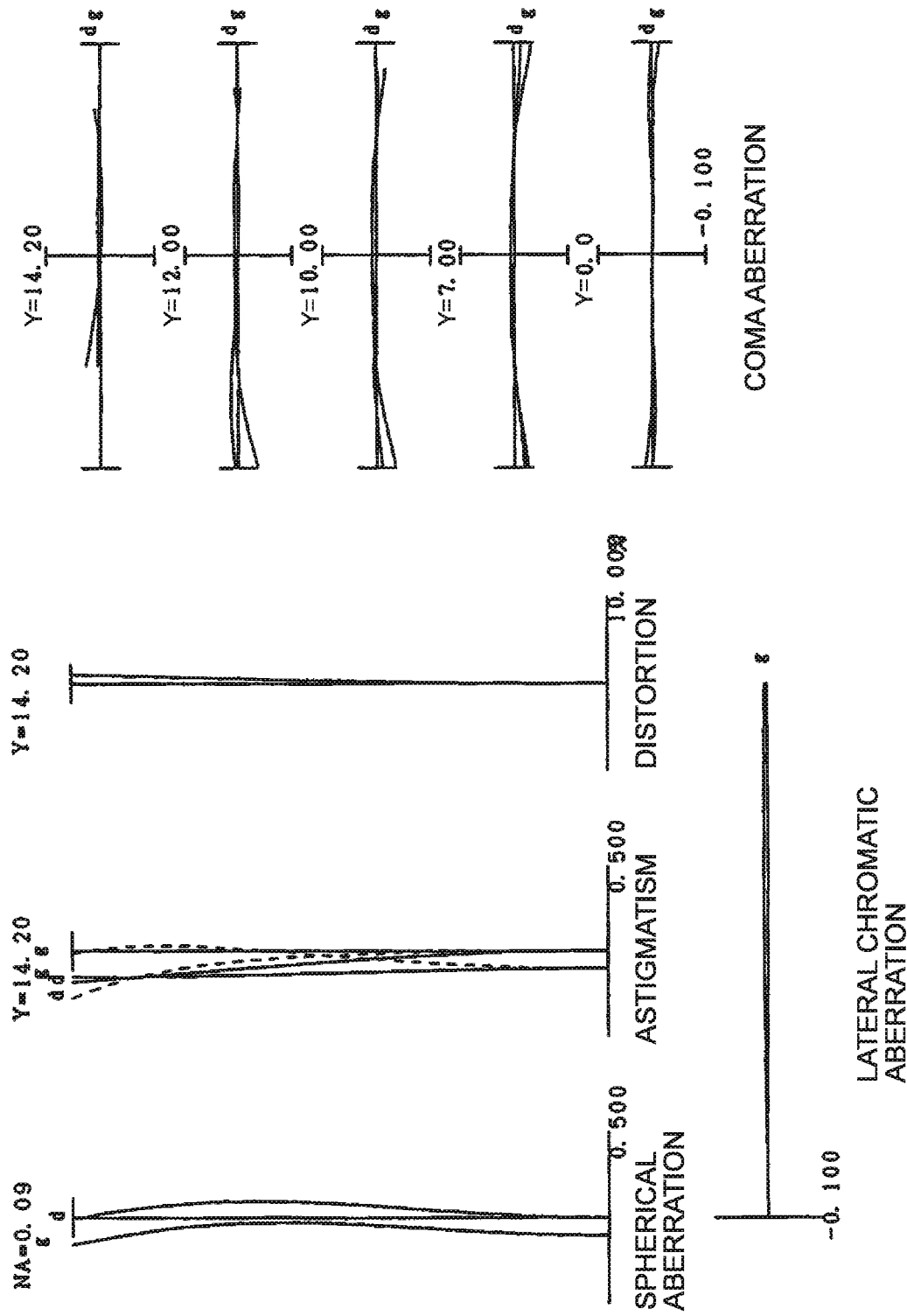

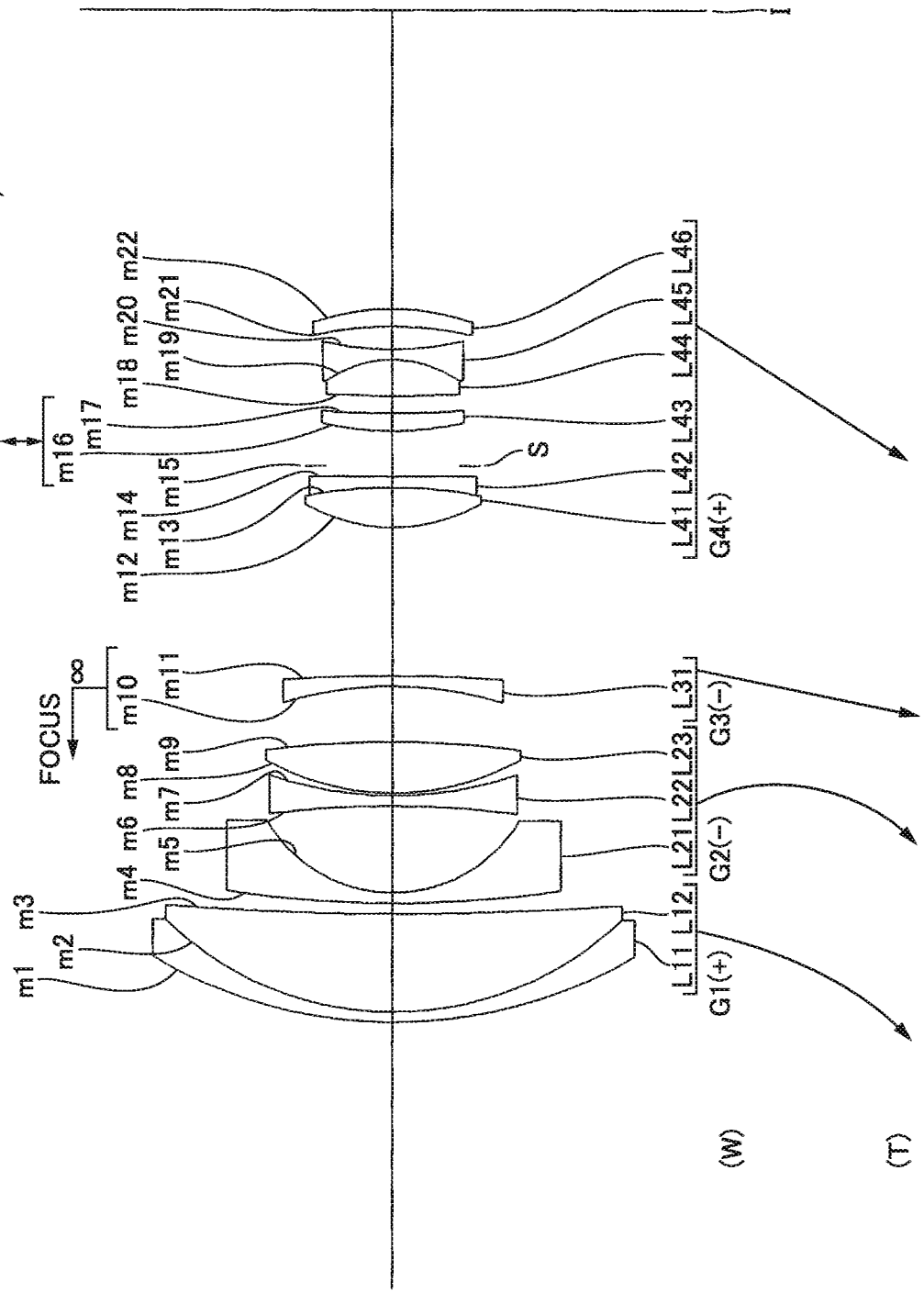

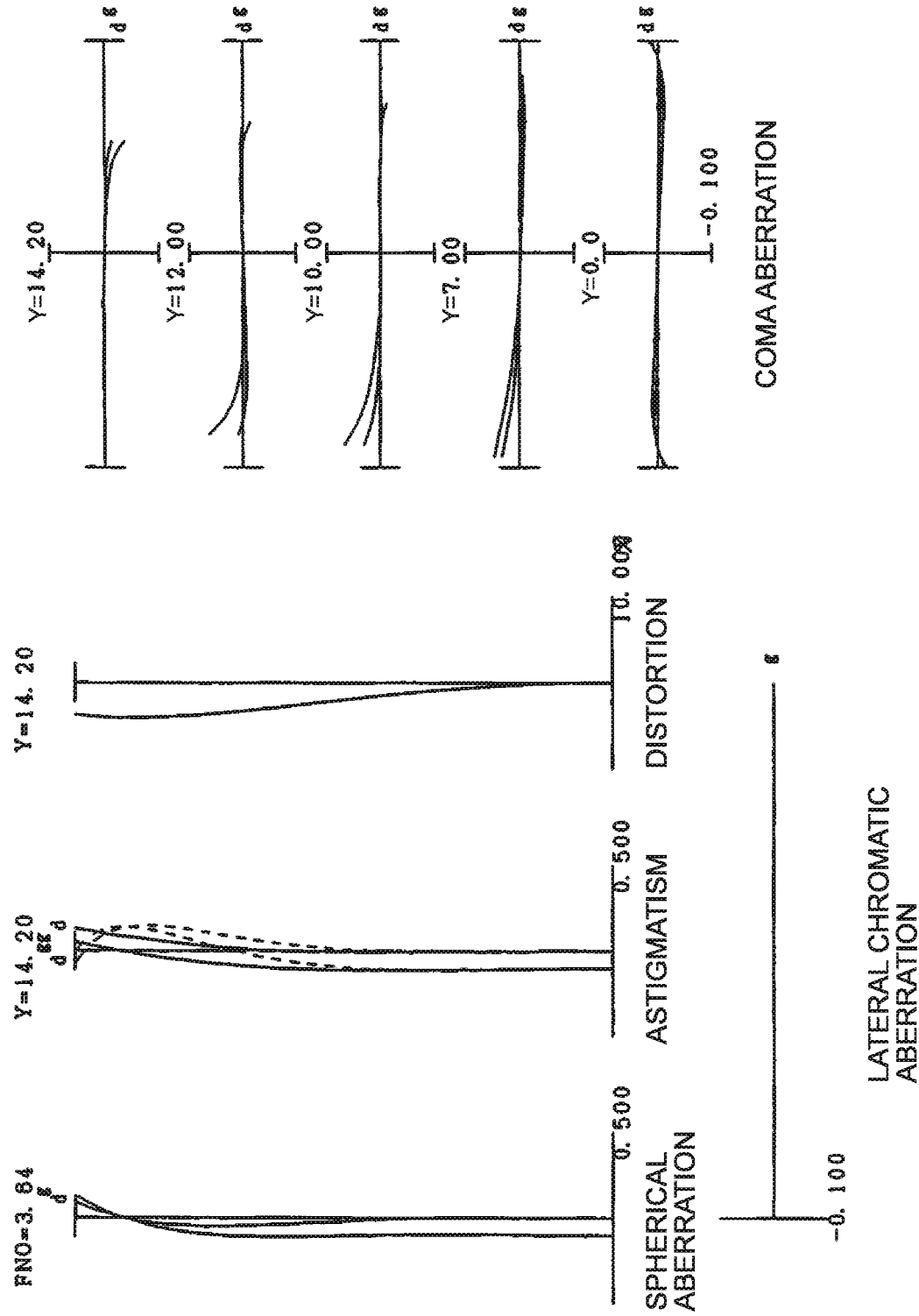

COMA ABERRATION

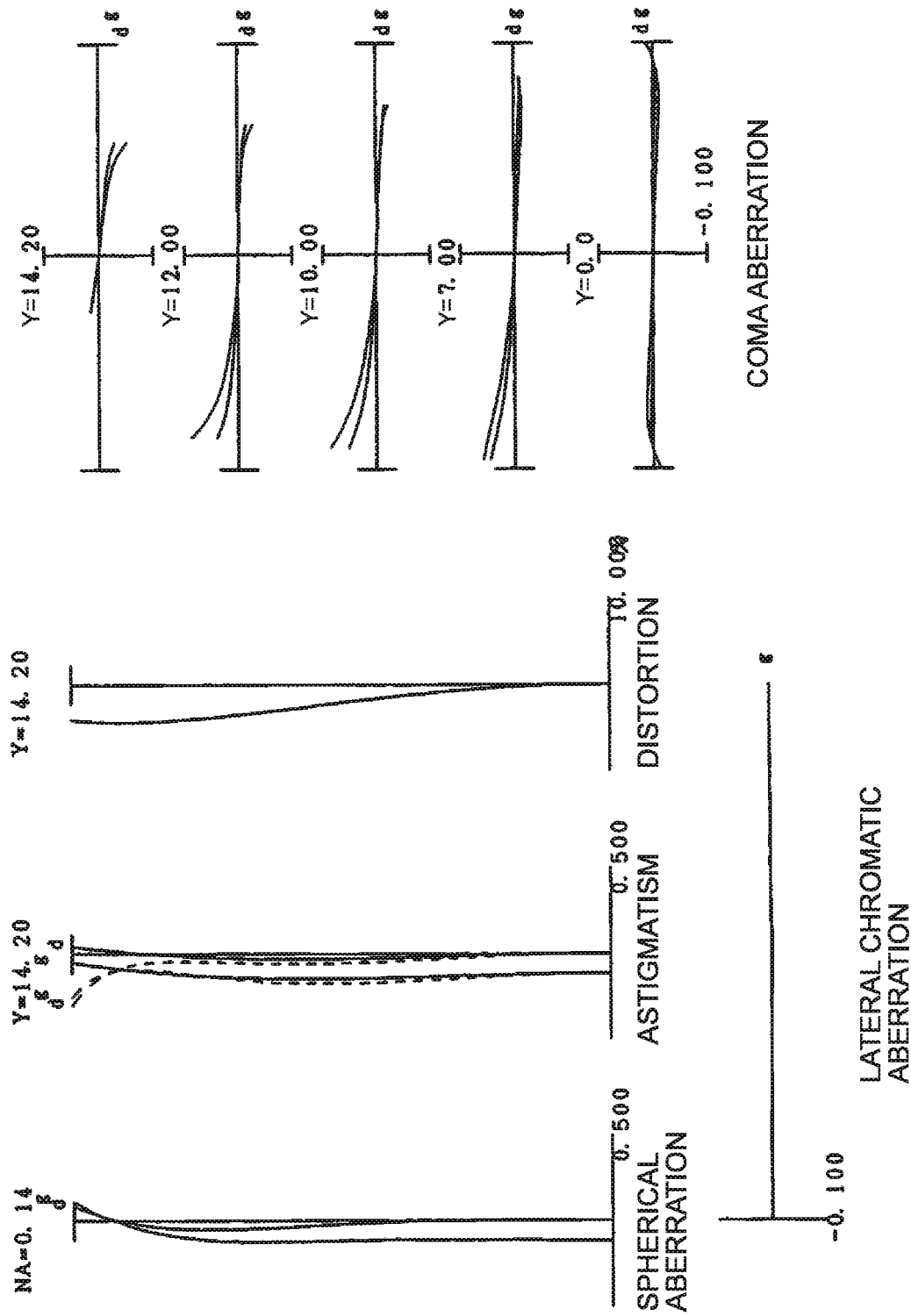

COMA ABERRATION

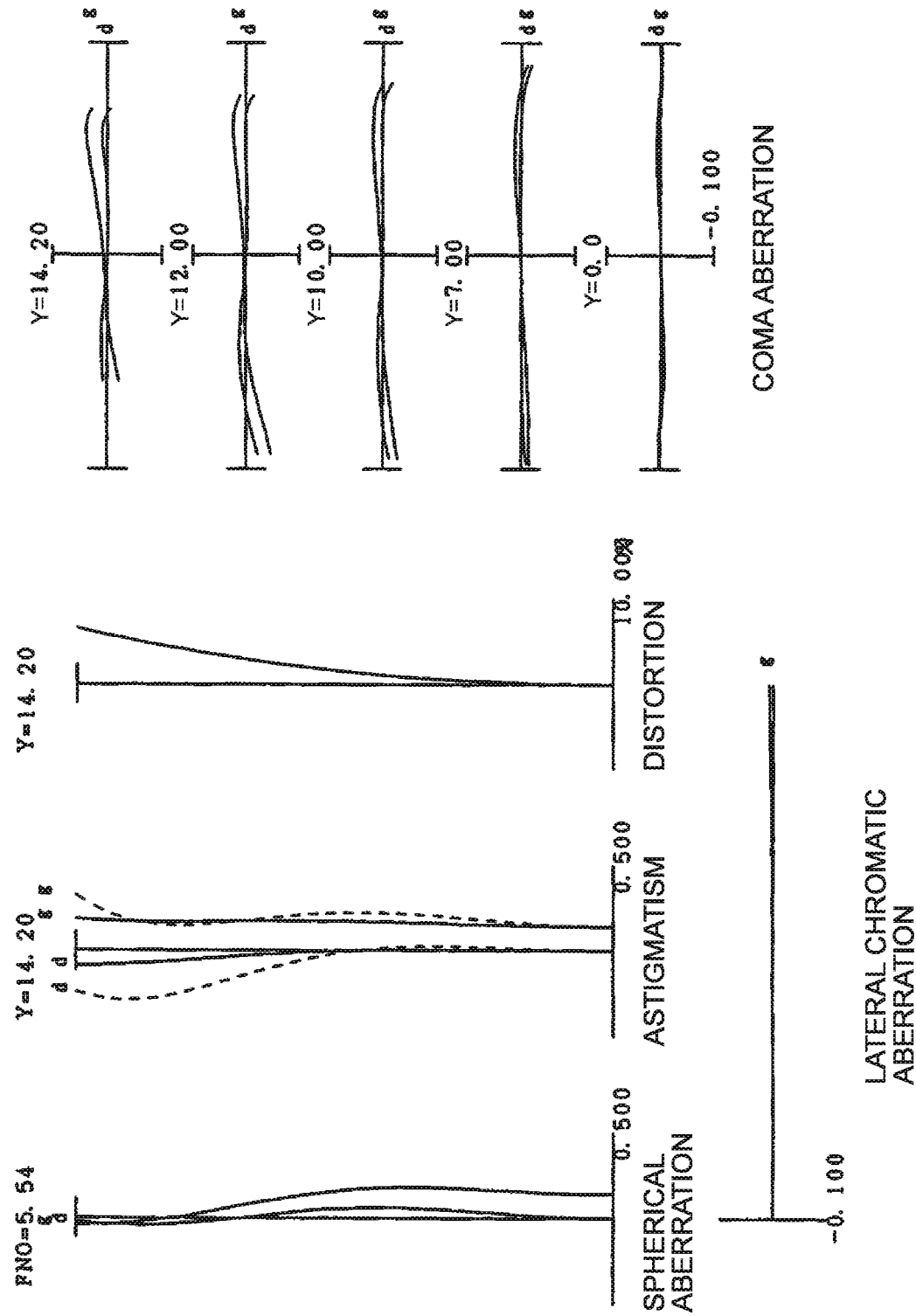

COMA ABERRATION

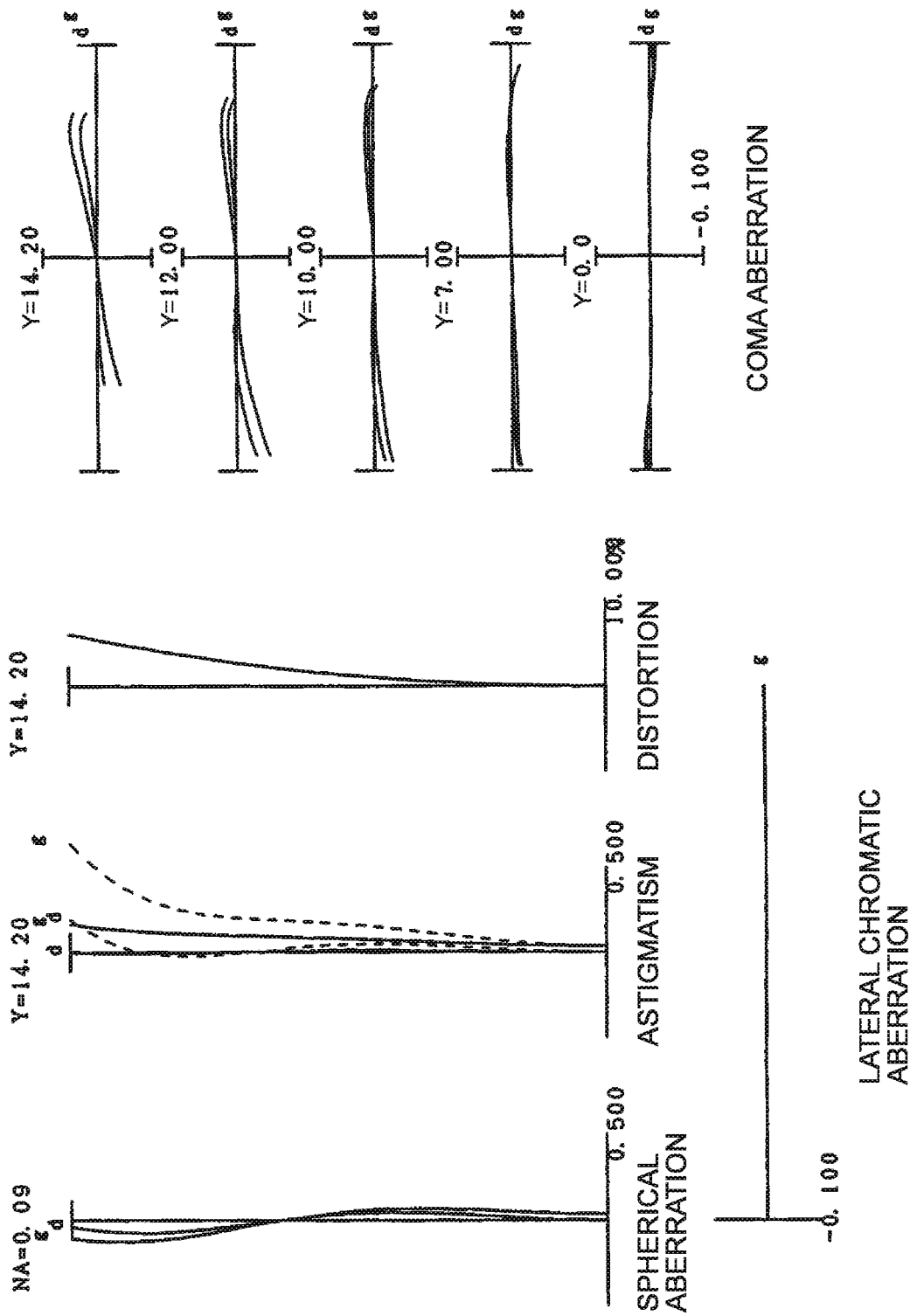

ZOOM LENS, IMAGING DEVICE AND METHOD FOR MANUFACTURING THE ZOOM LENS

TECHNICAL FIELD

The present invention relates to a zoom lens, an imaging device and a method for manufacturing the zoom lens.

TECHNICAL BACKGROUND

A proposal has so far been made on a zoom lens having a small size and a short back focus (for example, see Patent Document 1).

Moreover, a proposal has so far been made on a zoom lens suitable for a photographic camera, an electronic still camera, a video camera, and the like (for example, see Patent Document 2).

PRIOR ARTS LIST

Patent Document

Patent Document 1: Japanese Laid-Open Patent Publication No. 2009-251118(A)
Patent Document 2: Japanese Laid-Open Patent Publication No. S63-298210(A)

SUMMARY OF THE INVENTION

Problems to be Solved by the Invention

However, a conventional so-called standard zoom lens has adopted a method for increasing refractive power of each group in order to achieve size reduction. Therefore, a group configuration tends to be complicated or the number of lens configuration tends to be increased. Moreover, when each group is configured with strong power, such a zoom lens is easily formed into a configuration having a high degree of decentering sensitivity, and has had disadvantages in lens assembly properties. Moreover, a lens type advantageous also to correction of various aberrations has been required.

Moreover, a zoom lens having further successful optical performance has been recently required.

Means to Solve the Problems

A zoom lens according to a first aspect of the invention has, in order from an object, a first lens group having positive refractive power, a second lens group having negative refractive power, a third lens group having negative refractive power, and a fourth lens group having positive refractive power, in which zooming is made by varying an air distance between the first lens group and the second lens group, and the following conditional expression is satisfied:

$$0.60 < f4/fw < 1.15$$

where f4 denotes a focal length of the fourth lens group, and fw denotes a focal length of the zoom lens in a wide-angle end state upon focusing on infinity.

An imaging device according to a first aspect of the invention is provided with the zoom lens according to the first aspect of the invention.

A zoom lens according to a second aspect of the invention has, in order from an object, a first lens group having positive refractive power, a second lens group having negative refractive power, a third lens group having negative refractive power, and a fourth lens group having positive refractive power, in which zooming is made by varying an air distance between the first lens group and the second lens group, a part of the fourth lens group is provided to be movable, as a vibration-proof lens group for correcting an image blur, so as to have a component in a direction perpendicular to an optical axis, and the following conditional expression is satisfied:

$$0.60 < f4/fw < 1.15$$

where f4 denotes a focal length of the fourth lens group, and fw denotes a focal length of the zoom lens in a wide-angle end state upon focusing on infinity.

An imaging device according to a second aspect of the invention is provided with the zoom lens according to the second aspect of the invention.

A zoom lens according to a third aspect of the invention has, in order from an object, a first lens group having positive refractive power, a second lens group having negative refractive power, a third lens group having negative refractive power, and a fourth lens group having positive refractive power, in which focusing is made by moving at least a part of the third lens along an optical axis direction, and the following conditional expression is satisfied:

$$0.249 < fw/f1 < 2.00$$

where fw denotes a focal length of the zoom lens in a wide-angle end state, and f1 denotes a focal length of the first lens group.

An imaging device according to a third aspect of the invention is provided with the zoom lens according to the third aspect of the invention.

A zoom lens according to a fourth aspect of the invention has, in order from an object, a first lens group having positive refractive power, a second lens group having negative refractive power, a third lens group having negative refractive power, and a fourth lens group having positive refractive power, in which at least a part of the fourth lens group is provided to be movable as a vibration-proof lens group for correcting an image blur, so as to have a component in a direction perpendicular to an optical axis, and upon zooming, the first lens group is moved along an optical axis direction, and the following conditional expression is satisfied:

$$1.00 < f1/f4 < 3.55$$

where f1 denotes a focal length of the first lens group, and f4 denotes a focal length of the fourth lens group.

An imaging device according to a fourth aspect of the invention is provided with the zoom lens according to the fourth aspect of the invention.

A method for manufacturing a zoom lens according to a first aspect of the invention refers to the method including a first lens group having positive refractive power, a second lens group having negative refractive power, a third lens group having negative refractive power, and a fourth lens group having positive refractive power, in which each lens is arranged within a lens barrel in such a manner that zooming is made by varying an air distance between the first lens group and the second lens group, and the following conditional expression is satisfied:

$$0.60 < f4/fw < 1.15$$

where f4 denotes a focal length of the fourth lens group, and fw denotes a focal length of the zoom lens in a wide-angle end state upon focusing on infinity.

A method for manufacturing a zoom lens according to a second aspect of the invention refers to the method including a first lens group having positive refractive power, a second lens group having negative refractive power, a third lens group having negative refractive power, and a fourth lens group having positive refractive power, in which each lens is arranged within a lens barrel in such a manner that zooming is made by varying an air distance between the first lens group and the second lens group, and a part of the fourth lens group is provided to be movable, as a vibration-proof lens group for correcting an image blur, so as to have a component in a direction perpendicular to an optical axis, and the following conditional expression is satisfied:

$$0.60 < f4/fw < 1.15$$

where f4 denotes a focal length of the fourth lens group, and fw denotes a focal length of the zoom lens in a wide-angle end state upon focusing on infinity.

A method for manufacturing a zoom lens according to a third aspect of the invention refers to the method including a first lens group having positive refractive power, a second lens group having negative refractive power, a third lens group having negative refractive power, and a fourth lens group having positive refractive power, in which each lens is arranged within a lens barrel in such a manner that focusing is made by moving at least a part of the third lens along an optical axis direction, and the following conditional expression is satisfied:

$$0.249 < fw/f1 < 2.00$$

where fw denotes a focal length of the zoom lens in a wide-angle end state, and f1 denotes a focal length of the first lens group.

A method for manufacturing a zoom lens according to a fourth aspect of the invention refers to the method including a first lens group having positive refractive power, a second lens group having negative refractive power, a third lens group having negative refractive power, and a fourth lens group having positive refractive power, in which each lens is arranged within a lens barrel in such a manner that at least a part of the fourth lens group is provided to be movable, as a vibration-proof lens group for correcting an image blur, so as to have a component in a direction perpendicular to an optical axis, and upon zooming, the first lens group is moved along an optical axis direction, and the following conditional expression is satisfied:

$$1.00 < f1/f4 < 3.55$$

where f1 denotes a focal length of the first lens group, and f4 denotes a focal length of the fourth lens group.

BRIEF DESCRIPTION OF THE DRAWINGS

FIG. 1 is a cross-sectional view showing a lens configuration of a zoom lens (according to Example 1) upon focusing on infinity.

FIGS. 2A and 2B are graphs showing various aberrations of the zoom lens (according to Example 1) upon focusing on infinity in a wide-angle end state, in which FIG. 2A is graphs showing various aberrations upon focusing on infinity in the wide-angle end state, and FIG. 2B is graphs showing coma aberration when an image blur is corrected (a vibration-proof lens group shift amount=0.332).

FIGS. 4A and 4B are graphs showing various aberrations of the zoom lens (according to Example 1) upon focusing on infinity in a telephoto end state, in which FIG. 4A is graphs showing various aberrations upon focusing on infinity in the telephoto end state, and FIG. 4B is graphs showing coma aberration when an image blur is corrected (a vibration-proof lens group shift amount=0.457).

FIG. 5 is a cross-sectional view showing a lens configuration of a zoom lens (according to Example 2) upon focusing on infinity.

FIGS. 6A and 6B are graphs showing various aberrations of the zoom lens (according to Example 2) upon focusing on infinity in a wide-angle end state, in which FIG. 6A is graphs showing various aberrations upon focusing on infinity in the wide-angle end state, and FIG. 6B is graphs showing coma aberration when an image blur is corrected (a vibration-proof lens group shift amount=0.733).

FIGS. 8A and 8B are graphs showing various aberrations of the zoom lens (according to Example 2) upon focusing on infinity in a telephoto end state, in which FIG. 8A is graphs showing various aberrations upon focusing on infinity in the telephoto end state, and FIG. 8B is graphs showing coma aberration when an image blur is corrected (a vibration-proof lens group shift amount=0.992).

FIG. 9 is a cross-sectional view showing a lens configuration of a zoom lens (according to Example 3) upon focusing on infinity.

FIGS. 10A and 10B are graphs showing various aberrations of the zoom lens (according to Example 3) upon focusing on infinity in a wide-angle end state, in which FIG. 10A is graphs showing various aberrations upon focusing on infinity in the wide-angle end state, and FIG. 10B is graphs showing coma aberration when an image blur is corrected (a vibration-proof lens group shift amount=0.216).

FIG. 11 is graphs showing various aberrations of the zoom lens (according to Example 3) upon focusing on infinity in an intermediate focal length state.

FIGS. 12A and 12B are graphs showing various aberrations of the zoom lens (according to Example 3) upon focusing on infinity in a telephoto end state, in which FIG. 12A is graphs showing various aberrations upon focusing on infinity in the telephoto end state, and FIG. 12B is graphs showing coma aberration when an image blur is corrected (a vibration-proof lens group shift amount=0.295).

FIG. 13 is a cross-sectional view showing a lens configuration of a zoom lens (according to Example 4) upon focusing on infinity.

FIGS. 14A and 14B are graphs showing various aberrations of the zoom lens (according to Example 4) upon focusing on infinity in a wide-angle end state, in which FIG. 14A is graphs showing various aberrations upon focusing on infinity in the wide-angle end state, and FIG. 14B is graphs showing coma aberration when an image blur is corrected (a vibration-proof lens group shift amount=0.168).

FIGS. 16A and 16B are graphs showing various aberrations of the zoom lens (according to Example 4) upon focusing on infinity in a telephoto end state, in which FIG. 16A is graphs showing various aberrations upon focusing on infinity in the telephoto end state, and FIG. 16B is graphs showing coma aberration when an image blur is corrected (a vibration-proof lens group shift amount=0.200).

FIG. 20 is a cross-sectional view showing a lens configuration of a zoom lens according to Example 5.

FIGS. 21A, 21B and 21C are graphs showing aberrations of the zoom lens (according to Example 5) in a wide-angle end state (f=18.50), in which FIG. 21A is graphs showing various aberrations upon focusing on infinity, FIG. 21B is graphs showing coma aberration when an image blur is corrected upon focusing on infinity (a correction angle θ=0.30°), and FIG. 21C is graphs showing various aberrations upon focusing on a short distant object (an imaging distance of the zoom lens R=1 m).

FIGS. 22A, 22B and 22C are graphs showing aberrations of the zoom lens (according to Example 5) in an intermediate focal length state (f=29.99), in which FIG. 22A is graphs showing various aberrations upon focusing on infinity, FIG. 22B is graphs showing coma aberration when an image blur is corrected upon focusing on infinity (a correction angle θ=0.30°), and FIG. 22C is graphs showing various aberrations upon focusing on a short distant object (an imaging distance of the zoom lens R=1 m).

FIGS. 23A, 23B and 23C are graphs showing aberrations of the zoom lens (according to Example 5) in a telephoto end state (f=53.29), in which FIG. 23A is graphs showing various aberrations upon focusing on infinity, FIG. 23B is graphs showing coma aberration when an image blur is corrected upon focusing on infinity (a correction angle θ=0.30°), and FIG. 23C is graphs showing various aberrations upon focusing on a short distant object (an imaging distance of the zoom lens R=1 m).

FIG. 24 is a cross-sectional view showing a lens configuration of a zoom lens according to Example 6.

FIGS. 25A, 25B and 25C are graphs showing aberrations of the zoom lens (according to Example 6) in a wide-angle end state (f=18.57), in which FIG. 25A is graphs showing various aberrations upon focusing on infinity, FIG. 25B is graphs showing coma aberration when an image blur is corrected upon focusing on infinity (a correction angle θ=0.30°), and FIG. 25C is graphs showing various aberrations upon focusing on a short distant object (an imaging distance of the zoom lens R=1 m).

FIGS. 26A, 26B and 26C are graphs showing aberrations of the zoom lens (according to Example 6) in an intermediate focal length state (f=30.16), in which FIG. 26A is graphs showing various aberrations upon focusing on infinity, FIG. 26B is graphs showing coma aberration when an image blur is corrected upon focusing on infinity (a correction angle θ=0.30°), and FIG. 26C is graphs showing various aberrations upon focusing on a short distant object (an imaging distance of the zoom lens R=1 m).

FIGS. 27A, 27B and 27C are graphs showing aberrations of the zoom lens (according to Example 6) in a telephoto end state (f=53.65), in which FIG. 27A is graphs showing various aberrations upon focusing on infinity, FIG. 27B is graphs showing coma aberration when an image blur is corrected upon focusing on infinity (a correction angle θ=0.30°), and FIG. 27C is graphs showing various aberrations upon focusing on a short distant object (an imaging distance of the zoom lens R=1 m).

FIG. 28 is a cross-sectional view showing a lens configuration of a zoom lens according to Example 7.

FIGS. 29A, 29B and 29C are graphs showing aberrations of the zoom lens (according to Example 7) in a wide-angle end state (f=18.50), in which FIG. 29A is graphs showing various aberrations upon focusing on infinity, FIG. 29B is graphs showing coma aberration when an image blur is corrected upon focusing on infinity (a correction angle θ=0.30°), and FIG. 29C is graphs showing various aberrations upon focusing on a short distant object (an imaging distance of the zoom lens R=1 m).

FIGS. 30A, 30B and 30C are graphs showing aberrations of the zoom lens (according to Example 7) in an intermediate focal length state (f=30.00), in which FIG. 30A is graphs showing various aberrations upon focusing on infinity, FIG. 30B is graphs showing coma aberration when an image blur is corrected upon focusing on infinity (a correction angle θ=0.30°), and FIG. 30C is graphs showing various aberrations upon focusing on a short distant object (an imaging distance of the zoom lens R=1 m).

FIGS. 31A, 31B and 31C are graphs showing aberrations of the zoom lens (according to Example 7) in a telephoto end state (f=53.30), in which FIG. 31A is graphs showing various aberrations upon focusing on infinity, FIG. 31B is graphs showing coma aberration when an image blur is corrected upon focusing on infinity (a correction angle θ=0.30°), and FIG. 31C is graphs showing various aberrations upon focusing on a short distant object (an imaging distance of the zoom lens R=1 m).

DESCRIPTION OF THE EMBODIMENTS

First and Second Embodiments

Figure 2A:
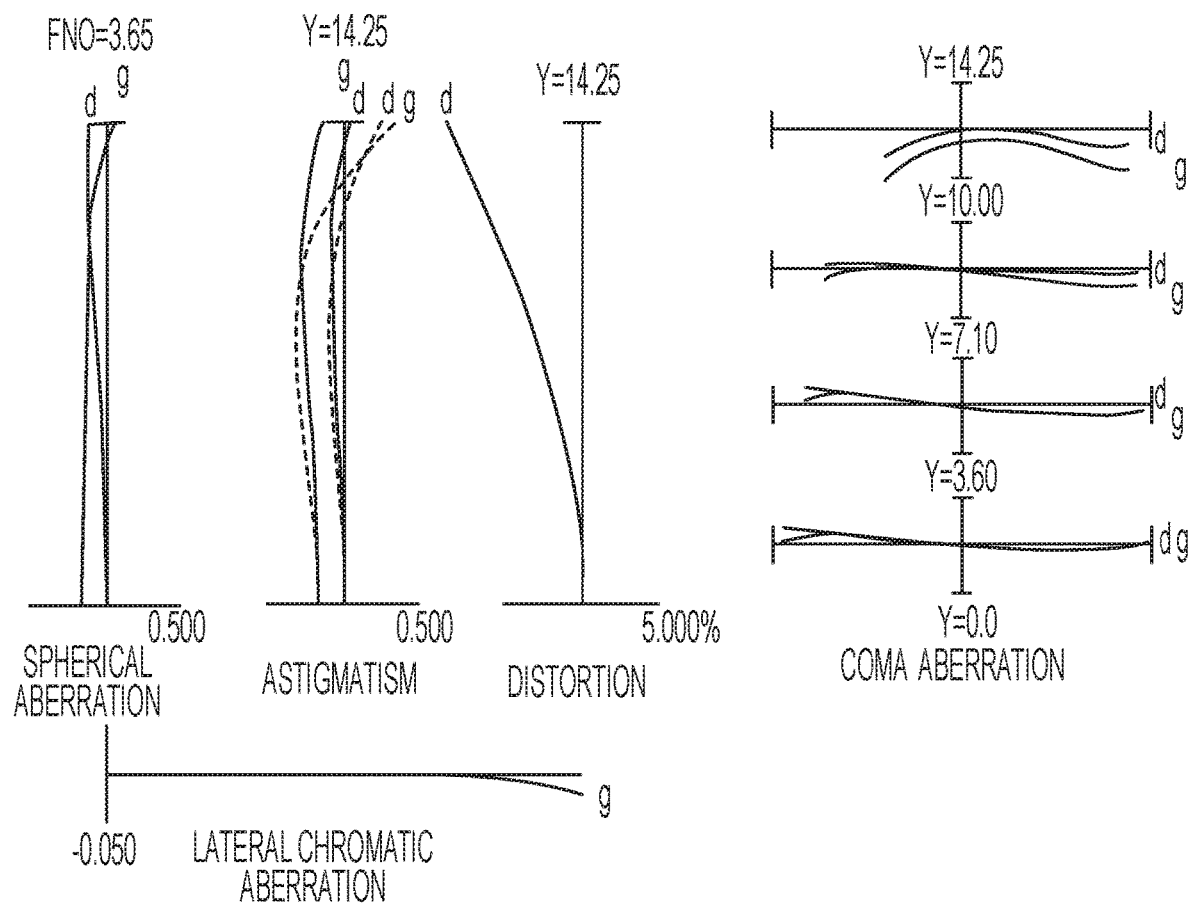

Hereinafter, a first embodiment will be described with reference to drawings. As shown in FIG. 1, a zoom lens ZL according to the first embodiment has, disposed in order from an object, a first lens group G1 having positive refractive power, a second lens group G2 having negative refractive power, a third lens group G3 having negative refractive power, and a fourth lens group G4 having positive refractive power, in which zooming is made by varying an air distance between the first lens group G1 and the second lens group G2, and the following conditional expression (1) is satisfied:

$$0.60 < f4/fw < 1.15 \qquad (1)$$

where f4 denotes a focal length of the fourth lens group G4, and fw denotes a focal length of the zoom lens in a wide-angle end state upon focusing on infinity.

The conditional expression (1) represents a condition specifying the focal length of the positive fourth lens group G4, in other words, a large and small relation of refractive power. The greatest feature of the present invention is that refractive power of the fourth lens group G4 is particularly high. Thus, an optical total length is significantly reduced, and size reduction can be achieved. Further, successful and optimum correction of various aberrations can be made by keeping a category of the conditional expression (1).

When a ratio thereof is more than an upper limit of the conditional expression (1), the focal length of the fourth lens group G4 increases, namely refractive power is reduced. In this case, the optical total length increases, and a back focus is also lengthened. Therefore, achievement of a significantly small-sized zoom lens as in the present invention becomes difficult. In addition thereto, refractive power of other groups, particularly the first lens group G1 and the second lens group G2, is forcibly increased to promote size reduction, resulting in causing variations in curvature of field and astigmatism by zooming, and deterioration in correction of comma aberration, and such a case is not preferable.

In addition, successful aberration correction can be made by setting the upper limit of the conditional expression (1) to 1.10. Moreover, further successful aberration correction can be made by setting the upper limit of the conditional expression (1) to 1.09. Moreover, still further successful aberration correction can be made by setting the upper limit of the conditional expression (1) to 1.08. Moreover, an effect of the first embodiment can be exhibited to a maximum by setting the upper limit of the conditional expression (1) to 1.07.

When the ratio thereof is less than a lower limit of the conditional expression (1), the focal length of the fourth lens group G4 is reduced, namely refractive power increases. In this case, size reduction can be achieved, but the back focus is excessively shortened to allow an exit pupil to excessively approach an image surface, and therefore matching with an imaging body is lost, and such a case is not preferable. Moreover, also in aberration correction, difficulty in design is increased, resulting in causing variations in curvature of field and astigmatism by zooming, deterioration in correction of spherical aberration and coma aberration, an increase in distortion, and the like, and such a case is not preferable, either.

In addition, successful aberration correction can be made by setting the lower limit of the conditional expression (1) to 0.63. Moreover, further successful aberration correction can be made by setting the lower limit of the conditional expression (1) to 0.65. Moreover, still further successful aberration correction can be made by setting the lower limit of the conditional expression (1) to 0.70. Moreover, the effect of the first embodiment can be exhibited to the maximum by setting the lower limit of the conditional expression (1) to 0.75.

In the zoom lens ZL according to the first embodiment, upon zooming, an air distance between the second lens group G2 and the third lens group G3, and also an air distance between the third lens group G3 and the fourth lens group G4 are preferably varied. According to this configuration, while off-axis aberration such as curvature of field and coma aberration is mainly successfully corrected, a predetermined zoom ratio can be ensured.

The zoom lens ZL according to the first embodiment has a configuration in which focusing is made by moving the third lens group G3 along an optical axis direction, and upon causing a change from a state of focusing on a long distant object to a state of focusing on a short distant object, the third lens group G3 is preferably moved from an image to the object. According to this configuration, short distance variations in spherical aberration can be successfully suppressed. Moreover, the third lens group G3 has a small number of lens configuration and light weight, and therefore upon focusing, a load on a drive motor can be reduced.

In the zoom lens ZL according to the first embodiment, the following conditional expression (2) is preferably satisfied:

$$0.80<(-f3)/fw<6.00 \quad (2)$$

where f3 denotes a focal length of the third lens group G3.

The conditional expression (2) represents a condition specifying the focal length of the third lens group G3, in other words, a large and small relation of refractive power.

When a ratio thereof is more than an upper limit of the conditional expression (2), an absolute value of the focal length of the third lens G3 increases, namely negative refractive power is reduced. A moving amount for focusing increases, and a large moving distance optically needed therefor is required to be kept. An operation of keeping the large moving amount while size reduction is kept is equal to increasing refractive power of each group, and in such a case, aberration correction is deteriorated, variations in curvature of field and astigmatism by zooming, and deterioration in correction of coma aberration are caused, and such a case is not preferable.

In addition, successful aberration correction can be made by setting the upper limit of the conditional expression (2) to 5.80. Moreover, further successful aberration correction can be made by setting the upper limit of the conditional expression (2) to 5.60. Moreover, still further successful aberration correction can be made by setting the upper limit of the conditional expression (2) to 5.50. Moreover, the effect of the first embodiment can be exhibited to the maximum by setting the upper limit of the conditional expression (2) to 5.00.

When the ratio thereof is less than a lower limit of the conditional expression (2), an absolute value of the focal length of the third lens G3 is reduced, namely negative refractive power increases. In this case, a moving amount for focusing is reduced, but variations in aberration upon focusing increase, resulting in particularly causing variations in curvature of field and astigmatism, and spherical aberration by zooming, and such a case is not preferable.

In addition, successful aberration correction can be made by setting the lower limit of the conditional expression (2) to 0.90. Moreover, further successful aberration correction can be made by setting the lower limit of the conditional expression (2) to 1.00. Moreover, still further successful aberration correction can be made by setting the lower limit of the conditional expression (2) to 1.20. Moreover, the effect of the first embodiment can be exhibited to the maximum by setting the lower limit of the conditional expression (2) to 1.40.

In the zoom lens ZL according to the first embodiment, the following conditional expression (3) is preferably satisfied:

$$3.00<f1/f4<11.00 \quad (3)$$

where f1 denotes a focal length of the first lens group G1.

The conditional expression (3) represents a condition specifying a ratio of the focal length of the positive first lens group G1 to the focal length of the positive fourth lens group G4, in other words, a large and small relation of refractive power.

When the ratio thereof is more than an upper limit of the conditional expression (3), in comparison with the focal length of the first lens group G1, the focal length of the fourth lens group G4 is reduced, namely refractive power increases. In this case, variations in curvature of field and astigmatism by zooming, deterioration in correction of spherical aberration and coma aberration, an increase in distortion, and the like are caused, and such a case is not preferable.

In addition, successful aberration correction can be made by setting the upper limit of the conditional expression (3) to 10.50. Moreover, further successful aberration correction can be made by setting the upper limit of the conditional expression (3) to 10.00. Moreover, still further successful aberration correction can be made by setting the upper limit of the conditional expression (3) to 9.50. Moreover, the effect of the first embodiment can be exhibited to the maximum by setting the upper limit of the conditional expression (3) to 9.00.

Moreover, when the ratio thereof is less than a lower limit of the conditional expression (3), in comparison with the focal length of the fourth lens group G4, the focal length of the first lens group G1 is reduced, namely refractive power increases. In this case, particularly deterioration in correction of spherical aberration on a telephoto side, and coma aberration in an entire region is caused, and such a case is not preferable.

In addition, successful aberration correction can be made by setting the lower limit of the conditional expression (3) to 3.20. Moreover, further successful aberration correction can be made by setting the lower limit of the conditional expression (3) to 3.50. Moreover, still further successful aberration correction can be made by setting the lower limit of the conditional expression (3) to 4.00. Moreover, the effect of the first embodiment can be exhibited to the maximum by setting the lower limit of the conditional expression (3) to 4.50.

In the zoom lens ZL according to the first embodiment, the following conditional expression (4) is preferably satisfied:

$$0.10 < f2/f3 < 20.00 \qquad (4)$$

where f2 denotes a focal length of the second lens group G2, and f3 denotes a focal length of the third lens group G3.

The conditional expression (4) represents a condition specifying a ratio of the focal length of the negative second lens group G2 to the focal length of the negative third lens group G3, in other words, a large and small relation of refractive power.

When the ratio thereof is more than an upper limit of the conditional expression (4), in comparison with the focal length of the second lens group G2, an absolute value of the focal length of the third lens group G3 is reduced, namely negative refractive power increases. In this case, a moving amount for focusing is reduced, but variations in aberration upon focusing increase, and particularly variations in curvature of field and astigmatism, and spherical aberration by zooming are caused, and such a case is not preferable.

In addition, successful aberration correction can be made by setting the upper limit of the conditional expression (4) to 19.00. Moreover, further successful aberration correction can be made by setting the upper limit of the conditional expression (4) to 18.50. Moreover, still further successful aberration correction can be made by setting the upper limit of the conditional expression (4) to 18.00. Moreover, the effect of the first embodiment can be exhibited to the maximum by setting the upper limit of the conditional expression (4) to 17.70.

When the ratio thereof is less than a lower limit of the conditional expression (4), in comparison with the focal length of the third lens group G3, an absolute of the focal length of the second lens group G2 is reduced, namely refractive power increases. In this case, particularly variations in coma aberration by zooming, and variations in curvature of filed and astigmatism by zooming increase, and such a case is not preferable.

In addition, successful aberration correction can be made by setting the lower limit of the conditional expression (4) to 0.13. Moreover, further successful aberration correction can be made by setting the lower limit of the conditional expression (4) to 0.15. Moreover, still further successful aberration correction can be made by setting the lower limit of the conditional expression (4) to 0.20. Moreover, the effect of the first embodiment can be exhibited to the maximum by setting the lower limit of the conditional expression (4) to 0.22.

In the zoom lens ZL according to the first embodiment, the third lens group G3 is preferably formed of one negative lens in order to suppress weight of the focusing group. Thus, various conditions of the first embodiment are set in such a manner that successful aberration correction can be made with one lens. Moreover, according to this configuration, room can be provided before and after the third lens group G3, and therefore power of the third lens group G3 can be loosened, and such a case is further advantageous in correction of curvature of field upon focusing.

In the zoom lens ZL according to the first embodiment, the fourth lens group G4 preferably has one positive lens being placed closest to the image, a cemented negative lens being placed next to the one positive lens, and the cemented negative lens having a convex cemented surface facing the image and formed by cementing a positive lens and a negative lens. According to this configuration, the back focus is moderately reduced to produce an effect on reducing the optical total length. Also in aberration correction, such a configuration is further advantageous in correction of astigmatism, distortion and coma aberration.

In the zoom lens ZL according to the first embodiment, the following conditional expression (5) is preferably satisfied:

$$0.10 < (-r)/fw < 2.00 \qquad (5)$$

where r denotes a radius of curvature of the cemented surface of the cemented negative lens in the fourth lens group G4.

The conditional expression (5) represents a condition specifying an optimum value of the radius of curvature of the cemented surface of the cemented negative lens in the negative fourth lens group G4 (for example, a cemented surface m19 of a cemented negative lens formed of lenses L44 and L45 in FIG. 1).

When a ratio thereof is more than an upper limit of the conditional expression (5), the radius of curvature of the cemented surface of the cemented negative lens in the negative fourth lens group G4 increases, and surface refractive power is reduced. In this case, negative distortion increases, and such a case is not preferable.

In addition, successful aberration correction can be made by setting the upper limit of the conditional expression (5) to 1.50. Moreover, further successful aberration correction can be made by setting the upper limit of the conditional expression (5) to 1.00. Moreover, still further successful aberration correction can be made by setting the upper limit of the conditional expression (5) to 0.70. Moreover, the effect of the first embodiment can be exhibited to the maximum by setting the upper limit of the conditional expression (5) to 0.60.

When the ratio thereof is less than a lower limit of the conditional expression (5), the radius of curvature of the cemented surface of the cemented negative lens in the negative fourth lens group G4 is reduced, and surface refractive power increases. In this case, an increase in positive distortion, and deterioration of coma aberration, curvature of field and astigmatism are caused, and such a case is not preferable.

In addition, successful aberration correction can be made by setting the lower limit of the conditional expression (5) to 0.13. Moreover, further successful aberration correction can be made by setting the lower limit of the conditional expression (5) to 0.15. Moreover, still further successful aberration correction can be made by setting the lower limit of the conditional expression (5) to 0.18. Moreover, the effect of the first embodiment can be exhibited to the maximum by setting the lower limit of the conditional expression (5) to 0.20.

In the zoom lens ZL according to the first embodiment, the following conditional expression (6) is preferably satisfied:

$$30.00° < \omega w < 80.00° \quad (6)$$

where $\omega w$ denotes a half angle of view in the wide-angle end state.

The conditional expression (6) represents a condition specifying an optimum value of the angle of view in the wide-angle end state. While the zoom lens ZL has a wide angle of view, coma aberration, distortion and curvature of field can be successfully corrected by satisfying the conditional expression (6).

In addition, successful aberration correction can be made by setting an upper limit of the conditional expression (6) to 77.00°.

Moreover, successful aberration correction can be made by setting a lower limit of the conditional expression (6) to 33.00°. Moreover, further successful aberration correction can be made by setting the lower limit of the conditional expression (6) to 36.00°.

In the zoom lens ZL according to the first embodiment, the following conditional expression (7) is preferably satisfied:

$$2.00 < ft/fw < 15.00 \quad (7)$$

where ft denotes a focal length of the zoom lens in a telephoto end state upon focusing on infinity.

The conditional expression (7) represents a condition specifying a proper ratio of the focal length of the zoom lens in the telephoto end state to the focal length of the zoom lens in the wide-angle end state, upon focusing on infinity. A high zoom ratio can be obtained, and simultaneously spherical aberration and coma aberration can be successfully corrected by satisfying the conditional expression (7).

In addition, successful aberration correction can be made by setting an upper limit of the conditional expression (7) to 10.00. Moreover, further successful aberration correction can be made by setting the upper limit of the conditional expression (7) to 7.00.

In addition, successful aberration correction can be made by setting the lower limit of the conditional expression (7) to 2.30. Moreover, further successful aberration correction can be made by setting the lower limit of the conditional expression (7) to 2.50. Moreover, still further successful aberration correction can be made by setting the lower limit of the conditional expression (7) to 2.70.

In the zoom lens ZL according to the first embodiment, a part of the fourth lens group G4 is provided to be movable, as a vibration-proof lens group for correcting an image blur (for example, a lens L41 in FIG. 1), so as to have a component in a direction perpendicular to an optical axis, and the following conditional expression (8) is preferably satisfied:

$$0.10 < VRT < 2.00 \quad (8)$$

where VRT denotes a vibration-proof coefficient of the vibration-proof lens group in the telephoto end state.

In addition, the vibration-proof coefficient VRT is defined by the following conditional expression:

$$VRT = |(1-Bvr) \times Br|$$

where Bvr denotes lateral magnification of the vibration-proof lens group, and

Br denotes lateral magnification of an optical system as a whole on a side closer to the image than the vibration-proof lens group (when no optical element exists to the image from the vibration-proof lens group, Br=1).

The conditional expression (8) represents a condition specifying the vibration-proof coefficient of a lens component provided to be movable so as to have the component in the direction perpendicular to the optical axis, namely the vibration-proof coefficient of the vibration-proof lens group, in the positive fourth lens group G4. When the vibration-proof coefficient is small, a moving amount needed for vibration proofing per unit increases, and when the vibration-proof coefficient is large, the moving amount needed for vibration proofing per unit is reduced.

When a ratio thereof is more than an upper limit of the conditional expression (8), the vibration-proof coefficient excessively increase, and stop control accuracy upon vibration proofing is required to be significantly increased, and such a case is not preferable. Also in aberration correction, an increase in variations in coma aberration and curvature of field upon vibration proofing is caused, and such a case is not preferable.

In addition, successful aberration correction can be made by setting the upper limit of the conditional expression (8) to 1.80. Moreover, further successful aberration correction can be made by setting the upper limit of the conditional expression (8) to 1.60. Moreover, still further successful aberration correction can be made by setting the upper limit of the conditional expression (8) to 1.50. Moreover, the effect of the first embodiment can be exhibited to the maximum by setting the upper limit of the conditional expression (8) to 1.40.

When the ratio thereof is less than a lower limit of the conditional expression (8), the vibration-proof coefficient is excessively reduced, and therefore a moving amount needed for vibration proofing per unit significantly increases. In such a case, an increase in a size of a lens and a size of a vibration-proof device is caused, and such a case is not preferable. Also in aberration correction, securement of a light amount upon vibration proofing becomes difficult, resulting in causing deterioration in correction of coma aberration upon vibration proofing, and such a case is not preferable, either.

In addition, successful aberration correction can be made by setting the lower limit of the conditional expression (8) to 0.12. Moreover, further successful aberration correction can be made by setting the lower limit of the conditional expression (8) to 0.15. Moreover, still further successful aberration correction can be made by setting the lower limit of the conditional expression (8) to 0.17. Moreover, the effect of the first embodiment can be exhibited to the maximum by setting the lower limit of the conditional expression (8) to 0.20.

In the zoom lens ZL according to the first embodiment, the following conditional expression (9) is preferably satisfied:

$$0.10 < f1/(-f3) < 2.00 \tag{9}$$

where f3 denotes a focal length of the third lens group G3.

The conditional expression (9) specifies a ratio of the focal length of the first lens group G1 to the focal length of the third lens group G3. When the ratio thereof is lower than a lower limit of the conditional expression (9), refractive power of the first lens group G1 increases, and correction of coma aberration, astigmatism and curvature of field becomes difficult. When the ratio thereof is more than an upper limit of the conditional expression (9), refractive power of the third lens group G3 increases, and correction of variations in curvature of field at a close distance becomes difficult.

In addition, successful aberration correction can be made by setting the lower limit of the conditional expression (9) to 0.50. Moreover, further successful aberration correction can be made by setting the lower limit of the conditional expression (9) to 1.00. The effect of the first embodiment can be exhibited to the maximum by setting the lower limit of the conditional expression (9) to 1.25.

Further successful aberration correction can be made by setting an upper limit of the conditional expression (9) to 1.80. The effect of the first embodiment can be exhibited to the maximum by setting the upper limit of the conditional expression (9) to 1.70.

In the zoom lens ZL according to the first embodiment, the following conditional expression (10) is preferably satisfied:

$$0.80 < (-f2)/f4 < 5.00 \tag{10}$$

where f2 denotes a focal length of the second lens group G2, and f4 denotes a focal length of the fourth lens group G4.

The conditional expression (10) specifies a ratio of the focal length of the second lens group G2 to the focal length of the fourth lens group G4. When the ratio thereof is less than a lower limit of the conditional expression (10), refractive power of the second lens group G2 increases, and correction of coma aberration and astigmatism becomes difficult. When the ratio thereof is more than an upper limit of the conditional expression (10), refractive power of the fourth lens group G4 increases, and correction of spherical aberration and coma aberration in the telephoto end state becomes difficult.

Further successful aberration correction can be made by setting the lower limit of the conditional expression (10) to 0.90. The effect of the first embodiment can be exhibited to the maximum by setting the lower limit of the conditional expression (10) to 1.00.

Successful aberration correction can be made by setting the upper limit of the conditional expression (10) to 3.00. Further successful aberration correction can be made by setting the upper limit of the conditional expression (10) to 2.00. The effect of the first embodiment can be exhibited to the maximum by setting the upper limit of the conditional expression (10) to 1.50.

In the zoom lens ZL according to the first embodiment, the following conditional expression (11) is preferably satisfied:

$$1.80 < ft/(-f2) < 3.50 \tag{11}$$

where ft denotes a focal length of the zoom lens in the telephoto end state, and f2 denotes a focal length of the second lens group G2.

The conditional expression (11) specifies a ratio of the focal length of the zoom lens in the telephoto end state to the focal length of the second lens group G2. When the ratio thereof is less than a lower limit of the conditional expression (11), refractive power of the second lens group G2 is reduced, and size reduction becomes difficult. When the refractive power of the first lens group G1 and the fourth lens group G4 is increased in order to achieve size reduction, correction of spherical aberration and curvature of field becomes difficult. When the ratio thereof is more than an upper limit of the conditional expression (11), refractive power of the second lens group G2 increases, and correction of coma aberration and astigmatism becomes difficult.

Further successful aberration correction can be made by setting the lower limit of the conditional expression (11) to 1.90. The effect of the first embodiment can be exhibited to the maximum by setting the lower limit of the conditional expression (11) to 2.00.

Further successful aberration correction can be made by setting the upper limit of the conditional expression (11) to 3.00. The effect of the first embodiment can be exhibited to the maximum by setting the upper limit of the conditional expression (11) to 2.50.

According to the first embodiment as described above, the zoom lens ZL that is preferable for an imaging device such as a so-called mirrorless camera and a rangefinder camera, and has a small size, high performance and reduced various aberrations can be realized.

Figure 17:
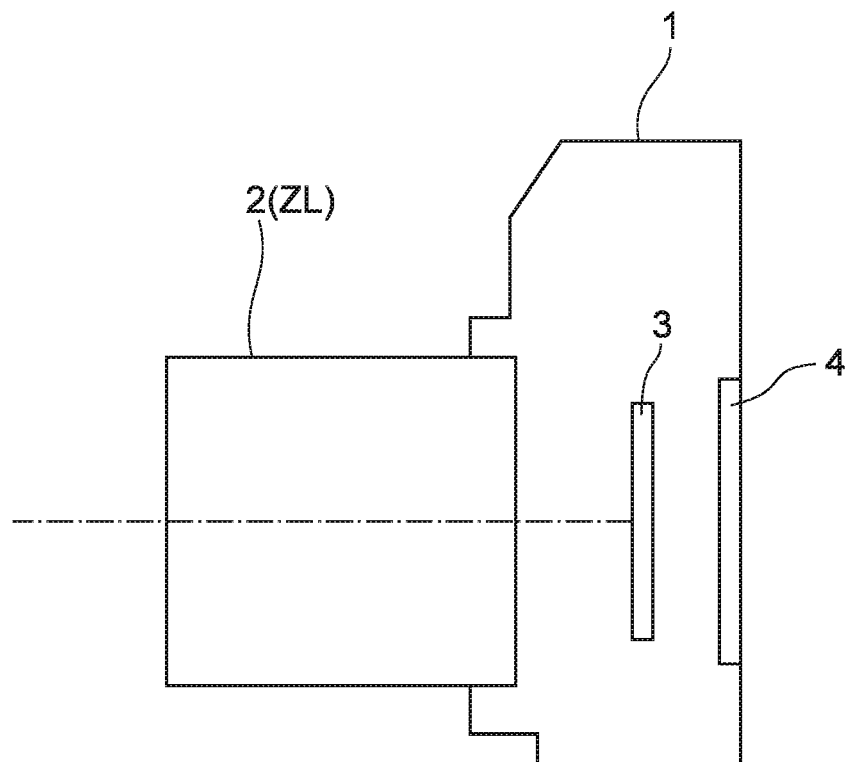
FIG. 17 is a cross-sectional view showing a configuration of a camera (an imaging device) according to each of first and second embodiments.

Next, a camera (imaging device) 1 provided with the above-mentioned zoom lens will be described with reference to FIG. 17. As shown in FIG. 17, the camera 1 is a lens interchangeable camera (so-called mirrorless camera) provided with the above-mentioned zoom lens as an imaging lens 2.

In the camera 1, light from an object (subject) (not shown) is collected by the imaging lens 2 to form a subject image on an imaging surface of an imaging unit 3 through an OLPF (optical low pass filter) (not shown). The subject image is then subjected to photoelectric conversion by a photoelectric conversion element provided in the imaging unit 3 to produce an image of the subject. This image is displayed on an EVF (electronic view finder) 4 provided in the camera 1. Thus, a photographer can observe the subject through the EVF 4.

Moreover, if a release bottom (not shown) is pressed by the photographer, the image of the subject produced in the imaging unit 3 is stored in a memory (not shown). Thus, the photographer can photograph the subject by the camera 1.

As is known also from each Example described later, the zoom lens ZL according to the first embodiment, mounted in the camera 1 as the imaging lens 2, has a small size, high performance and reduced various aberrations is realized by the characteristic lens configuration. Thus, according to the present camera 1, an imaging device having a small size, high performance and reduced various aberrations can be realized.

Figure 18:
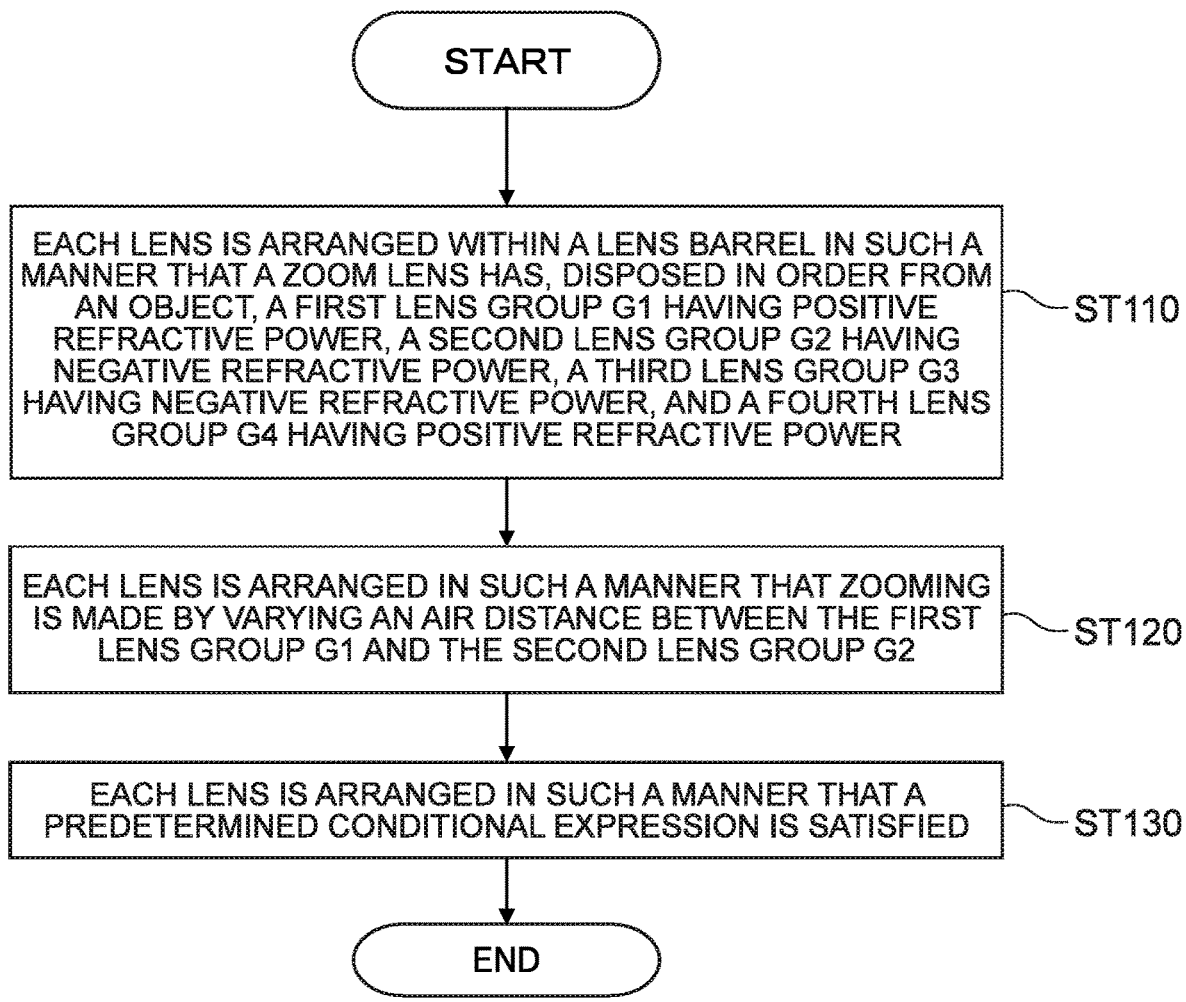
FIG. 18 is a flowchart for describing a method for manufacturing the zoom lens according to the first embodiment.

Subsequently, a method for manufacturing the zoom lens ZL according to the first embodiment will be generally described with reference to FIG. 18. First, each lens is arranged within a lens barrel in such a manner that the zoom lens ZL has, disposed in order from an object, a first lens group G1 having positive refractive power, a second lens group G2 having negative refractive power, a third lens group G3 having negative refractive power, and a fourth lens group G4 having positive refractive power (step ST110). At this time, each lens is arranged in such a manner that zooming is made by varying an air distance between the first lens group G1 and the second lens group G2 (step ST120). Then, each lens is arranged in such a manner that at least the following conditional expression (1) is satisfied among the conditional expressions (step ST130):

$$0.60 < f4/fw < 1.15 \qquad (1)$$

where f4 denotes a focal length of the fourth lens group G4, and fw denotes a focal length of the zoom lens in the wide-angle end state upon focusing on infinity.

To take a lens arrangement according to the first embodiment as one example, as shown in FIG. 1, as a first lens group G1, in order from an object, a cemented lens formed by cementing a negative meniscus lens L11 and a positive meniscus lens L12 each having a convex surface facing the object is arranged. As a second lens group G2, in order from the object, a negative meniscus lens L21 having a convex surface facing the object, a negative lens L22 having a biconcave shape, and a positive meniscus lens L23 having a convex surface facing the object are arranged. As a third lens group G3, a negative meniscus lens L31 having a concave surface facing the object is arranged. As a fourth lens group G4, in order from the object, a positive meniscus lens L41 having a convex surface facing an image, a cemented positive lens formed by cementing a positive lens L42 having a biconvex shape and a negative lens L43 having a biconcave shape, an aperture stop S determining an F-number, and a cemented negative lens formed by cementing a positive lens L44 provided with an aspherical surface to the object and a negative lens L45 having a concave surface facing the object, and a positive meniscus lens L46 having a convex surface facing the object are arranged.

According to the manufacturing method related to the first embodiment as described above, a zoom lens ZL that is preferable for an imaging device such as a so-called mirrorless camera and a rangefinder camera, and has a small size, high performance and reduced various aberrations can be obtained.

Next, a second embodiment will be described with reference to drawings. As shown in FIG. 1, a zoom lens ZL according to the second embodiment has, disposed in order from an object, a first lens group G1 having positive refractive power, a second lens group G2 having negative refractive power, a third lens group G3 having negative refractive power, and a fourth lens group G4 having positive refractive power, in which zooming is made by varying an air distance between the first lens group G1 and the second lens group G2, and a part of the fourth lens group G4 is provided to be movable, as a vibration-proof lens group (for example, a lens L41 in FIG. 1), so as to have a component in a direction perpendicular to an optical axis for correcting an image blur, and the following conditional expression (12) is satisfied:

$$0.60 < f4/fw < 1.15 \qquad (12)$$

where f4 denotes a focal length of the fourth lens group G4, and fw denotes a focal length of the zoom lens in a wide-angle end state upon focusing on infinity.

The conditional expression (12) represents a condition specifying the focal length of the positive fourth lens group G4, in other words, a large and small relation of refractive power. The greatest feature of the present invention is that refractive power of the fourth lens group G4 is particularly strong. Thus, an optical total length is significantly reduced, and size reduction can be achieved. Further, successful and optimum correction of various aberrations can be made by keeping a category of the conditional expression (12).

When a ratio thereof is more than a lower limit of the conditional expression (12), the focal length of the fourth lens group G4 increases, namely refractive power is reduced. In this case, the optical total length increases, and a back focus is also lengthened. Therefore, achievement of significantly small-sized zoom lens as in the present invention becomes difficult. In addition thereto, refractive power of other groups, particularly the first lens group G1 and the second lens group G2 is forcibly increased to promote size reduction, resulting in causing variations in curvature of field and astigmatism by zooming, and deterioration of correction of comma aberration, and such a case is not preferable.

In addition, successful aberration correction can be made by setting an upper limit of the conditional expression (12) to 1.10. Moreover, further successful aberration correction can be made by setting the upper limit of the conditional expression (12) to 1.09. Moreover, still further successful aberration correction can be made by setting the upper limit of the conditional expression (12) to 1.08. Moreover, an effect of the second embodiment can be exhibited to a maximum by setting the upper limit of the conditional expression (12) to 1.07.

When the ratio thereof is less than a lower limit of the conditional expression (12), the focal length of the fourth lens group G4 is reduced, namely refractive power increases. In this case, size reduction can be achieved, but the back focus is excessively shortened to allow an exit pupil to excessively approach an image surface, and therefore matching with an imaging body is lost, and such a case is not preferable. Moreover, also in aberration correction, difficulty in design increases, resulting in causing variations in curvature of field and astigmatism by zooming, deterioration of correction of spherical aberration and coma aberration, an increase in distortion, and the like, and such a case is not preferable, either.

In addition, successful aberration correction can be made by setting the lower limit of the conditional expression (12) to 0.63. Moreover, further successful aberration correction can be made by setting the lower limit of the conditional expression (12) to 0.65. Moreover, still further successful aberration correction can be made by setting the lower limit of the conditional expression (12) to 0.70. Moreover, the effect of the second embodiment can be exhibited to the maximum by setting the lower limit of the conditional expression (12) to 0.75.

In the zoom lens ZL according to the second embodiment, upon zooming, an air distance between the second lens group G2 and the third lens group G3 and also an air distance between the third lens group G3 and the fourth lens group G4 are preferably varied. According to this configuration, while off-axis aberration such as curvature of field and coma aberration is mainly successfully corrected, a predetermined zoom ratio can be ensured.

In the zoom lens ZL according to the second embodiment, the following conditional expression (13) is preferably satisfied:

$$0.10 < VRT < 2.00 \quad (13)$$

where VRT denotes a vibration-proof coefficient of a vibration-proof lens group in a telephoto end state.

In addition, the vibration-proof coefficient VRT is defined by the following conditional expression:

$$VRT = |(1-Bvr) \times Br|$$

where Bvr denotes lateral magnification of the vibration-proof lens group, and

Br denotes lateral magnification of an optical system as a whole on a side closer to the image than the vibration-proof lens group (when no optical element exists to the image from the vibration-proof lens group, Br=1).

The conditional expression (13) represents a condition specifying a vibration-proof coefficient of a lens component provided to be movable so as to have the component in the direction perpendicular to the optical axis, namely the vibration-proof lens group, in the positive fourth lens group G4. When the vibration-proof coefficient is small, a moving amount needed for vibration proofing per unit increases, and when the vibration-proof coefficient is large, the moving amount needed for vibration proofing per unit is reduced.

When a ratio thereof is more than an upper limit of the conditional expression (13), the vibration-proof coefficient excessively increases, and stop control accuracy upon vibration proofing is required to be significantly increased. Thus, such a case is not preferable. Variations in coma aberration and curvature of field upon vibration proofing increase in aberration correction, and such a case is not preferable.

In addition, successful aberration correction can be made by setting the upper limit of the conditional expression (13) to 1.80. Moreover, further successful aberration correction can be made by setting the upper limit of the conditional expression (13) to 1.60. Moreover, still further successful aberration correction can be made by setting the upper limit of the conditional expression (13) to 1.50. Moreover, the effect of the second embodiment can be exhibited to the maximum by setting the upper limit of the conditional expression (13) to 1.40.

When the ratio thereof is less than a lower limit of the conditional expression (13), the vibration-proof coefficient is excessively reduced, and therefore a moving amount needed for vibration proofing per unit significantly increases. In such a case, an increase in a size of a lens and a size of a vibration-proof device is caused, and such a case is not preferable. Also in aberration correction, securement of a light amount upon vibration proofing becomes difficult, resulting in causing deterioration in correction of coma aberration upon vibration proofing, and such a case is not preferable, either.

In addition, successful aberration correction can be made by setting the lower limit of the conditional expression (13) to 0.12. Moreover, further successful aberration correction can be made by setting the lower limit of the conditional expression (13) to 0.15. Moreover, still further successful aberration correction can be made by setting the lower limit of the conditional expression (13) to 0.17. Moreover, the effect of the second embodiment can be exhibited to the maximum by setting the lower limit of the conditional expression (13) to 0.20.

In the zoom lens ZL according to the second embodiment, the following conditional expression (14) is preferably satisfied:

$$3.00 < f1/f4 < 11.00 \quad (14)$$

where f1 denotes a focal length of the first lens group G1.

The conditional expression (14) represents a condition specifying a ratio of the focal length of the positive first lens group G1 to the focal length of the positive fourth lens group G4, in other words, a large and small relation of refractive power.

When the ratio thereof is more than an upper limit of the conditional expression (14), in comparison with the focal length of the first lens group G1, the focal length of the fourth lens group G4 is reduced, namely refractive power increases. In this case, variations in curvature of field and astigmatism by zooming, deterioration in correction of spherical aberration and coma aberration, and an increase in distortion, and the like are caused, and such a is not preferable.

In addition, successful aberration correction can be made by setting the upper limit of the conditional expression (14) to 10.50. Moreover, further successful aberration correction can be made by setting the upper limit of the conditional expression (14) to 10.00. Moreover, still further successful aberration correction can be made by setting the upper limit of the conditional expression (14) to 9.50. Moreover, the effect of the second embodiment can be exhibited to the maximum by setting the upper limit of the conditional expression (14) to 9.00.

When the ratio thereof is less than a lower limit of the conditional expression (14), in comparison with the focal length of the fourth lens group G4, the focal length of the first lens group G1 is reduced, namely refractive power increases. In this case, particularly deterioration in correction of spherical aberration on a telephoto side, and coma aberration in an entire region is caused, and such a case is not preferable.

In addition, successful aberration correction can be made by setting the lower limit of the conditional expression (14) to 3.20. Moreover, further successful aberration correction can be made by setting the lower limit of the conditional expression (14) to 3.50. Moreover, still further successful aberration correction can be made by setting the lower limit of the conditional expression (14) to 4.00. Moreover, the effect of the second embodiment can be exhibited to the maximum by setting the lower limit of the conditional expression (14) to 4.50.

In the zoom lens ZL according to the second embodiment, the following conditional expression (15) is preferably satisfied:

$$0.10 < f2/f3 < 20.00 \quad (15)$$

where f2 denotes a focal length of the second lens group G2, and f3 denotes a focal length of the third lens group G3.

The conditional expression (15) represents a condition specifying a ratio of the focal length of the negative second lens group G2 to the focal length of the negative third lens group G3, in other words, a large and small relation of refractive power.

When the ratio thereof is more than an upper limit of the conditional expression (15), in comparison with the focal length of the second lens group G2, an absolute value of the focal length of the third lens group G3 is reduced, namely negative refractive power increases. In this case, a moving amount for focusing is reduced, but variations in aberration upon focusing increase, and particularly variations in curvature of field and astigmatism, and spherical aberration by zooming are caused, and such a case is not preferable.

In addition, successful aberration correction can be made by setting the upper limit of the conditional expression (15) to 19.00. Moreover, further successful aberration correction can be made by setting the upper limit of the conditional expression (15) to 18.50. Moreover, still further successful aberration correction can be made by setting the upper limit of the conditional expression (15) to 18.00. Moreover, the effect of the second embodiment can be exhibited to the maximum by setting the upper limit of the conditional expression (15) to 17.70.

When the ratio thereof is less than a lower limit of the conditional expression (15), in comparison with the focal length of the third lens group G3, an absolute value of the focal length of the second lens group G2 is reduced, namely refractive power increases. In this case, particularly variations in coma aberration by zooming and variations in curvature of field and astigmatism by zooming increase, and such a case is not preferable.

In addition, successful aberration correction can be made by setting the lower limit of the conditional expression (15) to 0.13. Moreover, further successful aberration correction can be made by setting the lower limit of the conditional expression (15) to 0.15. Moreover, still further successful aberration correction can be made by setting the lower limit of the conditional expression (15) to 0.20. Moreover, the effect of the second embodiment can be exhibited to the maximum by setting the lower limit of the conditional expression (15) to 0.22.

In the zoom lens ZL according to the second embodiment, the fourth lens group G4 preferably has one positive lens being placed closest to the image, a cemented negative lens being placed next to the one positive lens, and the cemented negative lens having a convex cemented surface facing the image and formed of a positive lens and a negative lens. According to this configuration, the back focus is moderately reduced to produce an effect on reducing the optical total length. Also in aberration correction, this configuration is further advantageous in correction of astigmatism, distortion and coma aberration.

In the zoom lens ZL according to the second embodiment, the following conditional expression (16) is preferably satisfied:

$$0.10 < (-r)/fw < 2.00 \qquad (16)$$

where r denotes a radius of curvature of a cemented surface of a cemented negative lens in the fourth lens group G4.

The conditional expression (16) represents a condition specifying an optimum value of a radius of curvature of a cemented surface (for example, a cemented surface m19 of a cemented negative lens formed of lenses L44 and L45 in FIG. 1) of the cemented negative lens in the negative fourth lens group G4.

When a ratio thereof is more than an upper limit of the conditional expression (16), the radius of curvature of the cemented surface of the cemented negative lens in the negative fourth lens group G4 increases, and surface refractive power is reduced. In this case, negative distortion increases, and such a case is not preferable.

In addition, successful aberration correction can be made by setting the upper limit of the conditional expression (16) to 1.50. Moreover, further successful aberration correction can be made by setting the upper limit of the conditional expression (16) to 1.00. Moreover, still further successful aberration correction can be made by setting the upper limit of the conditional expression (16) to 0.70. Moreover, the effect of the second embodiment can be exhibited to the maximum by setting the upper limit of the conditional expression (16) to 0.60.

When the ratio thereof is less than a lower limit of the conditional expression (16), the radius of curvature of the cemented surface of the cemented negative lens in the negative fourth lens group G4 is reduced, and surface refractive power increases. In this case, positive distortion increases, and deterioration in coma aberration, curvature of field and astigmatism is caused, and such a case is not preferable.

In addition, successful aberration correction can be made by setting the lower limit of the conditional expression (16) to 0.13. Moreover, further successful aberration correction can be made by setting the lower limit of the conditional expression (16) to 0.15. Moreover, still further successful aberration correction can be made by setting the lower limit of the conditional expression (16) to 0.18. Moreover, the effect of the second embodiment can be exhibited to the maximum by setting the lower limit of the conditional expression (16) to 0.20.

In the zoom lens ZL according to the second embodiment, the following conditional expression (17) is preferably satisfied:

$$30.00° < \omega w < 80.00° \qquad (17)$$

where ωw denotes a half angle of view in a wide-angle end state.

The conditional expression (17) represents a condition specifying an optimum value of an angle of view in the wide-angle end state. While the zoom lens ZL has a wide angle of view, coma aberration, distortion and curvature of field can be successfully corrected by satisfying the conditional expression (17).

In addition, successful aberration correction can be made by setting an upper limit of the conditional expression (17) to 77.00°.

In addition, successful aberration correction can be made by setting a lower limit of the conditional expression (17) to 33.00°. Moreover, further successful aberration correction can be made by setting the lower limit of the conditional expression (17) to 36.00°.

In the zoom lens ZL according to the second embodiment, the following conditional expression (18) is preferably satisfied:

$$2.00 < ft/fw < 15.00 \qquad (18)$$

where ft denotes a focal length of the zoom lens in a telephoto end state upon focusing on infinity.

The conditional expression (18) represents a condition specifying a proper ratio of the focal length of the zoom lens to the focal length of the zoom lens in the wide-angle end state, in the telephoto end state. A high zoom ratio can be obtained, and simultaneously spherical aberration and coma aberration can be successfully corrected by satisfying the conditional expression (18).

In addition, successful aberration correction can be made by setting an upper limit of the conditional expression (18) to 10.00. Moreover, further successful aberration correction can be made by setting the upper limit of the conditional expression (18) to 7.00.

Moreover, successful aberration correction can be made by setting a lower limit of the conditional expression (18) to 2.30. Moreover, further successful aberration correction can be made by setting the lower limit of the conditional expression (18) to 2.50. Moreover, still further successful aberration correction can be made by setting the lower limit of the conditional expression (18) to 2.70.

According to the second embodiment described above, a zoom lens ZL that is preferable for an imaging device such as a so-called mirrorless camera and a rangefinder camera, and has a small size, high performance and reduced various aberrations can be realized.

Next, a camera (imaging device) 1 provided with the above-mentioned zoom lens will be described with reference to FIG. 17. This camera is identical with the camera according to the first embodiment and the configuration has been already described, and therefore the description herein is omitted.

As is known also from each Example described later, the zoom lens ZL according to the second embodiment, mounted in the camera 1 as the imaging lens 2, has a small size, high performance and reduced various aberrations is realized by the characteristic lens configuration. Thus, according to the present camera 1, an imaging device having a small size, high performance and reduced various aberrations can be realized.

Figure 19:
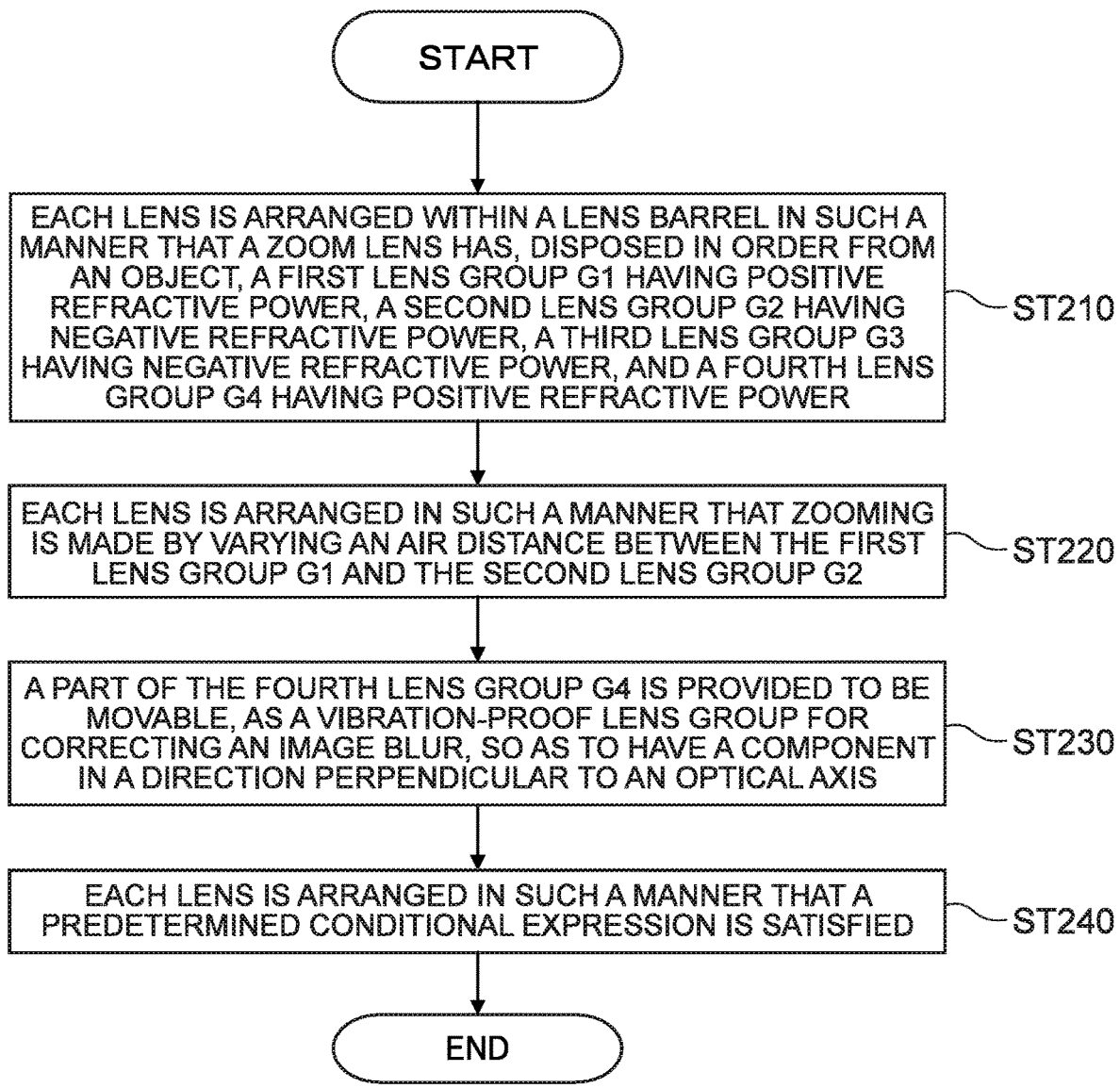
FIG. 19 is a flowchart for describing a method for manufacturing the zoom optical system (zoom lens) according to the second embodiment.

Subsequently, a method for manufacturing the zoom lens ZL according to the second embodiment will be generally described with reference to FIG. 19. First, each lens is arranged within a lens barrel in such a manner that the zoom lens ZL has, disposed in order from an object, a first lens group G1 having positive refractive power, a second lens group G2 having negative refractive power, a third lens group G3 having negative refractive power, and a fourth lens group G4 having positive refractive power (step S210). At this time, each lens is arranged in such a manner that zooming is made by varying an air distance between the first lens group G1 and the second lens group G2 (step ST220). A part of the fourth lens group G4 is provided to be movable, as a vibration-proof lens group for correcting an image blur, so as to have a component in a direction perpendicular to an optical axis (step ST230). Moreover, each lens is arranged in such a manner that at least the following conditional expression (12) is satisfied among the conditional expressions (step ST240):

$$0.60 < f4/fw < 1.15 \quad (12)$$

where f4 denotes a focal length of the fourth lens group G4, and fw denotes a focal length of the zoom lens in a wide-angle end state upon focusing on infinity.

To take a lens arrangement according to the second embodiment as one example, as shown in FIG. 1, as a first lens group G1, in order from an object, a cemented lens formed by cementing a negative meniscus lens L11 and a positive meniscus lens L12 each having a convex surface facing the object is arranged. As a second lens group G2, in order from the object, a negative meniscus lens L21 having a convex surface facing the object, a negative lens L22 having a biconcave shape, and a positive meniscus lens L23 having a convex surface facing the object are arranged. As a third lens group G3, a negative meniscus lens L31 having a concave surface facing the object is arranged. As a fourth lens group G4, in order from the object, a positive meniscus lens L41 (vibration-proof lens group) having a convex surface facing an image, a cemented positive lens formed by cementing a positive lens L42 having a biconvex shape and a negative lens L43 having a biconcave shape, an aperture stop S determining an F-number, and a cemented negative lens formed by cementing a positive lens L44 provided with an aspherical surface to the object and a negative lens L45 having a concave surface facing the object, and a positive meniscus lens L46 having a convex surface facing the object are arranged.

According to the manufacturing method related to the second embodiment as described above, a zoom lens ZL that is preferable for an imaging device such as a so-called mirrorless camera and a rangefinder camera, and has a small size, high performance and reduced various aberrations can be obtained.

Examples According to First and Second Embodiments

Next, each Example according to each of first and second embodiments will be described based on drawings. Tables 1 to 4 are provided below, and these Tables indicate specifications in Example 1 to Example 4, respectively.

FIG. 1, FIG. 5, FIG. 9, and FIG. 13 each are a cross-sectional view showing a lens configuration of a zoom lens ZL (ZL1 to ZL4) according to each Example. In these cross-sectional views showing the zoom optical systems (Zoom lens) ZL1 to ZL4, a moving track of each of lens groups G1 to G4 along an optical axis upon zooming from a wide-angle end state (W) to a telephoto end state (T) is shown by an arrow.

In addition, each reference sign for FIG. 1 according to Example 1 is independently used for each Example in order to avoid complication of the description by an increase in digit number of the reference sign. Therefore, even if reference signs common to the reference signs in drawings according to other Examples are placed, the reference signs do not necessarily provides configurations common to the configurations in other Examples.

In each Example, a d-line (wavelength: 587.5620 nm) and a g-line (wavelength: 435.8350 nm) are selected as an object for calculation of aberration characteristics.

In "Lens Data" in the Table, a surface number indicates an order of optical surfaces from an object along a direction in which a ray of light progresses, R denotes a radius of curvature of each optical surface, D denotes a distance to the next lens surface being the distance on the optical axis from each optical surface to the next optical surface (or image surface), nd denotes a refractive index for the d-line of a material of an optical member, and vd denotes the Abbe number of the material of the optical material on the basis of the d-line. Moreover, (Variable) indicates a variable distance to the next lens surface, "∞" in a radius of curvature indicates a flat surface or an aperture, and (Stop S) indicates an aperture stop S. A refractive index (d-line) of air "1.000000" is omitted. When the optical surface is aspherical, "*" is placed on a left side of the surface number, and a paraxial radius of curvature is shown in a column of the radius of curvature R.

In "Aspherical Surface Data" in the Table, a shape of an aspherical surface shown in "Lens Data" is expressed by the following expression (a). Here, y denotes a height in a direction perpendicular to the optical axis, X(y) denotes an amount of displacement (amount of sag) in an optical axis direction at a height y, R denotes a radius of curvature (paraxial radius of curvature) of a reference spherical surface, κ denotes a conical coefficient, and An represents an n-th aspherical coefficient. In addition, "E-n" represents "×10$^{-n}$," and for example, "1.234E-05" represents "1.234× 10$^{-5}$."

$$X(y)=(y^2/R)/[1+\{1-\kappa(y^2/R^2)\}^{1/2}]+A4 \times y^4+A6 \times y^6+A8 \times y^8+A10+y^{10} \quad (a)$$

In "Each Group Distance Data" in the Table, f denotes a focal length of the zoom lens, β denotes a radiography scaling factor, DO denotes a distance from an object surface to the first surface, Di (where, i is an integer) denotes a variable distance between an i-th surface and a (i+1)-th surface. Moreover, 1-POS denotes upon focusing on infinity in a wide-angle end state, 2-POS denotes upon focusing on infinity in an intermediate focal length state, 3-POS denotes upon focusing on infinity in a telephoto end state, 4-POS denotes upon focusing on an intermediate distant object in a wide-angle end state, 5-POS denotes upon focusing on an intermediate distant object in an intermediate focal length state, 6-POS denotes upon focusing on an intermediate distant object in a telephoto end state, 7-POS denotes upon focusing on a short distant object in a wide-angle end state, 8-POS denotes upon focusing on a short distant object in an intermediate focal length state, and 9-POS denotes upon focusing on a short distant object in a telephoto end state.

In "Various Data" in the Table, f denotes a focal length of the zoom lens, FNO denotes an F-number, ω denotes a half angle of view (a unit: °), Y denotes an image height, TL denotes a total length (a distance from a lens forefront surface to a paraxial image surface on the optical axis) of a lens system, Σd denotes a distance from a lens forefront surface to a lens final surface on the optical axis, and Bf denotes a back focus (a distance from a lens final surface to the paraxial image surface on the optical axis).

In "Lens Group Data" in the Table, a start surface number (surface number on a side closest to an object) of each group is shown in a group first surface, and a focal length of each group is shown in a group focal length.

In "Conditional Expression Corresponding Value" in the Table, values corresponding to the conditional expressions (1) to (18) are shown.

In the following, in all the values of the specifications, unless otherwise stated, "mm" is generally used for the focal length f, the radius of curvature R, the distance to the next lens surface D and other lengths, and the like entered therein. However, equivalent optical performance can be obtained even though the optical system is proportionally scaled up or scaled down, and therefore the values are not limited thereto. Moreover, the unit is not limited to "mm," and other appropriate units can be used.

The description with regard to Table so far is common in all Examples, and the description in the following is omitted.

Example 1

Example 1 will be described using FIG. 1, FIGS. 2A and 2B, FIG. 3, FIGS. 4A and 4B and Table 1. As shown in FIG. 1, a zoom lens ZL (ZL1) according to Example 1 is configured of, disposed in order from an object, a first lens group G1 having positive refractive power, a second lens group G2 having negative refractive power, a third lens group G3 having negative refractive power, and a fourth lens group G4 having positive refractive power.

The first lens group G1 is configured of, disposed in order from an object, a cemented positive lens formed by cementing a negative meniscus lens L11 having a convex surface facing the object and a positive meniscus lens L12 having a convex surface facing the object.

The second lens group G2 is configured of, disposed in order from an object, a negative meniscus lens L21 having a convex surface facing the object, a negative lens L22 having a biconcave shape, and a positive meniscus lens L23 having a convex surface facing the object.

The third lens group G3 is configured of a negative meniscus lens L31 having a concave surface facing an object.

The fourth lens group G4 is configured of, disposed in order from an object, a positive meniscus lens L41 having a convex surface facing an image, a cemented positive lens formed by cementing a positive lens L42 having a biconvex shape and a negative lens L43 having a biconcave shape, an aperture stop S determining an F-number, and a cemented negative lens formed by cementing a positive lens L44 provided with an aspherical surface to the object and a negative lens L45 having a concave surface facing the object, and a positive meniscus lens L46 having a convex surface facing the object.

An image surface I is formed on an imaging element (not shown), and the imaging element is configured of a CCD, a CMOS, and the like.

In the zoom lens ZL1 according to Example 1, zooming from a wide-angle end state to a telephoto end state is made by varying an air distance between the first lens group G1 and the second lens group G2, an air distance between the second lens group G2 and the third lens group G3, and an air distance between the third lens group G3 and the fourth lens group G4. At this time, relative to the image surface I, the first lens group G1 moves to the object, the second lens group G2 moves along the optical axis so as to draw a convex track to the image, the third lens group G3 moved to the image, and the fourth lens group G4 moves to the object. The aperture stop S moves to the object integrally with the fourth lens group G4 upon zooming.

Moreover, the zoom lens ZL has a configuration in which focusing is made by moving the third lens group G3 along the optical axis direction. As shown by an arrow in FIG. 1, upon causing a change from a state of focusing on a long distant object to a state of focusing on a short distant object, the third lens group G3 moves from the image to the object.

Moreover, upon occurrence of an image blur, correction of the image blur on the image surface I is made by moving, as a vibration-proof lens, the positive meniscus lens L41 of the fourth lens group G4 so as to have a component in a direction perpendicular to the optical axis.

Table 1 below shows values of each of specifications in Example 1. Surface numbers 1 to 22 in Table 1 correspond to optical surfaces m1 to m22 shown in FIG. 1, respectively.

TABLE 1

[Lens Data]

| Surface Number | R | D | nd | vd |
|---|---|---|---|---|
| 1 | 43.8295 | 1.2000 | 23.78 | 1.846660 |
| 2 | 31.7630 | 10.0000 | 52.34 | 1.755000 |
| 3 | 109.2239 | D3(Variable) | | |
| 4 | 50.1616 | 1.2000 | 31.31 | 1.903660 |
| 5 | 12.0806 | 6.8000 | | |
| 6 | −100.4932 | 1.2000 | 46.51 | 1.804200 |
| 7 | 32.0847 | 0.5000 | | |
| 8 | 22.5028 | 4.0000 | 20.88 | 1.922860 |
| 9 | 10044.2545 | D9(Variable) | | |
| 10 | −38.4460 | 1.0000 | 33.27 | 1.806100 |
| 11 | −83.2624 | D11(Variable) | | |
| 12 | −116.2034 | 1.0000 | 46.51 | 1.804200 |
| 13 | −45.1463 | 1.2000 | | |
| 14 | 14.8637 | 4.0000 | 44.81 | 1.744000 |
| 15 | −18.7249 | 1.0000 | 23.78 | 1.846660 |
| 16 | 228.6540 | 0.6500 | | |
| 17 | ∞ | 8.5459 | (Stop S) | |
| *18 | 248.5826 | 6.8772 | 63.30 | 1.514430 |
| 19 | −7.7669 | 1.0000 | 46.51 | 1.804200 |

TABLE 1-continued

| 20 | −1159.7397 | 0.1000 | | |
| 21 | 33.1411 | 3.0000 | 40.98 | 1.581440 |
| 22 | 3486.3112 | Bf(Variable) | | |

[Aspherical Surface Data]
The 18th Surface

κ = 85.1749
A4 = −7.49845E−05
A6 = −1.69086E−08
A8 = −1.81387E−09
A10 = 7.35712E−11

[Each Group Distance Data]

| | 1-POS | 2-POS | 3-POS |
|---|---|---|---|
| f | 18.40007 | 31.99983 | 52.00012 |
| D0 | 0.0000 | 0.0000 | 0.0000 |
| D3 | 0.79731 | 5.94803 | 26.60122 |
| D9 | 4.43546 | 4.06170 | 5.95917 |
| D11 | 15.72774 | 6.29491 | 2.04800 |
| Bf | 14.76613 | 24.10940 | 26.72106 |

| | 4-POS | 5-POS | 6-POS |
|---|---|---|---|
| β | −0.02509 | −0.02525 | −0.02376 |
| D0 | 711.0157 | 1244.4755 | 2126.1737 |
| D3 | 0.79731 | 5.94803 | 26.60122 |
| D9 | 3.85803 | 3.67322 | 5.50483 |
| D11 | 16.30517 | 6.68339 | 2.50233 |
| Bf | 15.01478 | 24.54574 | 27.38686 |

| | 7-POS | 8-POS | 9-POS |
|---|---|---|---|
| β | −0.05994 | −0.10760 | −0.16713 |
| D0 | 284.6749 | 274.6815 | 248.6892 |
| D3 | 0.79731 | 5.94803 | 26.60122 |
| D9 | 3.05315 | 2.43554 | 2.94824 |
| D11 | 17.11005 | 7.92106 | 5.05893 |
| Bf | 15.35663 | 25.95132 | 31.30984 |

[Various Data]

| f = | 18.4~52.0 |
|---|---|
| FNO = | 3.66~6.00 |
| ω = | 40.37~15.08 |
| Y = | 14.25 |
| TL = | 89.000~114.603 |
| Σd = | 74.234~87.881 |
| Bf = | 14.766~26.721 |

[Lens Group Data]

| Group Number | Group First Surface | Group Focal Length |
|---|---|---|
| G1 | 1 | 97.17640 |
| G2 | 4 | −23.58581 |
| G3 | 10 | −89.49950 |
| G4 | 12 | 19.53948 |

[Conditional Expression Corresponding Value]

Conditional Expression (1): f4/fw = 1.062
Conditional Expression (2): (−f3)/fw = 4.864
Conditional Expression (3): f1/f4 = 4.973
Conditional Expression (4): f2/f3 = 0.264
Conditional Expression (5): (−r)/fw = 0.422
Conditional Expression (6): ωw = 40.37
Conditional Expression (7): ft/fw = 2.826
Conditional Expression (8): VRT = 0.596
Conditional Expression (9): f1/(−f3) = 1.086
Conditional Expression (10): (−f2)/f4 = 1.207
Conditional Expression (11): ft/(−f2) = 2.205
Conditional Expression (12): f4/fw = 1.062
Conditional Expression (13): VRT = 0.596
Conditional Expression (14): f1/f4 = 4.973
Conditional Expression (15): f2/f3 = 0.264

TABLE 1-continued

Conditional Expression (16): (−r)/fw = 0.422
Conditional Expression (17): ωw = 40.37
Conditional Expression (18): ft/fw = 2.826

Table 1 shows that the zoom lens ZL1 according to Example 1 satisfies all of the conditional expressions (1) to (18).

Figure 2B:
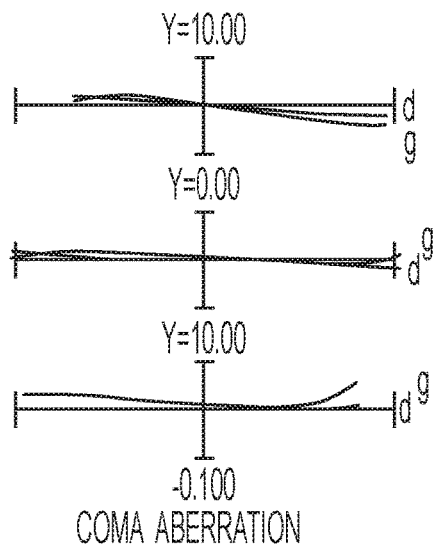
Figure 3:
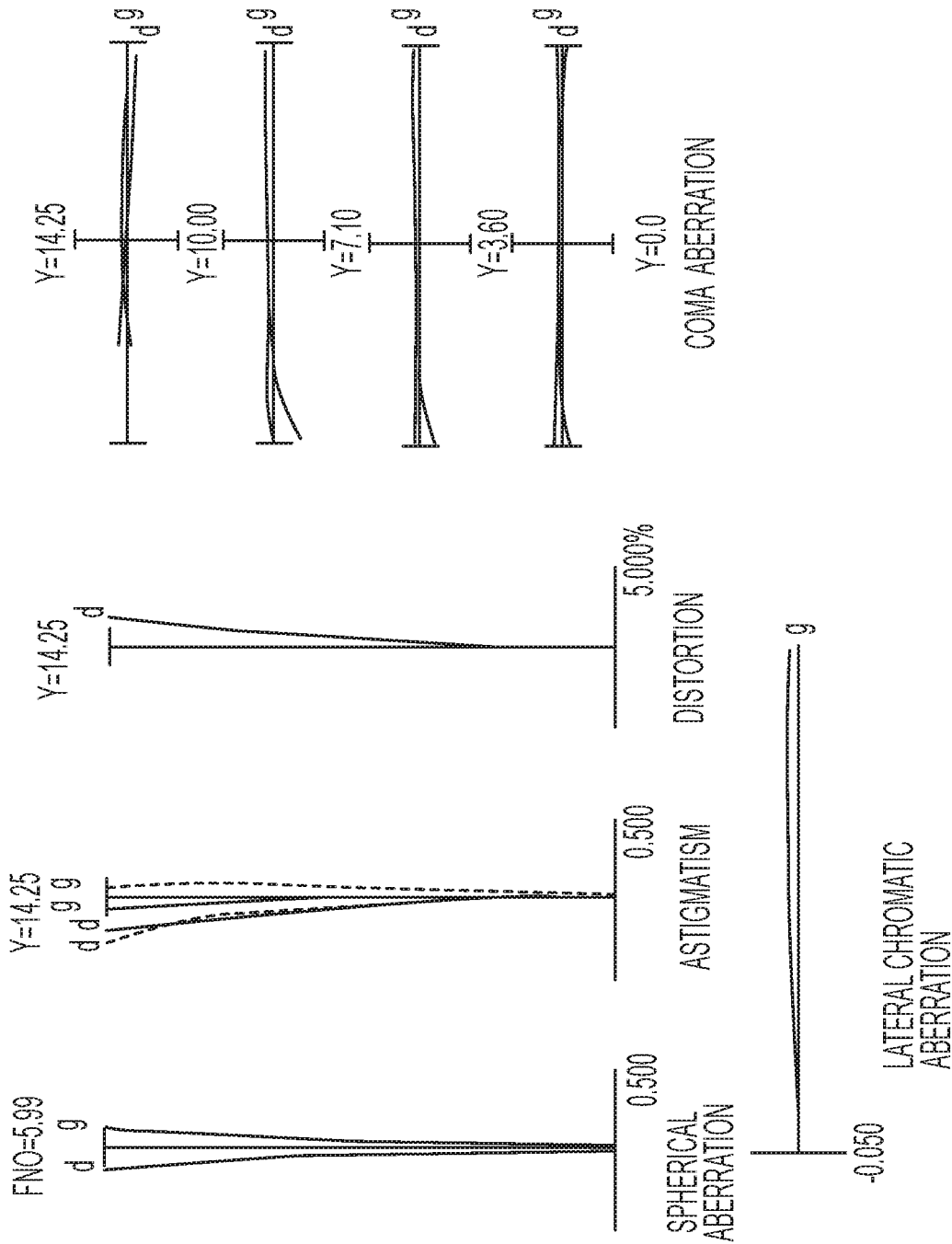
FIG. 3 is graphs showing various aberrations of the zoom lens (according to Example 1) upon focusing on infinity in an intermediate focal length state.
Figure 4A:
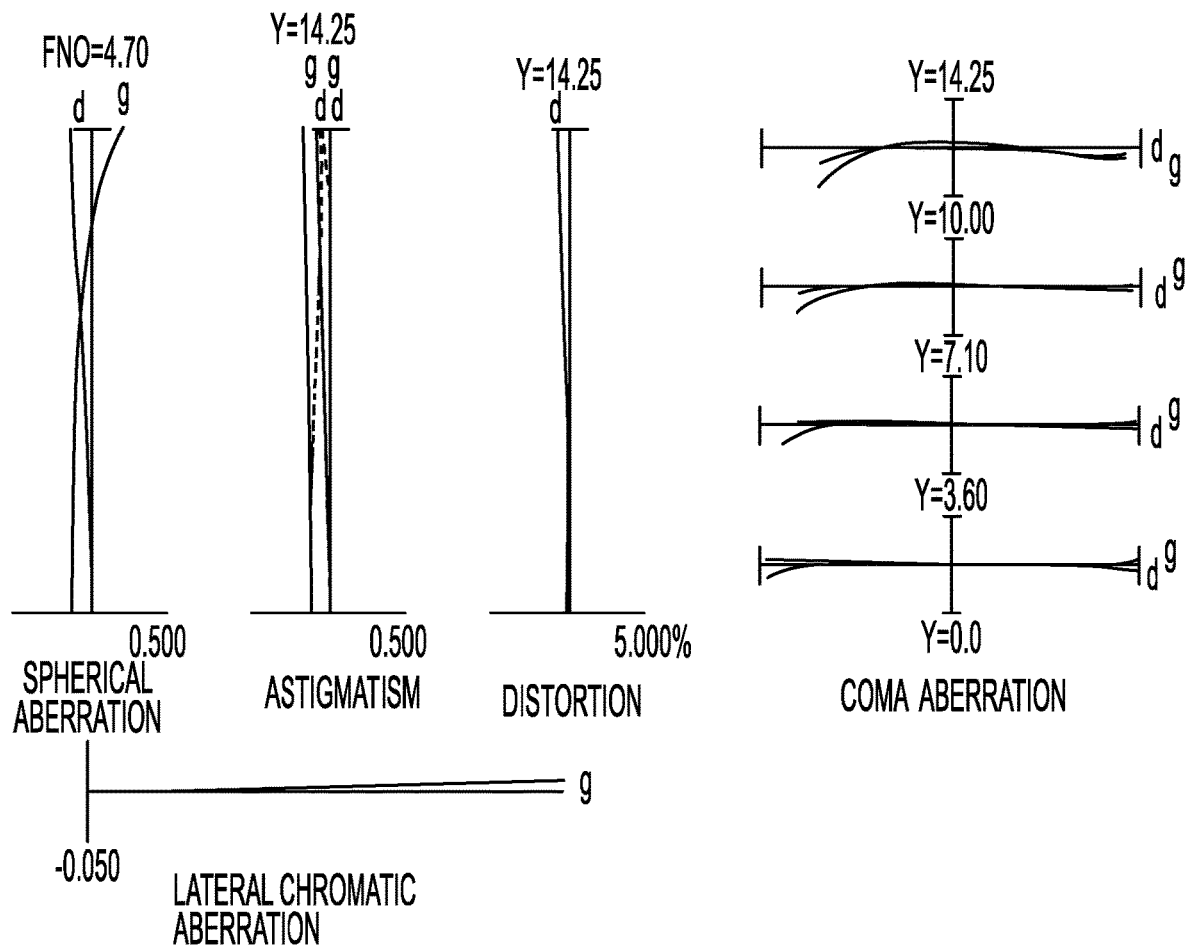
Figure 4B:
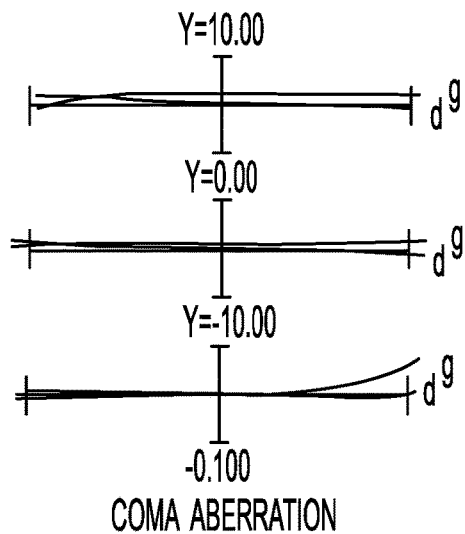

FIG. 2A and FIG. 2B each are graphs showing various aberrations (spherical aberration, astigmatism, distortion, lateral chromatic aberration and coma aberration), and coma aberration when an image blur was corrected (a vibration-proof lens group shift amount=0.332), of the zoom lens ZL1 (according to Example 1) upon focusing on infinity in a wide-angle end state. FIG. 3 is graphs showing various aberrations of the zoom lens ZL1 (according to Example 1) upon focusing on infinity in an intermediate focal length state. FIG. 4A and FIG. 4B each are graphs showing various aberrations (spherical aberration, astigmatism, distortion, lateral chromatic aberration and coma aberration), and coma aberration when an image blur was corrected (a vibration-proof lens group shift amount=0.457) of the zoom lens ZL1 (according to Example 1) upon focusing on infinity in a telephoto end state. In addition, in the present Example 1, as shown in FIG. 2B and FIG. 4B, optical performance upon vibration proofing is shown in graphs showing coma aberration, centering on an image height y=0.0, corresponding to image heights of vertically plus 10.0 and minus 10.0.

In each graph showing aberration, FNO denotes an F-number, Y denotes an image height, d denotes aberration in a d-line, and g denotes aberration in a g-line. In addition, in the graph showing spherical aberration, a value of an F-number corresponding to a maximum aperture is shown, and in the graphs showing astigmatism graph and distortion, a maximum value of an image height is shown. In the graphs showing astigmatism, a solid line indicates a sagittal image surface and a broken line indicates a meridional image surface. In the graph showing coma aberration, a solid line indicates a meridional image surface. The description of the graphs showing aberration as described above is regarded to be the same also in other Examples, and the description is omitted.

From each of the graphs showing aberration shown in FIGS. 2A and 2B, FIG. 3 and FIGS. 4A and 4B, the zoom lens ZL1 according to Example 1 is found to have excellent optical performance in which various aberrations including spherical aberration, curvature of field, astigmatism, coma aberration, and the like are successfully corrected.

Example 2

Example 2 will be described using FIG. 5, FIGS. 6A and 6B, FIG. 7, FIGS. 8A and 8B and Table 2. As shown in FIG. 5, a zoom lens ZL (ZL2) according to Example 2 is configured of, disposed in order from an object, a first lens group G1 having positive refractive power, a second lens group G2 having negative refractive power, a third lens group G3 having negative refractive power, and a fourth lens group G4 having positive refractive power.

The first lens group G1 is configured of, disposed in order from the object, a cemented positive lens formed by cementing a negative meniscus lens L11 having a convex surface facing the object and a positive meniscus lens L12 having a convex surface facing the object.

The second lens group G2 is configured of, disposed in order from the object, a negative meniscus lens L21 having a convex surface facing the object, a negative meniscus lens L22 having a convex surface facing the object, and a positive meniscus lens L23 having a convex surface facing the object.

The third lens group G3 is configured of a negative meniscus lens L31 having a concave surface facing the object.

The fourth lens group G4 is configured of, disposed in order from the object, a positive meniscus lens L41 having a convex surface facing an image, a cemented positive lens formed by cementing a positive lens L42 having a biconvex shape and a negative meniscus lens L43 having a concave surface facing the object, an aperture stop S determining an F-number, and a cemented negative lens formed by cementing a positive lens L44 provided with an aspherical surface to the object and a negative lens L45 having a concave surface facing the object, and a positive lens L46 having a biconvex shape.

An image surface I is formed on an imaging element (not shown), and the imaging element is configured of a CCD, a CMOS, and the like.

In the zoom lens ZL2 according to Example 2, zooming from a wide-angle end state to a telephoto end state is made by varying an air distance between the first lens group G1 and the second lens group G2, an air distance between the second lens group G2 and the third lens group G3 and an air distance between the third lens group G3 and the fourth lens group G4. At this time, relative to the image surface I, the first lens group G1 moves to the object, the second lens group G2 moves along an optical axis so as to draw a convex track to the image, the third lens group G3 moves to the image, and the fourth lens group G4 moves to the object. The aperture stop S moves to the object integrally with the fourth lens group G4 upon zooming.

Moreover, the zoom lens ZL2 has a configuration in which focusing is made by moving the third lens group G3 along an optical axis direction. As shown by an arrow in FIG. 5, upon causing change from a state of focusing on a long distant object to a state of focusing on a short distant object, the third lens group G3 moves from the image to the object.

Moreover, upon occurrence of an image blur, correction of the image blur on the image surface I is made by moving, as a vibration-proof lens, the positive meniscus lens L41 of the fourth lens group G4 so as to have a component in a direction perpendicular to the optical axis.

Table 2 below shows values of each of specifications in Example 2. Surface numbers 1 to 22 in Table 2 correspond to optical surfaces m1 to m22 shown in FIG. 5, respectively.

TABLE 2

[Lens Data]

| Surface Number | R | D | nd | vd |
|---|---|---|---|---|
| 1 | 45.9725 | 1.2000 | 23.78 | 1.846660 |
| 2 | 32.4747 | 9.0000 | 52.34 | 1.755000 |
| 3 | 116.1757 | D3(Variable) | | |
| 4 | 30.2911 | 1.2000 | 31.31 | 1.903660 |
| 5 | 12.6889 | 8.0000 | | |
| 6 | 376.8193 | 1.2000 | 46.51 | 1.804200 |
| 7 | 17.0572 | 1.0000 | | |
| 8 | 17.4828 | 4.5000 | 20.88 | 1.922860 |
| 9 | 97.6208 | D9(Variable) | | |
| 10 | −46.5874 | 1.0000 | 33.27 | 1.806100 |
| 11 | −216.5990 | D11(Variable) | | |
| 12 | −207.7276 | 1.0000 | 46.51 | 1.804200 |

TABLE 2-continued

| 13 | −89.3144 | 1.2000 | | |
| 14 | 13.2573 | 3.5000 | 44.81 | 1.744000 |
| 15 | −14.4070 | 0.8000 | 23.78 | 1.846660 |
| 16 | −245.5609 | 2.0000 | | |
| 17 | ∞ | 5.7557 | (Stop S) | |
| *18 | −72.5541 | 8.0000 | 63.88 | 1.516800 |
| 19 | −8.6684 | 1.0000 | 46.59 | 1.816000 |
| 20 | 692.0816 | 0.1000 | | |
| 21 | 36.4834 | 2.8000 | 38.03 | 1.603420 |
| 22 | −127.2725 | Bf(Variable) | | |

[Aspherical Surface Data]
The 18th Surface

κ = 85.1749
A4 = −1.50694E−04
A6 = −1.49843E−06
A8 = −1.81387E−09
A10 = −4.41763E−10

[Each Group Distance Data]

| | 1-POS | 2-POS | 3-POS |
|---|---|---|---|
| f | 18.40098 | 31.99898 | 52.00021 |
| D0 | 0.0000 | 0.0000 | 0.0000 |
| D3 | 0.79731 | 5.94803 | 26.60122 |
| D9 | 4.43546 | 4.06170 | 5.95917 |
| D11 | 15.72774 | 6.29491 | 2.04800 |
| Bf | 14.78536 | 23.94059 | 27.28426 |

| | 4-POS | 5-POS | 6-POS |
|---|---|---|---|
| β | −0.02498 | −0.02517 | −0.02368 |
| D0 | 711.0157 | 1244.4755 | 2126.1737 |
| D3 | 0.79731 | 5.94803 | 26.60122 |
| D9 | 3.85803 | 3.67322 | 5.50483 |
| D11 | 16.30517 | 6.68339 | 2.50233 |
| Bf | 15.00997 | 24.33266 | 27.85182 |

| | 7-POS | 8-POS | 9-POS |
|---|---|---|---|
| β | −0.05931 | −0.10612 | −0.16320 |
| D0 | 284.6749 | 274.6815 | 248.6892 |
| D3 | 0.79731 | 5.94803 | 26.60122 |
| D9 | 3.05315 | 2.43554 | 2.94824 |
| D11 | 17.11005 | 7.92106 | 5.05893 |
| Bf | 15.31172 | 25.56164 | 31.07180 |

[Various Data]

f = 18.4~52.0
FNO = 3.64~5.90
ω = 38.66~15.00
Y = 14.25
TL = 89.002~115.148
Σd = 74.216~87.864
Bf = 14.785~27.284

[Lens Group Data]

| Group Number | Group First Surface | Group Focal Length |
|---|---|---|
| G1 | 1 | 102.79844 |
| G2 | 4 | −25.94477 |
| G3 | 10 | −73.82428 |
| G4 | 12 | 19.16986 |

[Conditional Expression Corresponding Value]

Conditional Expression (1): f4/fw = 1.042
Conditional Expression (2): (−f3)/fw = 4.012
Conditional Expression (3): f1/f4 = 5.362
Conditional Expression (4): f2/f3 = 0.351
Conditional Expression (5): (−r)/fw = 0.471
Conditional Expression (6): ωw = 38.66
Conditional Expression (7): ft/fw = 2.826
Conditional Expression (8): VRT = 0.275

TABLE 2-continued

Conditional Expression (9): f1/(−f3) = 1.392
Conditional Expression (10): (−f2)/f4 = 1.353
Conditional Expression (11): ft/(−f2) = 2.004
Conditional Expression (12): f4/fw = 1.042
Conditional Expression (13): VRT = 0.275
Conditional Expression (14): f1/f4 = 5.362
Conditional Expression (15): f2/f3 = 0.351
Conditional Expression (16): (−r)/fw = 0.471
Conditional Expression (17): ωw = 38.66
Conditional Expression (18): ft/fw = 2.826

Table 2 shows that the zoom lens ZL2 according to Example 2 satisfies all of the conditional expressions (1) to (18).

Figure 6A:
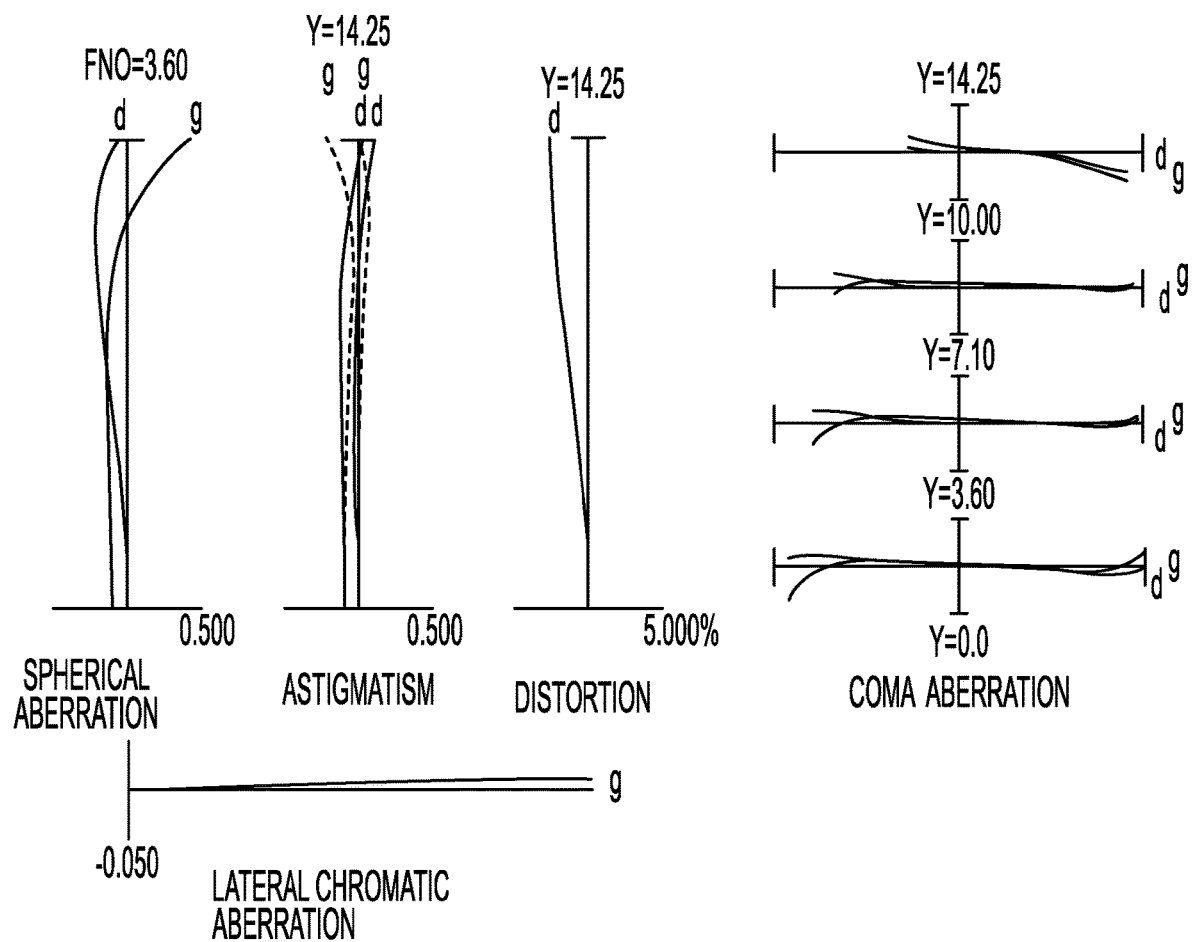
Figure 6B:
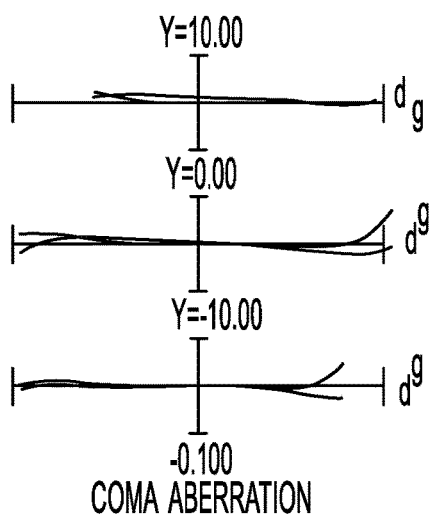
Figure 7:
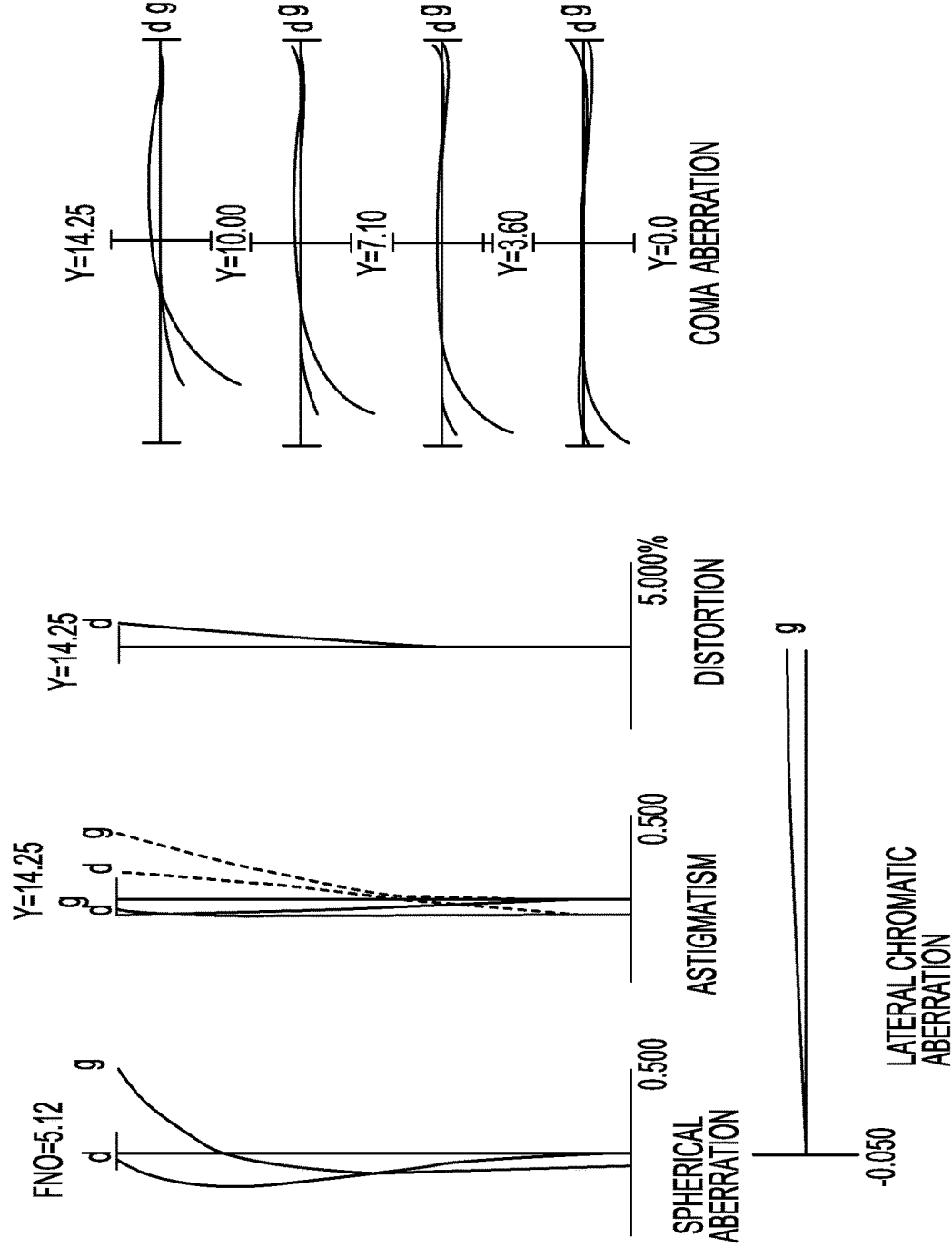
FIG. 7 is graphs showing various aberrations of the zoom lens (according to Example 2) upon focusing on infinity in an intermediate focal length state.
Figure 8A:
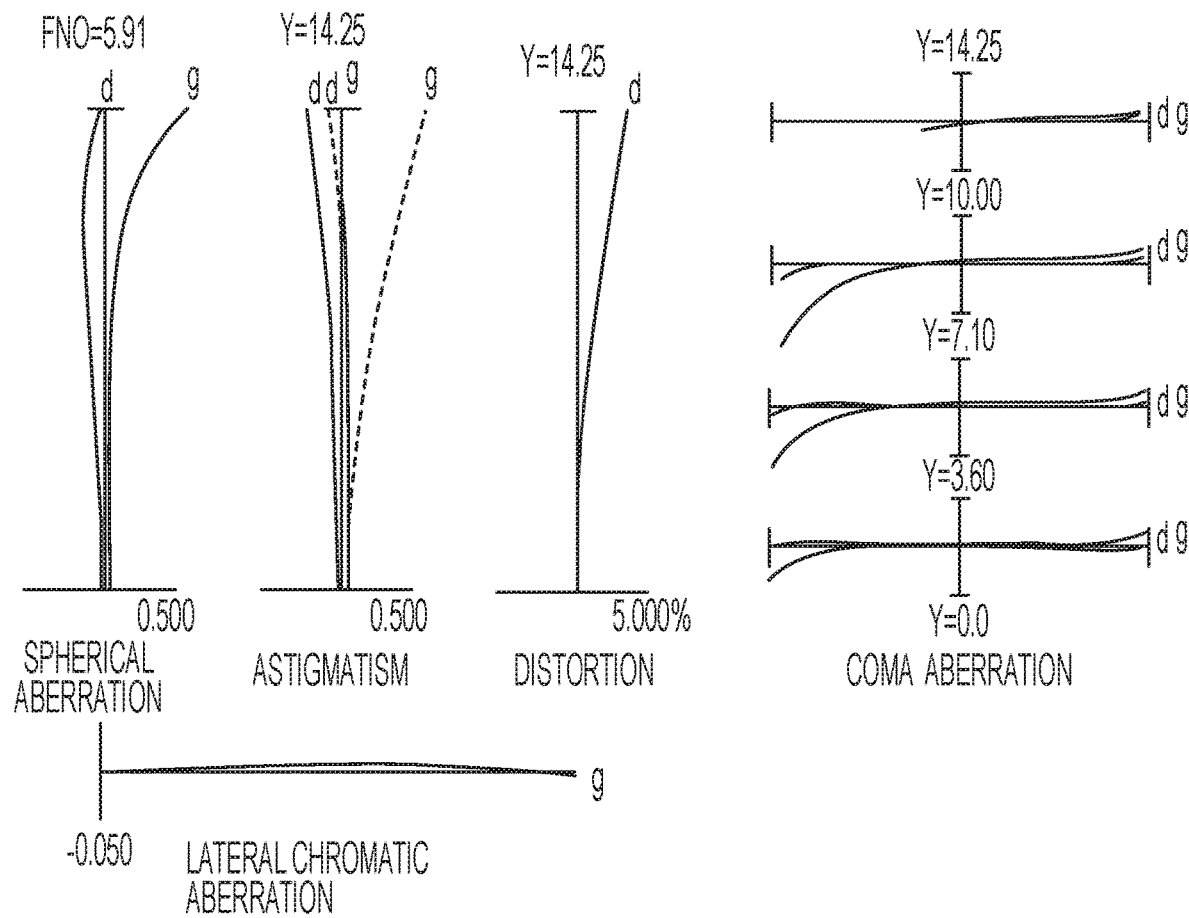
Figure 8B:
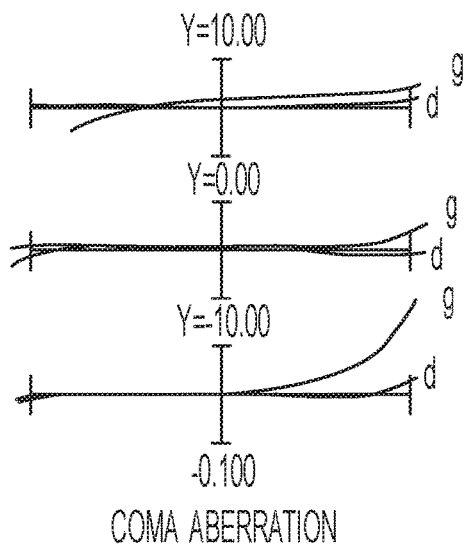

FIG. 6A and FIG. 6B each are graphs showing various aberrations (spherical aberration, astigmatism, distortion, lateral chromatic aberration and coma aberration), and drawings showing coma aberration when an image blur was corrected (a vibration-proof lens group shift amount=0.733), of the zoom lens ZL2 (according to Example 2) upon focusing on infinity in a wide-angle end state. FIG. 7 is graphs showing various aberrations of the zoom lens ZL2 (according to Example 2) upon focusing on infinity in an intermediate focal length state. FIG. 8A, and FIG. 8B each are graphs showing various aberrations (spherical aberration, astigmatism, distortion, lateral chromatic aberration and coma aberration), and graphs showing coma aberration when an image blur was corrected (a vibration-proof lens group shift amount=0.992), of the zoom lens ZL2 (according to Example 2) upon focusing on infinity in a telephoto end state. In addition, in Example 2, as shown in FIG. 6B and FIG. 8B, optical performance upon vibration proofing is shown in graphs showing coma aberration, centering on an image height y=0.0, corresponding to image heights of vertically plus 10.0 and minus 10.0.

From each of the graphs showing aberration shown in FIGS. 6A and 6B, FIG. 7 and FIGS. 8A and 8B, the zoom lens ZL2 according to Example 2 is found to have excellent optical performance in which various aberrations including spherical aberration, curvature of field, astigmatism, coma aberration, and the like are successfully corrected.

Example 3

Example 3 will be described using FIG. 9, FIGS. 10A and 10B, FIG. 11, FIGS. 12A and 12B and Table 3. As shown in FIG. 9, a zoom lens ZL (ZL3) according to Example 3 is configured of, disposed in order from an object, a first lens group G1 having positive refractive power, a second lens group G2 having negative refractive power, a third lens group G3 having negative refractive power, and a fourth lens group G4 having positive refractive power.

The first lens group G1 is configured of, disposed in order from the object, a cemented positive lens formed by cementing a negative meniscus lens L11 having a convex surface facing the object and a positive meniscus lens L12 having a convex surface facing the object.

The second lens group G2 is configured of, disposed in order from the object, a negative meniscus lens L21 having a convex surface facing the object, a negative meniscus lens L22 having a convex surface facing the object, and a positive meniscus lens L23 having a convex surface facing the object.

The third lens group G3 is configured of a negative lens L31 having a biconcave shape.

The fourth lens group G4 is configured of, disposed in order from the object, a positive meniscus lens L41 having a biconvex shape, a cemented positive lens formed by cementing a positive lens L42 having a biconvex shape and a negative lens L43 having a biconcave shape, an aperture stop S determining an F-number, a positive lens L44 provided with aspherical surfaces on both sides, a cemented negative lens formed by cementing a positive meniscus lens L45 having a concave surface facing the object and a negative lens L46 having a concave surface facing the object, and a positive lens L47 having a biconvex shape.

An image surface I is formed on an imaging element (not shown), and the imaging element is configured of a CCD, a CMOS, and the like.

In the zoom lens ZL3 according to Example 3, zooming from a wide-angle end state to a telephoto end state is made by varying an air distance between the first lens group G1 and the second lens group G2, an air distance between the second lens group G2 and the third lens group G3 and an air distance between the third lens group G3 and the fourth lens group G4. At this time, relative to the image surface I, the first lens group G1 moves to the object, the second lens group G2 moves to the image, the third lens group G3 moves to the image, and the fourth lens group G4 moves to the object. The aperture stop S moves to the object integrally with the fourth lens group G4 upon zooming.

Moreover, the zoom lens ZL3 has a configuration in which focusing is made by moving the third lens group G3 along an optical axis direction. As shown by an arrow in FIG. 9, upon causing a change from a state of focusing on a long distant object to a state of focusing on a short distant object, the third lens group G3 moves from the image to the object.

Moreover, upon occurrence of an image blur, correction of the image blur on the image surface I is made by moving, as a vibration-proof lens, the positive meniscus lens L41 of the fourth lens group G4 so as to have a component in a direction perpendicular to the optical axis.

Table 3 below shows values of each of specifications in Example 3. Surface numbers 1 to 24 in Table 3 correspond to optical surfaces m1 to m24 in FIG. 9, respectively.

TABLE 3

[Lens Data]

| Surface Number | R | D | nd | vd |
|---|---|---|---|---|
| 1 | 38.2502 | 1.2000 | 23.78 | 1.846660 |
| 2 | 26.7321 | 9.0000 | 52.34 | 1.755000 |
| 3 | 70.8740 | D3(Variable) | | |
| 4 | 30.2911 | 1.0000 | 31.31 | 1.903660 |
| 5 | 12.6889 | 6.0000 | | |
| 6 | 35.9312 | 1.0000 | 46.51 | 1.804200 |
| 7 | 17.1890 | 1.0000 | | |
| 8 | 16.2094 | 4.0000 | 20.88 | 1.922860 |
| 9 | 59.1857 | D9(Variable) | | |
| 10 | −45.6003 | 1.0000 | 33.27 | 1.806100 |
| 11 | 98.5667 | D11(Variable) | | |
| 12 | 53.9062 | 1.0000 | 46.51 | 1.804200 |
| 13 | −107.1675 | 0.7000 | | |
| 14 | 9.1711 | 2.6000 | 52.34 | 1.755000 |
| 15 | −24.2257 | 0.6000 | 23.78 | 1.846660 |
| 16 | 41.5680 | 1.0000 | | |
| 17 | ∞ | 1.8944 | (Stop S) | |
| *18 | 199.8522 | 1.0000 | 63.88 | 1.516800 |
| *19 | −100.0000 | 1.0000 | | |
| 20 | −27.5815 | 3.9125 | 58.82 | 1.518230 |
| 21 | −3.8056 | 1.0000 | 46.59 | 1.816000 |
| 22 | 114.5395 | 0.1000 | | |

TABLE 3-continued

| | | | | |
|---|---|---|---|---|
| 23 | 36.4834 | 2.3000 | 33.73 | 1.647690 |
| 24 | −48.3556 | Bf(Variable) | | |

[Aspherical Surface Data]

The 18th Surface $\kappa = 85.1749$
$A4 = 6.74722E-04$
$A6 = 2.72415E-05$
$A8 = -1.81387E-09$
$A10 = -2.78024E-07$ The 19th Surface $\kappa = 1.0000$
$A4 = 4.93035E-04$
$A6 = 5.50621E-05$
$A8 = -3.63208E-06$
$A10 = -3.05333E-07$

[Each Group Distance Data]

| | 1-POS | 2-POS | 3-POS |
|---|---|---|---|
| f | 18.40085 | 31.99789 | 52.00054 |
| D0 | 0.0000 | 0.0000 | 0.0000 |
| D3 | 0.28473 | 5.43545 | 26.08863 |
| D9 | 3.12280 | 2.74904 | 4.64651 |
| D11 | 14.83468 | 5.40185 | 1.15494 |
| Bf | 10.46191 | 16.23636 | 18.16125 |

| | 4-POS | 5-POS | 6-POS |
|---|---|---|---|
| β | −0.02493 | −0.02524 | −0.02382 |
| D0 | 711.0157 | 1244.4755 | 2126.1737 |
| D3 | 0.28473 | 5.43545 | 26.08863 |
| D9 | 2.54537 | 2.36056 | 4.19217 |
| D11 | 15.41210 | 5.79032 | 1.60927 |
| Bf | 10.69526 | 16.64712 | 18.79284 |

| | 7-POS | 8-POS | 9-POS |
|---|---|---|---|
| β | −0.05904 | −0.10716 | −0.16767 |
| D0 | 284.6749 | 274.6815 | 248.6892 |
| D3 | 0.28473 | 5.43545 | 26.08863 |
| D9 | 1.74049 | 1.12288 | 1.63558 |
| D11 | 16.21699 | 7.02800 | 4.16587 |
| Bf | 10.99595 | 17.89061 | 22.15847 |

[Various Data]

| | |
|---|---|
| f = | 18.4~52.0 |
| FNO = | 3.53~5.62 |
| ω = | 38.36~14.11 |
| Y = | 14.25 |
| TL = | 70.545~91.358 |
| Σd = | 59.549~73.197 |
| Bf = | 10.462~18.161 |

[Lens Group Data]

| Group Number | Group First Surface | Group Focal Length |
|---|---|---|
| G1 | 1 | 107.75402 |
| G2 | 4 | −60.57702 |
| G3 | 10 | −38.55679 |
| G4 | 12 | 15.00386 |

[Conditional Expression Corresponding Value]

Conditional Expression (1): f4/fw = 0.815
Conditional Expression (2): (−f3)/fw = 2.095
Conditional Expression (3): f1/f4 = 7.182
Conditional Expression (4): f2/f3 = 1.571
Conditional Expression (5): (−r)/fw = 0.207
Conditional Expression (6): ωw = 38.36
Conditional Expression (7): ft/fw = 2.826
Conditional Expression (8): VRT = 0.924

TABLE 3-continued

Conditional Expression (10): (−f2)/f4 = 4.037
Conditional Expression (12): f4/fw = 0.815
Conditional Expression (13): VRT = 0.924
Conditional Expression (14): f1/f4 = 7.182
Conditional Expression (15): f2/f3 = 1.571
Conditional Expression (16): (−r)/fw = 0.207
Conditional Expression (17): ωw = 38.36
Conditional Expression (18): ft/fw = 2.826

Table 3 shows that the zoom lens ZL3 according to Example 3 satisfies all of the conditional expressions (1) to (8), (10) and (12) to (18).

Figure 10A:
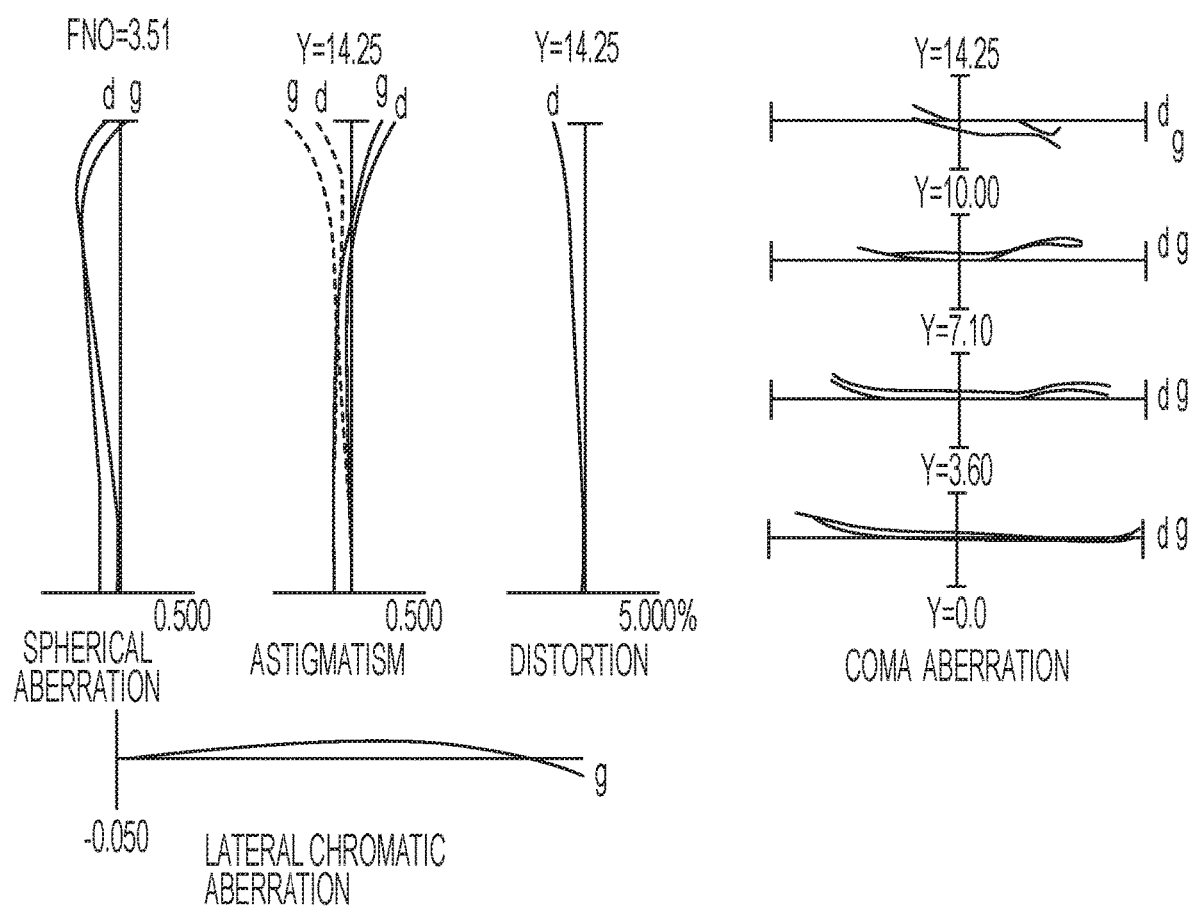
Figure 10B:
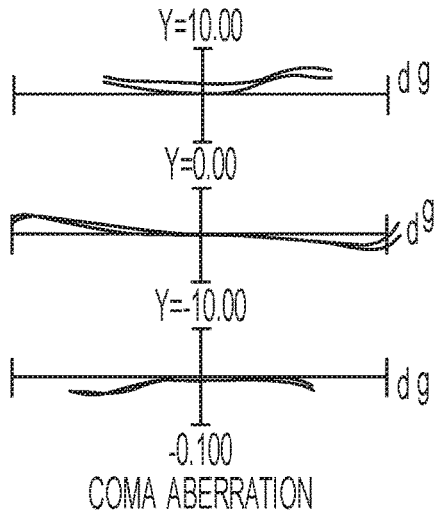
Figure 12A:
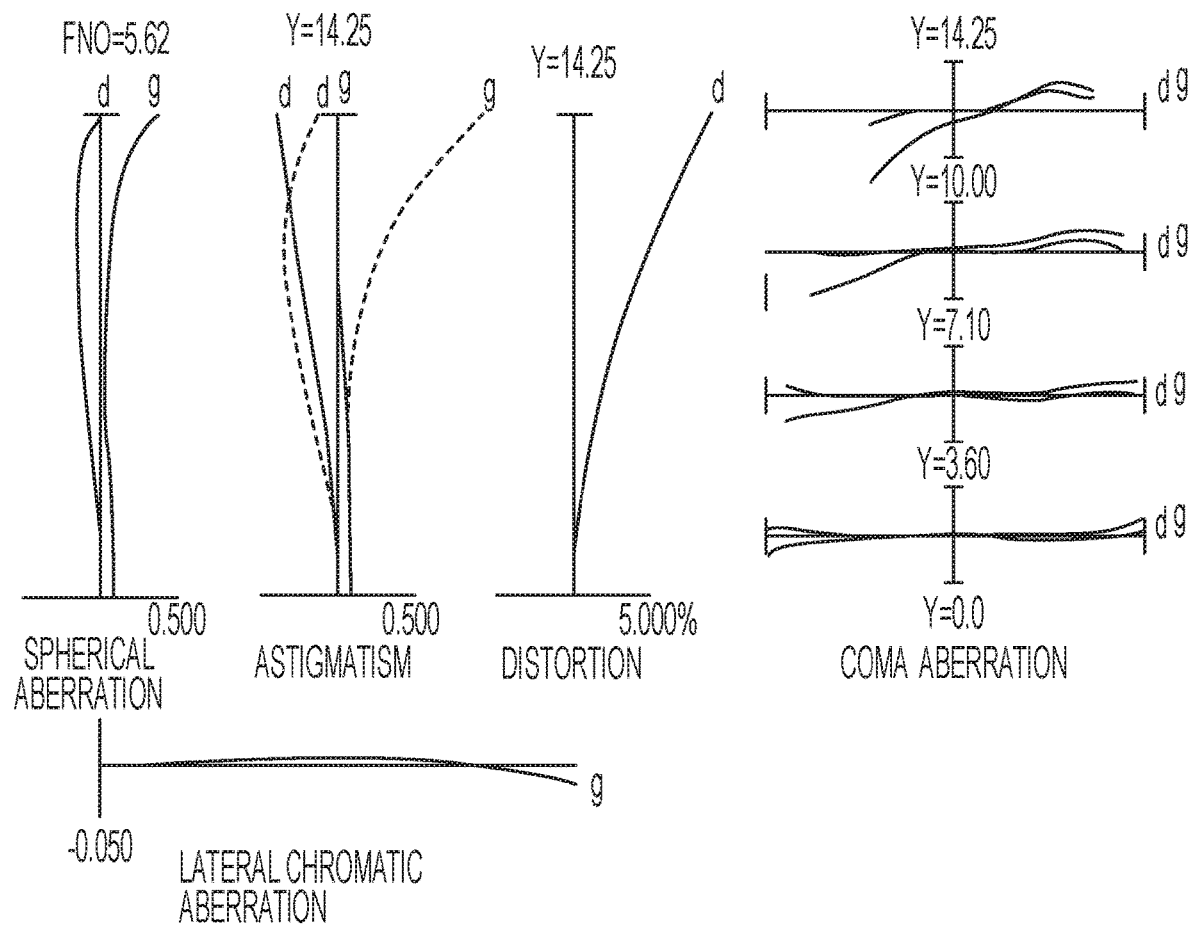
Figure 12B:
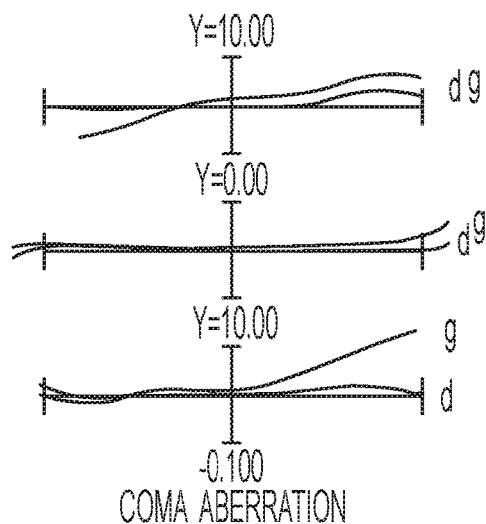

FIG. 10A and FIG. 10B each are graphs showing various aberrations (spherical aberration, astigmatism, distortion, lateral chromatic aberration and coma aberration), and graphs showing coma aberration when an image blur was corrected (a vibration-proof lens group shift amount=0.216), of the zoom lens ZL3 (according to Example 3) upon focusing on infinity in a wide-angle end state. FIG. 11 is graphs showing various aberrations of the zoom lens ZL3 (according to Example 3) upon focusing on infinity in an intermediate focal length state. FIG. 12A and FIG. 12B each are graphs showing various aberrations (spherical aberration, astigmatism, distortion, lateral chromatic aberration and coma aberration), and graphs showing coma aberration when an image blur was corrected (a vibration-proof lens group shift amount=0.295), of the zoom lens ZL3 (according to Example 3) upon focusing on infinity in a telephoto end state. Moreover, in Example 3, as shown in FIG. 10B and FIG. 12B, optical performance upon vibration proofing is shown in graphs showing coma aberration, centering on an image height y=0.0, corresponding to image heights of vertically plus 10.0 and minus 10.0.

From each of the graphs showing aberration shown in FIGS. 10A and 10B, FIG. 11 and FIGS. 12A and 12B, the zoom lens ZL3 according to Example 3 is found to have excellent optical performance in which various aberrations including spherical aberration, curvature of field, astigmatism, coma aberration, and the like are successfully corrected.

Example 4

Example 4 will be described using FIG. 13, FIGS. 14A and 14B, FIG. 15, FIGS. 16A and 16B and Table 4. As shown in FIG. 13, a zoom lens ZL (ZL4) according to Example 4 is configured of, disposed in order from an object, a first lens group G1 having positive refractive power, a second lens group G2 having negative refractive power, a third lens group G3 having negative refractive power, and a fourth lens group G4 having positive refractive power.

The first lens group G1 is configured of, disposed in order from the object, a cemented positive lens formed by cementing a negative meniscus lens L11 having a convex surface facing the object and a positive lens L12 having a biconvex shape.

The second lens group G2 is configured of, disposed in order from the object, a negative meniscus lens L21 having a convex surface facing the object and provided with an aspherical surface to the object, a negative meniscus lens L22 having a convex surface facing an image, and a positive lens L23 having a biconvex shape.

The third lens group G3 is configured of a negative lens L31 having a biconcave shape.

The fourth lens group G4 is configured of, disposed in order from the object, a positive meniscus lens L41 having a convex surface facing the object, a cemented positive lens formed by cementing a positive lens L42 having a biconvex shape and a negative lens L43 having a biconcave shape, an aperture stop S determining an F-number, a positive lens L44 provided with aspherical surfaces on both sides, a cemented negative lens formed by cementing a positive meniscus lens L45 having a concave surface facing the object and a negative meniscus lens L46 having a concave surface facing the object, and a positive lens L47 having a biconvex shape.

An image surface I is formed on an imaging element (not shown), and the imaging element is configured of a CCD, a CMOS, and the like.

In the zoom lens ZL4 according to Example 4, zooming from a wide-angle end state to a telephoto end state is made by varying an air distance between the first lens group G1 and the second lens group G2, an air distance between the second lens group G2 and the third lens group G3 and an air distance between the third lens group G3 and the fourth lens group G4. At this time, relative to the image surface I, the first lens group G1 moves to the object, the second lens group G2 moves along an optical axis so as to draw a convex track to the image, the third lens group G3 moves along an optical axis so as to draw a convex track to the image, and the fourth lens group G4 moves to the object. The aperture stop S moves to the object integrally with the fourth lens group G4 upon zooming.

Moreover, the zoom lens ZL4 has a configuration in which focusing is made by moving the third lens group G3 along an optical axis direction. As shown by an arrow in FIG. 13, upon causing change from a state of focusing on a long distant object to a state of focusing on a short distant object, the third lens group G3 moves from the image to the object.

Moreover, upon occurrence of an image blur, correction of the image blur on the image surface I is made by moving, as a vibration-proof lens, the positive meniscus lens L41 of the fourth lens group G4 so as to have a component in a direction perpendicular to the optical axis.

Table 4 below shows values of each of specifications in Example 4. Surface numbers 1 to 24 in Table 4 correspond to optical surfaces m1 to m24 shown in FIG. 13, respectively.

TABLE 4

[Lens Data]

| Surface Number | R | D | nd | vd |
|---|---|---|---|---|
| 1 | 117.0356 | 1.2000 | 23.78 | 1.846660 |
| 2 | 55.9729 | 5.0000 | 52.34 | 1.755000 |
| 3 | −643.8314 | D3(Variable) | | |
| *4 | 35.8382 | 1.0000 | 31.31 | 1.903660 |
| 5 | 14.3439 | 7.0000 | | |
| 6 | −34.7156 | 1.0000 | 46.51 | 1.804200 |
| 7 | −191.4209 | 0.1000 | | |
| 8 | 25.5833 | 3.8000 | 20.88 | 1.922860 |
| 9 | −101.7184 | D9(Variable) | | |
| 10 | −33.0329 | 1.0000 | 33.27 | 1.806100 |
| 11 | 76.6963 | D11(Variable) | | |
| 12 | 28.6596 | 1.0000 | 46.51 | 1.804200 |
| 13 | 321.1835 | 0.7000 | | |
| 14 | 11.0584 | 2.6000 | 52.34 | 1.755000 |
| 15 | −30.7509 | 0.6000 | 23.78 | 1.846660 |
| 16 | 34.0209 | 1.0000 | | |
| 17 | ∞ | 4.3637 | (Stop S) | |

TABLE 4-continued

| *18 | −213.7328 | 1.0000 | 63.88 | 1.516800 |
|---|---|---|---|---|
| *19 | −32.7498 | 1.0000 | | |
| 20 | −18.3365 | 4.0000 | 58.82 | 1.518230 |
| 21 | −4.8697 | 1.0000 | 46.59 | 1.816000 |
| 22 | −214.8274 | 0.1000 | | |
| 23 | 35.1245 | 2.0000 | 32.35 | 1.850260 |
| 24 | −88.3809 | Bf(Variable) | | |

[Aspherical Surface Data]

The 4th Surface $\kappa = 0.8118$
$A4 = 3.23414E{-}06$
$A6 = -6.04464E{-}08$
$A8 = 3.00631E{-}10$
$A10 = -5.96901E{-}13$ The 18th Surface $\kappa = 1.0000$
$A4 = 7.12812E{-}04$
$A6 = 1.59375E{-}05$
$A8 = -4.04113E{-}07$
$A10 = 4.21273E{-}08$ The 19th Surface $\kappa = 1.0000$
$A4 = 8.03440E{-}04$
$A6 = 1.64331E{-}05$
$A8 = -4.58692E{-}07$
$A10 = 4.02611E{-}08$

[Each Group Distance Data]

| | 1-POS | 2-POS | 3-POS |
|---|---|---|---|
| f | 18.40048 | 31.98644 | 52.00321 |
| D0 | 0.0000 | 0.0000 | 0.0000 |
| D3 | 0.80071 | 5.95143 | 26.60461 |
| D9 | 2.13426 | 1.76050 | 3.65797 |
| D11 | 15.05176 | 5.61892 | 1.37201 |
| Bf | 12.55463 | 20.48689 | 26.87882 |

| | 4-POS | 5-POS | 6-POS |
|---|---|---|---|
| β | −0.02500 | −0.02500 | −0.02500 |
| D0 | 698.7959 | 1233.7370 | 1987.5917 |
| D3 | 0.80071 | 5.95143 | 26.60461 |
| D9 | 1.23465 | 1.19556 | 3.12930 |
| D11 | 15.95137 | 6.18386 | 1.90069 |
| Bf | 12.55463 | 20.48689 | 26.87882 |

| | 7-POS | 8-POS | 9-POS |
|---|---|---|---|
| β | −0.02758 | −0.03290 | −0.11767 |
| D0 | 629.9950 | 926.7186 | 352.0229 |
| D3 | 0.80071 | 5.95143 | 26.60461 |
| D9 | 1.14204 | 1.01750 | 1.18983 |
| D11 | 16.04397 | 6.36193 | 3.84015 |
| Bf | 12.55463 | 20.48689 | 26.87882 |

[Various Data]

f = 18.4~52.0
FNO = 3.61~5.91
ω = 40.53~14.49
Y = 14.25
TL = 70.005~97.977
Σd = 57.450~71.098
Bf = 12.555~26.879

[Lens Group Data]

| Group Number | Group First Surface | Group Focal Length |
|---|---|---|
| G1 | 1 | 148.08761 |
| G2 | 4 | −494.72518 |

TABLE 4-continued

| | | |
|---|---|---|
| G3 | 10 | −28.52640 |
| G4 | 12 | 16.63602 |

[Conditional Expression Corresponding Value]

Conditional Expression (1): f4/fw = 0.904
Conditional Expression (2): (−f3)/fw = 1.550
Conditional Expression (3): f1/f4 = 8.902
Conditional Expression (4): f2/f3 = 17.343
Conditional Expression (5): (−r)/fw = 0.265
Conditional Expression (6): ωw = 40.53
Conditional Expression (7): ft/fw = 2.826
Conditional Expression (8): VRT = 1.358
Conditional Expression (12): f4/fw = 0.904
Conditional Expression (13): VRT = 1.358
Conditional Expression (14): f1/f4 = 8.902
Conditional Expression (15): f2/f3 = 17.343
Conditional Expression (16): (−r)/fw = 0.265
Conditional Expression (17): ωw = 40.53
Conditional Expression (18): ft/fw = 2.826

Table 4 shows that the zoom lens ZL4 according to Example 4 satisfies all of the conditional expressions (1) to (8), and (12) to (18).

Figure 14A:
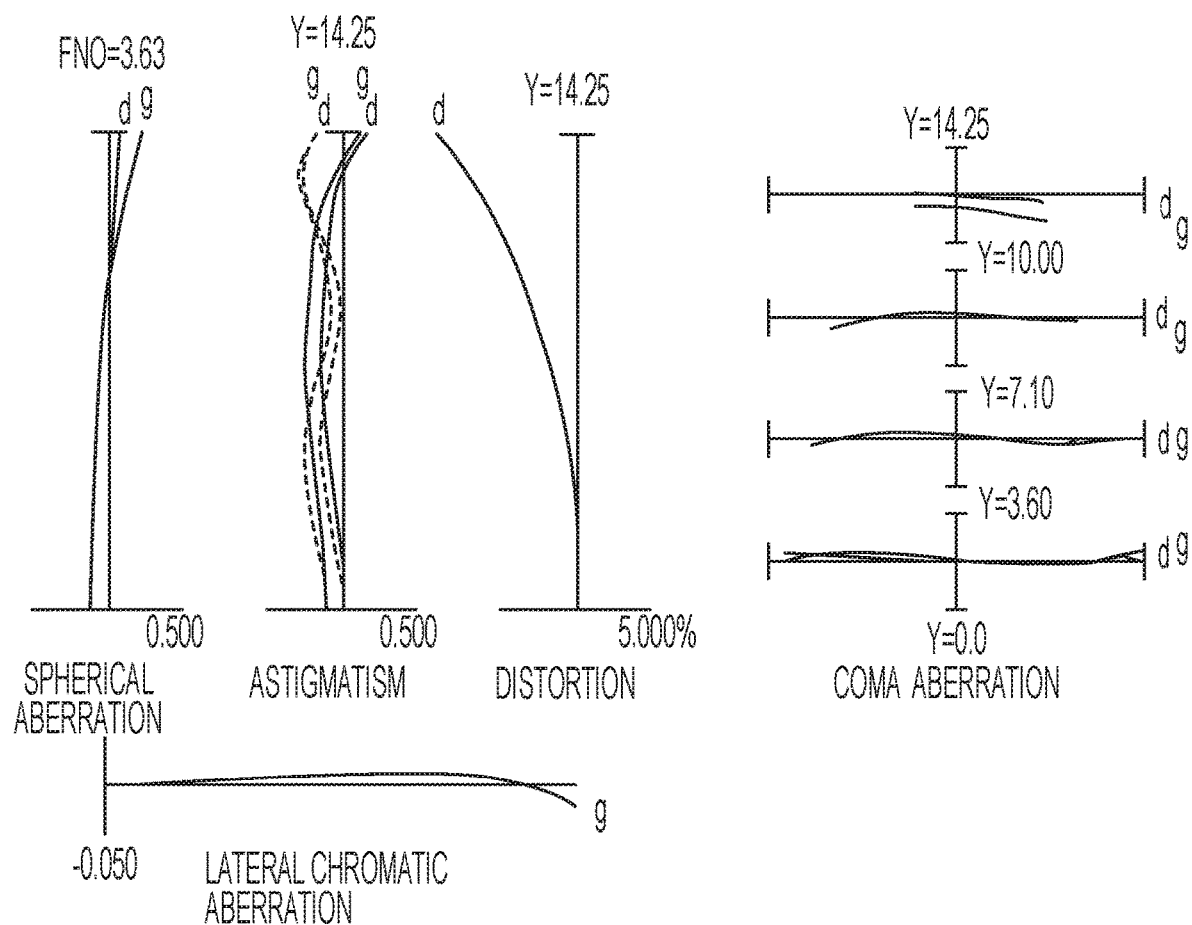
Figure 14B:
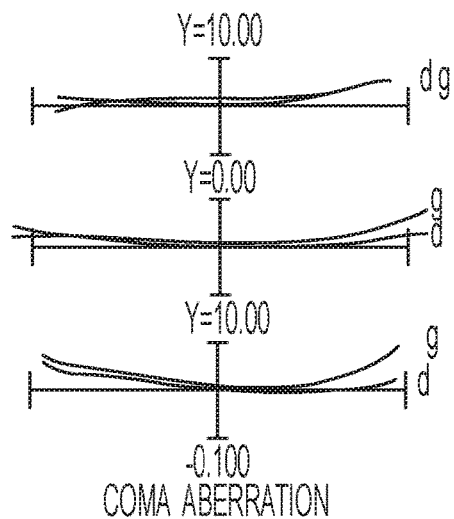
Figure 15:
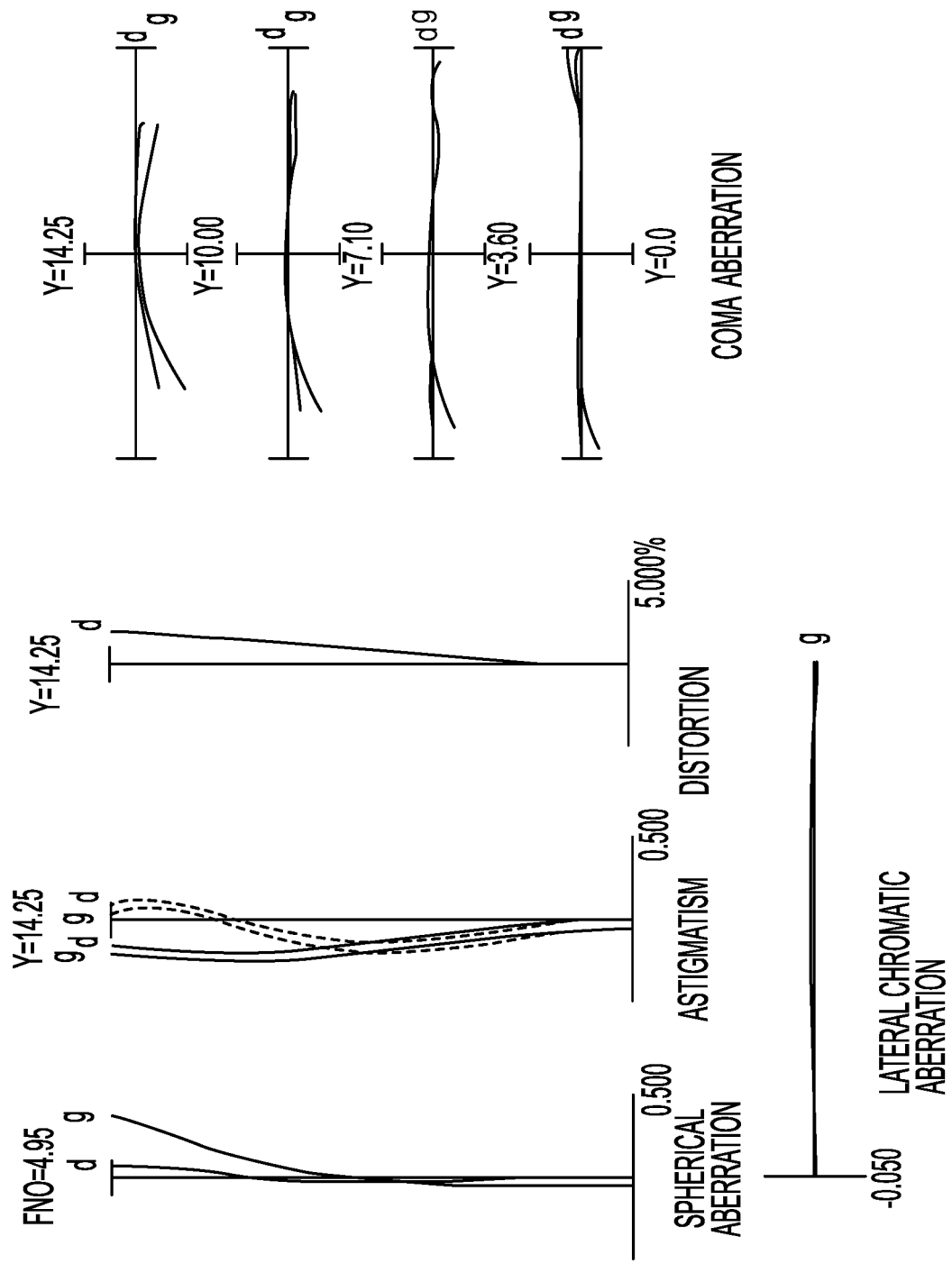
FIG. 15 is graphs showing various aberrations of the zoom lens (according to Example 4) upon focusing on infinity in an intermediate focal length state.
Figure 16A:
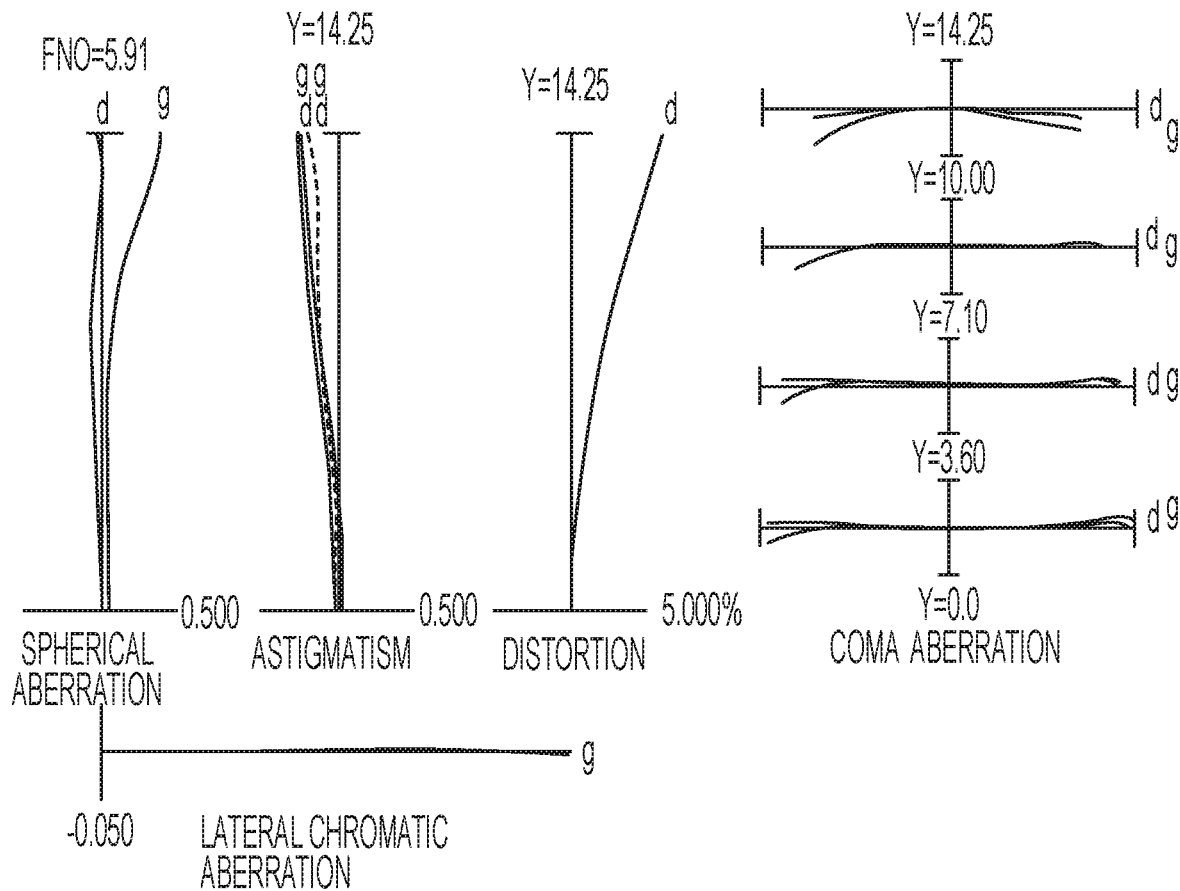
Figure 16B:
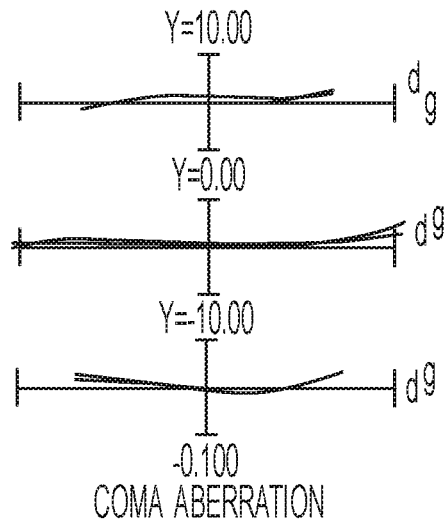

FIG. 14A and FIG. 14B each are graphs showing various aberrations (spherical aberration, astigmatism, distortion, lateral chromatic aberration and coma aberration), and graphs showing coma aberration when an image blur was corrected (a vibration-proof lens group shift amount=0.168), of the zoom lens ZL4 according to Example 4 upon focusing on infinity in a wide-angle end state. FIG. 15 is graphs showing various aberrations of the zoom lens ZL4 according to Example 4 upon focusing on infinity in an intermediate focal length state. FIG. 16A and FIG. 16B each are graphs showing various aberrations (spherical aberration, astigmatism, distortion, lateral chromatic aberration and coma aberration), and graphs showing coma aberration when an image blur was corrected (a vibration-proof lens group shift amount=0.200), of the zoom lens ZL4 according to Example 4 upon focusing on infinity in a telephoto end state. Moreover, in Example 4, as shown in FIG. 14B and FIG. 16B, optical performance upon vibration proofing is shown in graphs showing coma aberration, centering on an image height y=0.0, corresponding to image heights of vertically plus 10.0 and minus 10.0.

From each of the graphs showing aberration shown in FIGS. 14A and 14B, FIG. 15 and FIGS. 16A and 16B, the zoom lens ZL4 according to Example 4 is found to have excellent optical performance in which various aberrations including spherical aberration, curvature of field, astigmatism, coma aberration, and the like are successfully corrected.

According to each Example described above, the zoom lens having a wide angle of view, a small size, and a short total length, in which spherical aberration, curvature of field, astigmatism, coma aberration, and the like are successfully corrected can be realized.

In addition, each Example described above shows one specific example of the zoom lens according to each of the first and second embodiments, and the zoom lens according to each of the first and second embodiments is not limited thereto. In the first and second embodiments, the following content can be appropriately adopted within the range in which the optical performance is not adversely affected.

In Examples using numerical values according to the first and second embodiments, a four-group configuration was shown as the zoom lens. However, the present invention can also be applied to other configurations such as a five-group configuration. For example, a configuration in which a lens or lens group is added thereto on a side closest to the object, or a configuration is allowed in which a lens or lens group is added thereto on a side closest to the image. Moreover, the lens group represents a part which is separated by the air distances which change upon zooming or focusing and have at least one lens.

In the first and second embodiments, the zoom optical system may be formed into a focusing lens group in which focusing on an infinite distant object to a short distant object is made by moving a single lens group or a plurality of lens groups, or a partial lens group in the optical axis direction. The focusing lens group can be applied to autofocusing, and is also suitable for a motor drive (using an ultrasonic motor, or the like) for autofocusing. In particular, at least a part of the third lens group G3 is preferably applied as the focusing lens group.

In the first and second embodiments, the zoom optical system may be formed into a vibration-proof lens group in which the image blur caused by camera shake is corrected by vibrating the lens group or the partial lens group in the direction perpendicular to the optical axis, or rotationally moving (swinging) the lens group or the partial lens group in an in-plane direction including the optical axis. In particular, at least a part of the fourth lens group G4 is preferably applied as the vibration-proof lens group.

In the first and second embodiments, a lens surface may be formed of a spherical surface or a flat surface, or formed of an aspherical surface. When the lens has the spherical surface or the flat surface, lens processing and assembly and adjustment are facilitated, and deterioration of optical performance by an error of the processing and assembly and adjustment can be prevented, and such a case is preferable. Moreover, when the lens has the aspherical surface, the aspherical surface may be any aspherical surface, including an aspherical surface by grinding, a glass mold aspherical surface in which glass is formed into an aspherical surface shape by using a mold, and a composite type aspherical surface in which a resin is formed into the aspherical surface shape on a surface of glass. Moreover, the lens surface may be formed into a diffraction surface, or the lens may be formed into a gradient index lens (GRIN lens) or a plastic lens.

In the first and second embodiments, the aperture stop S is preferably arranged in a neighborhood of the fourth lens group G4 or within the fourth lens group G4. However, a lens frame may be used as substitution for such a role without providing a member as the aperture stop.

In the first and second embodiments, an antireflection film having high transmittance in a wide wavelength range may be applied to each lens surface in order to reduce a flare and a ghost to achieve high optical performance with high contrast.

The zoom lens ZL according to each of the first and second embodiments has a zoom ratio of about 2 to 7.

Description of the Embodiments (Third and Fourth Embodiments)

Next, a third embodiment will be described with reference to drawings. As shown in FIG. 20, a zoom lens ZL according to the third embodiment has, disposed in order from an object, a first lens group G1 having positive refractive power, a second lens group G2 having negative refractive power, a third lens group G3 having negative refractive power, and a fourth lens group G4 having positive refractive power, in which focusing is made by moving at least a part of the third lens group G3 (for example, a negative meniscus lens L31 having a concave surface facing an object in FIG. 20) along an optical axis direction.

According to this configuration, size reduction of a lens barrel and successful correction of variations in aberration (for example, spherical aberration, curvature of field, and the like) upon focusing can be realized.

Then, under the configuration, in the zoom lens ZL, the following conditional expression (19) is satisfied:

$$0.249 < fw/f1 < 2.00 \quad (19)$$

where fw denotes a focal length of the zoom lens in a wide-angle end state upon focusing on infinity, and f1 denotes a focal length of the first lens group G1.

The conditional expression (19) specifies a ratio of the focal length of the zoom lens in the wide-angle end state to the focal length of the first lens group G1. When the ratio thereof is less than a lower limit of the conditional expression (19), refractive power of the first lens group G1 is reduced, and size reduction becomes difficult. When refractive power of the second lens group G2 and the fourth lens group G4 is increased in order to achieve size reduction, correction of spherical aberration and coma aberration becomes difficult. When the ratio thereof is more than an upper limit of the conditional expression (19), refractive power of the first lens group G1 increases, and correction of coma aberration and curvature of field becomes difficult.

Further successful aberration correction can be made by setting the lower limit of the conditional expression (19) to 0.260. Still further successful aberration correction can be made by setting of the lower limit of the conditional expression (19) to 0.270. Moreover, an effect of the third embodiment can be exhibited to a maximum by setting the lower limit of the conditional expression (19) to 0.280.

Still further successful aberration correction can be made by setting the upper limit of the conditional expression (19) to 1.00. The effect of the third embodiment can be exhibited to the maximum by setting the upper limit of the conditional expression (19) to 0.50.

In the zoom lens ZL according to the third embodiment, upon zooming, an air distance between the first lens group G1 and the second lens group G2, an air distance between the second lens group G2 and the third lens group G3 and an air distance between the third lens group G3 and the fourth lens group G4 are preferably varied.

According to this configuration, upon zooming, coma aberration in a telephoto end state and curvature of field in the wide-angle end state can be successfully corrected.

In the zoom lens ZL according to the third embodiment, upon zooming, the air distance between the first lens group G1 and the second lens group G2 is preferably enlarged, and the air distance between the third lens group G3 and the fourth lens group G4 is preferably reduced.

According to this configuration, upon zooming, coma aberration in the telephoto end state and curvature of field in the wide-angle end state can be successfully corrected.

In the zoom lens ZL according to the third embodiment, the following conditional expression (20) is preferably satisfied:

$$0.80 < fw/f4 < 3.00 \quad (20)$$

where f4 denotes a focal length of the fourth lens group G4.

The conditional expression (20) specifies a ratio of the focal length of the zoom lens in the wide-angle end state to the focal length of the fourth lens group G4. When the ratio thereof is less than a lower limit of the conditional expression (20), refractive power of the fourth lens group G4 is reduced, and size reduction becomes difficult. When refractive power of the first lens group G1 and the second lens group G2 is increased in order to achieve size reduction, correction of coma aberration, astigmatism and curvature of field becomes difficult. When the ratio thereof is more than an upper limit of the conditional expression (20), refractive power of the fourth lens group G4 increases, and correction of spherical aberration and coma aberration becomes difficult.

Further successful aberration correction can be made by setting of the lower limit of the conditional expression (20) to 0.83.

Further successful aberration correction can be made by setting the upper limit of the conditional expression (20) to 2.00.

In the zoom lens ZL according to the third embodiment, upon zooming, the first lens group G1 is preferably moved along an optical axis.

According to this configuration, size reduction of the lens barrel, and correction of spherical aberration and coma aberration in the telephoto end state can be successfully made.

In the zoom lens ZL according to the third embodiment, the following conditional expression (21) is preferably satisfied:

$$0.10 < f1/(-f3) < 2.00 \quad (21)$$

where f3 denotes a focal length of the third lens group G3.

The conditional expression (21) specifies a ratio of the focal length of the first lens group G1 to the focal length of the third lens group G3. When the ratio thereof is less than a lower limit of the conditional expression (21), refractive power of the first lens group G1 increases, and correction of coma aberration, astigmatism and curvature of field becomes difficult. When the ratio thereof is more than an upper limit of the conditional expression (21), refractive power of the third lens group G3 increases, and correction of variations in curvature of field at a close distance becomes difficult.

Successful aberration correction can be made by setting the lower limit of the conditional expression (21) to 0.50. Further successful aberration correction can be made by setting the lower limit of the conditional expression (21) to 1.00. The effect of the third embodiment can be exhibited to the maximum by setting the lower limit of the conditional expression (21) to 1.25.

Further successful aberration correction can be made by setting the upper limit of the conditional expression (21) to 1.80. The effect of the third embodiment can be exhibited to the maximum by setting the upper limit of the conditional expression (21) to 1.70.

In the zoom lens ZL according to the third embodiment, the following conditional expression (22) is preferably satisfied:

$$0.80 < (-f2)/f4 < 5.00 \quad (22)$$

where f2 denotes a focal length of the second lens group G2, and f4 denotes a focal length of the fourth lens group G4.

The conditional expression (22) specifies a ratio of the focal length of the second lens group G2 to the focal length of the fourth lens group G4. When the ratio thereof is less than a lower limit of the conditional expression (22), refractive power of the second lens group G2 increases, and correction of coma aberration and astigmatism becomes difficult. When the ratio thereof is more than an upper limit of the conditional expression (22), refractive power of the fourth lens group G4 increases, and correction of spherical aberration and coma aberration in the telephoto end state becomes difficult.

Further successful aberration correction can be made by setting the lower limit of the conditional expression (22) to 0.90. The effect of the third embodiment can be exhibited to the maximum by setting the lower limit of the conditional expression (22) to 1.00.

Successful aberration correction can be made by setting the upper limit of the conditional expression (22) to 3.00. Further successful aberration correction can be made by setting of the upper limit of the conditional expression (22) to 2.00. The effect of the third embodiment can be exhibited to the maximum by setting the upper limit of the conditional expression (22) to 1.50.

In the zoom lens ZL according to the third embodiment, the following conditional expression (23) is preferably satisfied:

$$1.80 < ft/(-f2) < 3.50 \tag{23}$$

where ft denotes a focal length of the zoom lens in the telephoto end state, and f2 denotes a focal length of the second lens group G2.

The conditional expression (23) specifies a ratio of the focal length of the zoom lens to the focal length of the second lens group G2. When the ratio thereof is less than a lower limit of the conditional expression (23), refractive power of the second lens group G2 is reduced, and size reduction becomes difficult. When refractive power of the first lens group G1 and the fourth lens group G4 is increased in order to achieve size reduction, correction of spherical aberration and curvature of field becomes difficult. When the ratio thereof is more than an upper limit of the conditional expression (23), refractive power of the second lens group G2 increases, and correction of coma aberration and astigmatism becomes difficult.

Further successful aberration correction can be made by setting the lower limit of the conditional expression (23) to 1.90. The effect of the third embodiment can be exhibited to the maximum by setting the lower limit of the conditional expression (23) to 2.00.

Further successful aberration correction can be made by setting an upper limit of the conditional expression (23) to 3.00. The effect of the third embodiment can be exhibited to the maximum by setting the upper limit of the conditional expression (23) to 2.50.

In the zoom lens ZL according to the third embodiment, the following conditional expression (24) is preferably satisfied:

$$0.65 < ft/f1 < 1.50 \tag{24}$$

where ft denotes a focal length of the zoom lens in a telephoto end state.

The conditional expression (24) specifies a ratio of the focal length of the zoom lens in the telephoto end state to the focal length of the first lens group G1. When the ratio thereof is less than a lower limit of the conditional expression (24), refractive power of the first lens group G1 is reduced, and size reduction becomes difficult. When refractive power of the first lens group G1 is increased in order to achieve size reduction, correction of coma aberration, astigmatism and curvature of field becomes difficult. When the ratio thereof is more than an upper limit of the conditional expression (24), refractive power of the first lens group G1 increases, and correction of coma aberration, astigmatism and curvature of field becomes difficult.

Further successful aberration correction can be made by setting the lower limit of the conditional expression (24) to 0.720.

Further successful aberration correction can be made by setting the upper limit of the conditional expression (24) to 1.30. Then effect of the third embodiment can be exhibited to the maximum by setting the upper limit of the conditional expression (24) to 1.00.

In the zoom lens ZL according to the third embodiment, the third lens group G3 is preferably formed of one lens.

According to this configuration, the third lens group G3 being the focusing group is lightweight, and therefore fast focusing can be made. Further, this configuration is simple, and therefore assembly and adjustment are facilitated, and deterioration of optical performance by an error of assembly and adjustment can be prevented.

In the zoom lens ZL according to the third embodiment, the third lens group G3 is preferably formed of a negative meniscus lens component having a concave surface facing the object (where, the lens component means a single lens or a cemented lens).

According to this configuration, coma aberration and curvature of field can be successfully corrected.

In the zoom lens ZL according to the third embodiment, the second lens group G2 is preferably formed of two negative lenses, and one positive lens.

According to this configuration, coma aberration and curvature of field in the wide-angle end state can be successfully corrected.

In the zoom lens ZL according to the third embodiment, the second lens group G2 is preferably formed of, disposed in order from the object, a negative lens, a negative lens, and a positive lens.

According to this configuration, coma aberration and curvature of field in the wide-angle end state can be successfully corrected.

In the zoom lens ZL according to the third embodiment, the first lens group G1 is preferably formed of one cemented lens.

According to this configuration, size reduction of the lens barrel and successful correction of lateral chromatic aberration in the telephoto end state can be achieved.

In the zoom lens ZL according to the third embodiment, the fourth lens group G4 is preferably formed of at least four lens components (where, the lens component means a single lens or a cemented lens).

According to this configuration, spherical aberration and coma aberration can be successfully corrected.

In the zoom lens ZL according to the third embodiment, the following conditional expression (25) is preferably satisfied:

$$30.00° < \omega w < 80.00° \tag{25}$$

where ωw denotes a half angle of view in a wide-angle end state.

The conditional expression (25) represents a condition specifying a value of the half angle of view in the wide-angle end state. While the zoom lens ZL has a wide angle of view, coma aberration, distortion and curvature of field can be successfully corrected by satisfying the conditional expression (25).

Further successful aberration correction can be made by setting a lower limit of the conditional expression (25) to 33.00°. The effect of the third embodiment can be exhibited to the maximum by setting the lower limit of the conditional expression (25) to 36.00°.

Further successful aberration correction can be made by setting an upper limit of the conditional expression (25) to 77.00°.

In the zoom lens ZL according to the third embodiment, the following conditional expression (26) is preferably satisfied:

$$2.00<ft/fw<15.00 \tag{26}$$

where ft denotes a focal length of the zoom lens in a telephoto end state.

The conditional expression (26) represents a condition specifying a ratio of the focal length of the zoom lens in the telephoto end state to the focal length of the zoom lens in the wide-angle end state. A high zoom ratio can be obtained, and spherical aberration and coma aberration can be successfully corrected by satisfying the conditional expression (26).

Successful aberration correction can be made by setting a lower limit of the conditional expression (26) to 2.30. Further successful aberration correction can be made by setting the lower limit of the conditional expression (26) to 2.50. The effect of the third embodiment can be exhibited to the maximum by setting the lower limit of the conditional expression (26) to 2.70.

Further successful aberration correction can be made by setting an upper limit of the conditional expression (26) to 10.00. The effect of the third embodiment can be exhibited to the maximum by setting the upper limit of the conditional expression (26) to 7.00.

According to the third embodiment, the zoom lens ZL having successful optical performance can be realized.

Figure 32:
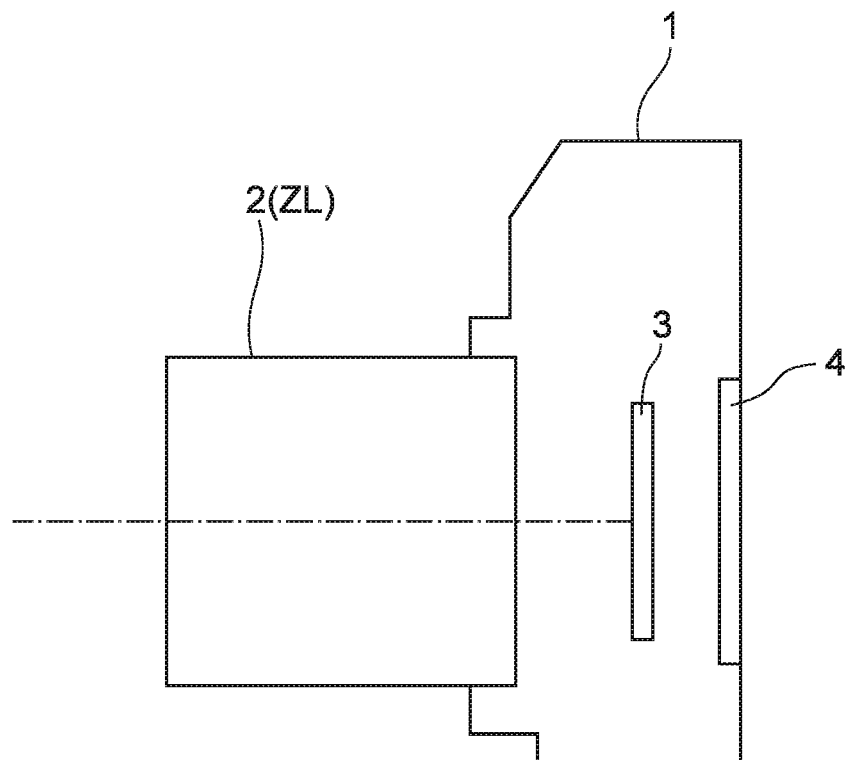
FIG. 32 is a schematic cross-sectional view showing a configuration of a camera according to each of third and fourth embodiments.

Next, a camera (imaging device) 1 provided with the above-mentioned zoom lens will be described with reference to FIG. 32. As shown in FIG. 32, the camera 1 is a lens interchangeable camera (so-called mirrorless camera) provided with the above-mentioned zoom lens as an imaging lens 2.

In the camera 1, a ray of light from an object (subject) (not shown) is collected by the imaging lens 2 to form a subject image on an imaging surface of an imaging unit 3 through an OLPF (optical low pass filter) (not shown). The subject image is then subjected to photoelectric conversion by a photoelectric conversion element provided in the imaging unit 3 to produce an image of the subject. This image is displayed on an EVF (electronic view finder) 4 provided in the camera 1. Thus, a photographer can observe the subject through the EVF 4.

Moreover, when a release bottom (not shown) is pressed by the photographer, the image of the subject produced in the imaging unit 3 is stored in a memory (not shown). In this manner, the photographer can photograph the subject by the camera 1.

As is known also from each Example described later, the zoom lens ZL according to the third embodiment, mounted in the camera 1 as the imaging lens 2, has high performance by the characteristic lens configuration. Therefore, according to the camera 1, the imaging device having successful optical performance can be realized.

In addition, even when the above-mentioned zoom lens ZL is mounted on a single-lens reflex camera that has a quick return mirror and observes the subject by a finder optical system, an effect similar to the effect of the camera 1 can be produced. Moreover, even when the above-mentioned zoom lens ZL is mounted on a video camera, an effect similar to the effect of the camera 1 can be produced.

Figure 33:
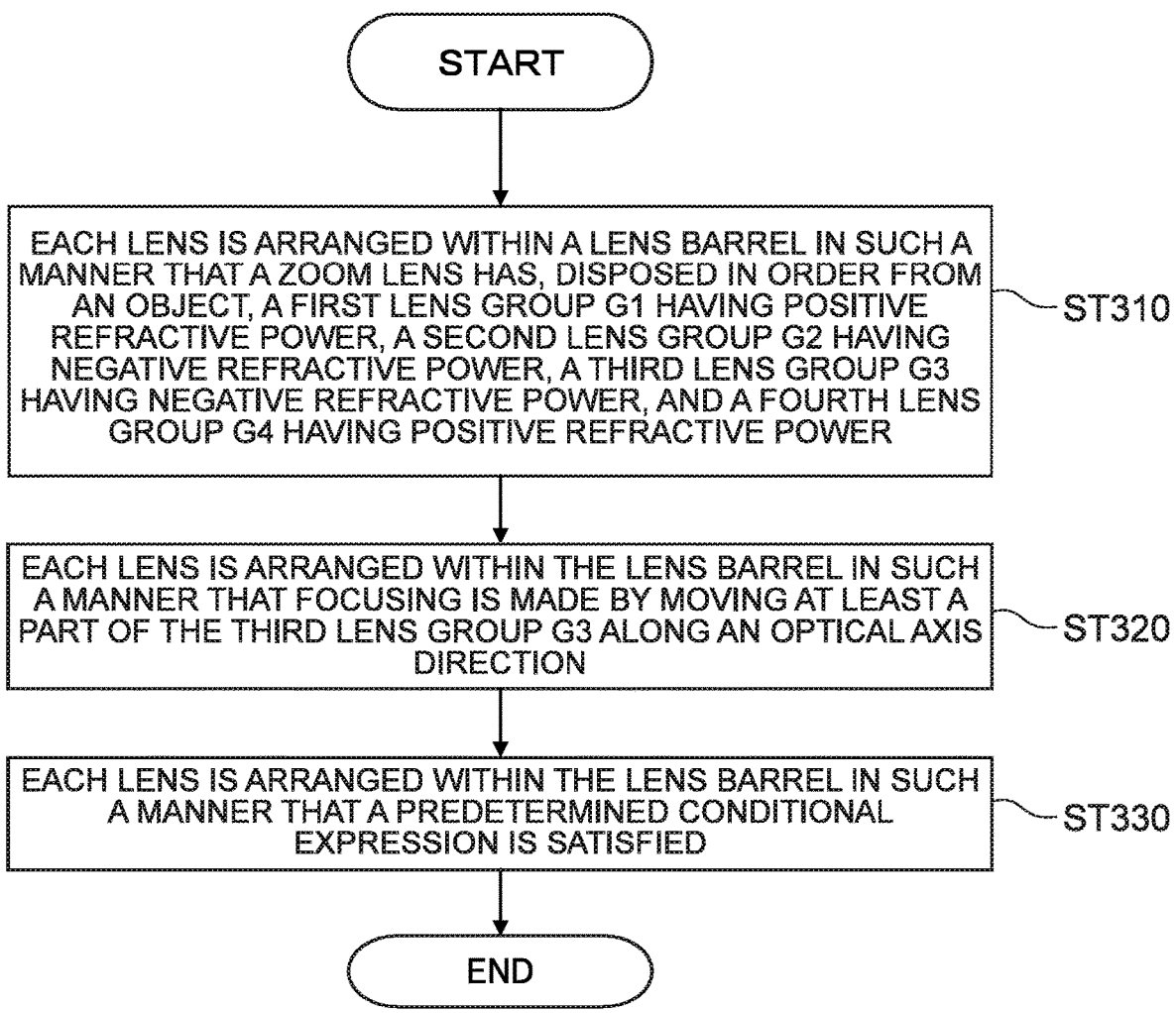
FIG. 33 is a flowchart for describing a method for manufacturing the zoom lens according to the third embodiment.

Subsequently, a method for manufacturing the zoom lens ZL according to the third embodiment will be generally described with reference to FIG. 33. First, each lens is arranged within a lens barrel so as to have a first lens group G1 having positive refractive power, a second lens group G2 having negative refractive power, a third lens group G3 having negative refractive power, and a fourth lens group G4 having positive refractive power (step ST310). At this time, each lens is arranged within the lens barrel so as to make focusing by moving at least a part of the third lens group G3 along an optical axis direction (step ST320). Then, each lens is arranged in the lens barrel so as to satisfy at least the following conditional expression (19) among the conditional expressions (step ST330):

$$0.249<fw/f1<2.00 \tag{19}$$

where fw denotes a focal length of the zoom lens in a wide-angle end state upon focusing on infinity, and f1 denotes a focal length of the first lens group G1.

To take a lens arrangement according to the third embodiment as one example, as shown in FIG. 20, as the first lens group G1, in order from the object, a cemented lens formed by cementing a negative meniscus lens L11 having a concave surface facing an image and a positive meniscus lens L12 having a convex surface facing the object are arranged. As the second lens group G2, in order from the object, a negative meniscus lens L21 having a concave surface facing the image, a biconcave lens L22, and a biconvex lens L23 are arranged. As the third lens group G3 (focusing group), a negative meniscus lens L31 having a concave surface facing the object is arranged. As the fourth lens group G4, in order from the object, a biconvex lens L41, a cemented lens composed of a biconvex lens L42 and a biconcave lens L43, a cemented lens composed of a positive meniscus lens L44 having a convex surface facing the image and a negative meniscus lens L45 having a concave surface facing the object, and a biconvex lens L46 are arranged. Moreover, each lens is arranged in such a manner that at least the conditional expression (19) (a corresponding value of the conditional expression (19) is 0.250) is satisfied among the conditional expressions.

According to the method for manufacturing the zoom lens related to the third embodiment as described above, the zoom lens ZL having successful performance can be obtained.

Next, a fourth embodiment will be described with reference to drawings. As shown in FIG. 20, a zoom lens ZL according to the fourth embodiment has, disposed in order from an object, a first lens group G1 having positive refractive power, a second lens group G2 having negative refractive power, a third lens group G3 having negative refractive power, and a fourth lens group G4 having positive refractive power, in which at least a part of the fourth lens group G4 (for example, a biconvex lens L41 in FIG. 20) is provided to be movable, as a vibration-proof lens group for correcting an image blur, so as to have a component in a direction perpendicular to an optical axis, and upon zooming, the first lens group G1 moves along an optical axis direction.

According to this configuration, size reduction of the lens barrel and successful correction of variations in aberration (for example, spherical aberration, curvature of field, and the like) upon zooming can be realized. Moreover, upon correcting an image blur, variations in curvature of field and variations in decentering coma aberration can be simultaneously corrected.

Then, under the configuration, in the zoom lens ZL, the following conditional expression (27) is satisfied:

$$1.00<f1/f4<3.55 \tag{27}$$

where f1 denotes a focal length of the first lens group G1, and f4 denotes a focal length of the fourth lens group G4.

The conditional expression (27) specifies a ratio of the focal length of the first lens group G1 to the focal length of the fourth lens group G4. When the ratio thereof is less than a lower limit of the conditional expression (27), refractive power of the first lens group G1 increases, and correction of coma aberration and curvature of field in a telephoto end state becomes difficult. When the ratio thereof is more than an upper limit of the conditional expression (27), refractive power of the fourth lens group G4 increases, and correction of spherical aberration and coma aberration in the telephoto end state becomes difficult.

Successful aberration correction can be made by setting the lower limit of the conditional expression (27) to 2.00. Still further successful aberration correction can be made by setting the lower limit of the conditional expression (27) to 3.00. An effect of the fourth embodiment can be exhibited to a maximum by setting the lower limit of the conditional expression (27) to 3.30.

Further successful aberration correction can be made by setting of the upper limit of the conditional expression (27) to 3.50. Then effect of the fourth embodiment can be exhibited to the maximum by setting the upper limit of the conditional expression (27) to 3.40.

In the zoom lens ZL according to the fourth embodiment, upon zooming, an air distance between the first lens group G1 and the second lens group G2, an air distance between the second lens group G2 and the third lens group G3 and an air distance between the third lens group G3 and the fourth lens group G4 are preferably varied.

According to this configuration, upon zooming, coma aberration in the telephoto end state and curvature of field in the wide-angle end state can be successfully corrected.

In the zoom lens ZL according to the fourth embodiment, upon zooming, the air distance between the first lens group G1 and the second lens group G2 is preferably enlarged, and the air distance between the third lens group G3 and the fourth lens group G4 is preferably reduced.

According to this configuration, upon zooming, coma aberration in the telephoto end state and curvature of field in the wide-angle end state can be successfully corrected.

In the zoom lens ZL according to the fourth embodiment, the following conditional expression (28) is preferably satisfied:

$$1.80 < ft/(-f2) < 3.50 \tag{28}$$

where ft denotes a focal length of the zoom lens in a telephoto end state, and f2 denotes a focal length of the second lens group G2.

The conditional expression (28) specifies a ratio of the focal length of the zoom lens in the telephoto end state to the focal length of the second lens group G2. When the ratio thereof is less than a lower limit of the conditional expression (28), refractive power of the second lens group G2 is reduced, and size reduction becomes difficult. When refractive power of the first lens group G1 and the fourth lens group G4 is increased in order to achieve size reduction, correction of spherical aberration, and curvature of field becomes difficult. When the ratio thereof is more than an upper limit of the conditional expression (28), refractive power of the second lens group G2 increases, and correction of coma aberration and astigmatism becomes difficult.

Further successful aberration correction can be made by setting the lower limit of the conditional expression (28) to 1.90. The effect of the fourth embodiment can be exhibited to the maximum by setting the lower limit of the conditional expression (28) to 2.00.

Further successful aberration correction can be made by setting the upper limit of the conditional expression (28) to 3.00. The effect of the fourth embodiment can be exhibited to the maximum by setting the upper limit of the conditional expression (28) to 2.50.

In the zoom lens ZL according to the fourth embodiment, the following conditional expression (29) is preferably satisfied:

$$0.65 < ft/f1 < 1.50 \tag{29}$$

where ft denotes a focal length of the zoom lens in a telephoto end state.

The conditional expression (29) specifies a ratio of the focal length of the zoom lens in the telephoto end state to the focal length of the first lens group G1. When the ratio thereof is less than a lower limit of the conditional expression (29), refractive power of the first lens group G1 is reduced, and size reduction becomes difficult. When the refractive power of the first lens group G1 is increased in order to achieve size reduction, correction of coma aberration, astigmatism, curvature of field becomes difficult. When the ratio thereof is more than an upper limit of the conditional expression (29), refractive power of the first lens group G1 increases, and correction of coma aberration, astigmatism and curvature of field becomes difficult.

Further successful aberration correction can be made by setting the lower limit of the conditional expression (29) to 0.720.

Further successful aberration correction can be made by setting the upper limit of the conditional expression (29) to 1.30. The effect of the fourth embodiment can be exhibited to the maximum by setting the upper limit of the conditional expression (29) to 1.00.

In the zoom lens ZL according to the fourth embodiment, the following conditional expression (30) is preferably satisfied:

$$0.10 < f1/(-f3) < 2.00 \tag{30}$$

where f3 denotes a focal length of the third lens group G3.

The conditional expression (30) specifies a ratio of the focal length of the first lens group G1 to the focal length of the third lens group G3. When the ratio thereof is less than a lower limit of the conditional expression (30), refractive power of the first lens group G1 increases, and correction of coma aberration, astigmatism and curvature of field becomes difficult. When the ratio thereof is more than an upper limit of the conditional expression (30), refractive power of the third lens group G3 increases, and correction of variations in curvature of field at a close distance becomes difficult.

Successful aberration correction can be made by setting the lower limit of the conditional expression (30) to 0.50. Further successful aberration correction can be made by setting the lower limit of the conditional expression (30) to 1.00. The effect of the fourth embodiment can be exhibited to the maximum by setting the lower limit of the conditional expression (30) to 1.25.

Further successful aberration correction can be made by setting the upper limit of the conditional expression (30) to 1.80. The effect of the fourth embodiment can be exhibited to the maximum by setting the upper limit of the conditional expression (30) to 1.70.

In the zoom lens ZL according to the fourth embodiment, the following conditional expression (31) is preferably satisfied:

$$0.80 < (-f2)/f4 < 5.00 \quad (31)$$

where f2 denotes a focal length of the second lens group G2.

The conditional expression (31) specifies a ratio of the focal length of the second lens group G2 to the focal length of the fourth lens group G4. When the ratio thereof is less than a lower limit of the conditional expression (31), refractive power of the second lens group G2 increases, and correction of coma aberration and astigmatism becomes difficult. When the ratio thereof is more than an upper limit of the conditional expression (31), refractive power of the fourth lens group G4 increases, and correction of spherical aberration and coma aberration in the telephoto end state becomes difficult.

Further successful aberration correction can be made by setting the lower limit of the conditional expression (31) to 0.90. The effect of the fourth embodiment can be exhibited to the maximum by setting the lower limit of the conditional expression (31) to 1.00.

Successful aberration correction can be made by setting the upper limit of the conditional expression (31) to 3.00. Further successful aberration correction can be made by setting the upper limit of the conditional expression (31) to 2.00. The effect of the fourth embodiment can be exhibited to the maximum by setting the upper limit of the conditional expression (31) to 1.50.

In the zoom lens ZL according to the fourth embodiment, the third lens group G3 is preferably formed of one lens.

According to this configuration, the third lens group G3 being the focusing group is lightweight, and therefore fast focusing can be made. Further, this configuration is simple, and therefore assembly and adjustment are facilitated, and deterioration of optical performance by an error of assembly and adjustment can be prevented.

In the zoom lens ZL according to the fourth embodiment, the third lens group G3 is preferably formed of a negative meniscus lens component having a concave surface facing the object (where, the lens component means a single lens or a cemented lens).

According to this configuration, coma aberration and curvature of field can be successfully corrected.

In the zoom lens ZL according to the fourth embodiment, the second lens group G2 is preferably formed of two negative lenses and one positive lens.

According to this configuration, coma aberration and curvature of field in the wide-angle end state can be successfully corrected.

In the zoom lens ZL according to the fourth embodiment, the second lens group G2 is preferably formed of a negative lens, a negative lens, and a positive lens, which are arranged in order from the object.

According to this configuration, coma aberration and curvature of field in the wide-angle end state can be successfully corrected.

In the zoom lens ZL according to the fourth embodiment, the first lens group G1 is preferably formed of one cemented lens.

According to this configuration, size reduction of the lens barrel and successful correction of lateral chromatic aberration in the telephoto end state can be achieved.

In the zoom lens ZL according to the fourth embodiment, the fourth lens group G4 is preferably formed of at least four lens components (where, the lens component means a single lens or a cemented lens).

According to this configuration, spherical aberration and coma aberration can be successfully corrected.

In the zoom lens ZL according to the fourth embodiment, the following conditional expression (32) is preferably satisfied:

$$10.00° < \omega w < 20.00° \quad (32)$$

where $\omega w$ denotes a half angle of view in a telephoto end state.

The conditional expression (32) specifies a value of a half angle of view in the telephoto end state. A desired angle of view can be obtained, and simultaneously coma aberration, distortion and curvature of field can be successfully corrected by satisfying the conditional expression (32).

Setting of a lower limit of the conditional expression (32) to 13.00° allows for further successful aberration correction.

Further successful aberration correction can be made by setting an upper limit of the conditional expression (32) to 17.00°.

In the zoom lens ZL according to the fourth embodiment, the following conditional expression (33) is preferably satisfied:

$$2.00 < ft/fw < 15.00 \quad (33)$$

where ft denotes a focal length of the zoom lens in a telephoto end state, and fw denote a focal length of the zoom lens in a wide-angle end state.

The conditional expression (33) specifies a ratio of the focal length of the zoom lens in the telephoto end state to the focal length of the zoom lens in the wide-angle end state. A high zoom ratio can be obtained, and simultaneously spherical aberration and coma aberration can be successfully corrected by satisfying the conditional expression (33).

Successful aberration correction can be made by setting a lower limit of the conditional expression (33) to 2.30. Further successful aberration correction can be made by setting the lower limit of the conditional expression (33) to 2.50. The effect of the fourth embodiment can be exhibited to the maximum by setting the lower limit of the conditional expression (33) to 2.70.

Further successful aberration correction can be made by setting an upper limit of the conditional expression (33) to 10.00. The effect of the fourth embodiment can be exhibited to the maximum by setting the upper limit of the conditional expression (33) to 7.00.

According to the fourth embodiment as described above, the zoom lens ZL having successful optical performance can be realized.

Next, a camera (imaging device) 1 provided with the above-mentioned zoom lens will be described with reference to FIG. 32. This camera 1 is identical with the camera 1 according to the third embodiment and the configuration has been already described, and therefore the description herein is omitted.

As is known also from each Example described later, the zoom lens ZL according to the fourth embodiment, mounted in the camera 1 as the imaging lens 2, has successful performance by the characteristic lens configuration. Therefore, according to the camera 1, the imaging device having successful performance can be realized.

In addition, even when the above-mentioned zoom lens ZL is mounted on a single-lens reflex camera that has a quick return mirror and observes the subject by a finder optical system, an effect similar to the effect of the camera 1 can be produced. Moreover, even when the above-mentioned zoom lens is mounted on a video camera, an effect similar to the effect of the camera 1 can be produced.

Figure 34:
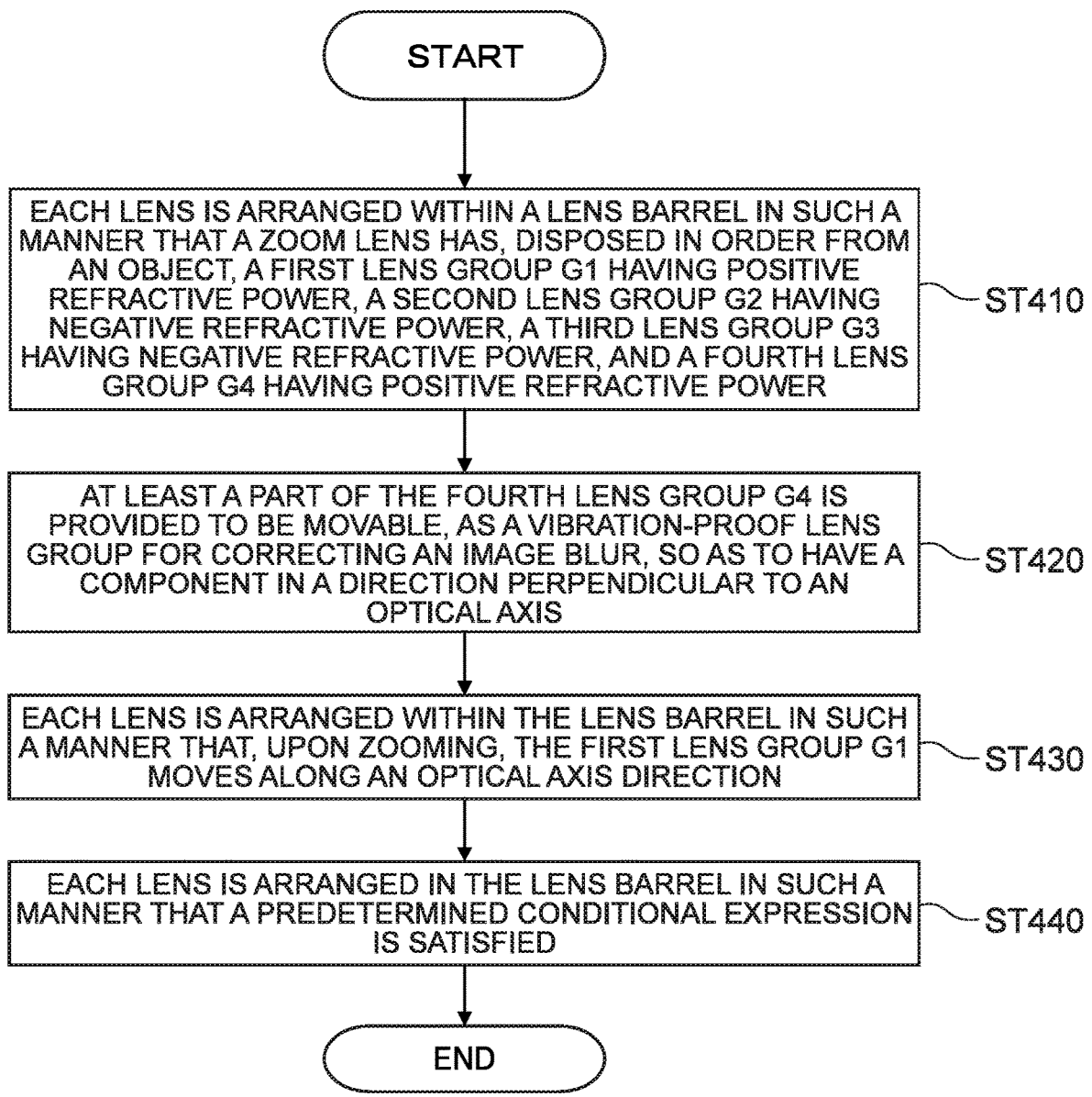
FIG. 34 is a flowchart for describing a method for manufacturing the zoom lens according to the fourth embodiment.

Then, a method for manufacturing the zoom lens ZL according to the fourth embodiment will be generally described with reference to FIG. 34. First, each lens is arranged within a lens barrel so as to have a first lens group G1 having positive refractive power, a second lens group G2 having negative refractive power, a third lens group G3 having negative refractive power, and a fourth lens group G4 having positive refractive power (step ST410). At this time, at least a part of the fourth lens group G4 is provided to be movable, as a vibration-proof lens group for correcting an image blur, so as to have a component in a direction perpendicular to an optical axis (step ST420). Each lens is arranged in such a manner that the first lens group G1 moves along an optical axis direction upon zooming (step ST430). Then, each lens is arranged within the lens barrel so as to satisfy at least the following conditional expression (27) among the conditional expressions described above (step ST440):

$$1.00 < f1/f4 < 3.55 \tag{27}$$

where f1 denotes a focal length of the first lens group G1, and f4 denotes a focal length of the fourth lens group G4.

To take a lens arrangement according to the fourth embodiment as one example, as shown in FIG. 20, as a first lens group G1, in order from the object, a cemented lens formed by cementing a negative meniscus lens L11 having a concave surface facing an image and a positive meniscus lens L12 having a convex surface facing the object are arranged. As a second lens group G2, in order from the object, a negative meniscus lens L21 having a concave surface facing the image, a biconcave lens L22, and a biconvex lens L23 are arranged. As a third lens group G3, a negative meniscus lens L31 having a concave surface facing the object is arranged. As a fourth lens group G4, in order from the object, a biconvex lens L41 (vibration-proof group), a cemented lens composed of a biconvex lens L42 and a biconcave lens L43, a cemented lens composed of a positive meniscus lens L44 having a convex surface facing the image and a negative meniscus lens L45 having a concave surface facing the object, and a biconvex lens L46 are arranged. Moreover, each lens is arranged in such a manner that at least the conditional expression (27) (a corresponding value of the conditional expression (27) is 3.334) is satisfied among the conditional expressions.

According to the method for manufacturing the zoom lens according to the fourth embodiment as described above, the zoom lens ZL having successful performance can be obtained.

Examples According to Third and Fourth Embodiments

Next, each Example according to third and fourth embodiments will be described based on drawings.

Tables 5 to 7 are shown below, and these tables indicate specifications in Example 5 to Example 7, respectively.

FIG. 20, FIG. 24 and FIG. 28 each are a cross-sectional view showing a configuration of zoom lens ZL (ZL5 to ZL7) according to each Example. In these cross-sectional views showing the zoom lenses ZL5 to ZL7, a moving track of each of lens groups G1 to G4 along an optical axis upon zooming from a wide-angle end state (W) to a telephoto end state (T) is shown by an arrow.

Each reference sign for FIG. 20 according to Example 5 is used independently for each Example in order to avoid complication of description by an increase in digit number of the reference sign. Therefore, even if reference signs common to reference signs in drawings according to other Examples are placed, the reference signs do not necessarily provides configurations common to the configurations in other Examples.

In each Example, a d-line (wavelength: 587.5620 nm) and a g-line (wavelength: 435.8350 nm) are selected as an object for calculation of aberration characteristics.

In "Lens Data" in the Table, a surface number indicates an order of an optical surface from an object along a direction in which a ray of light progresses, r denotes a radius of curvature of each optical surface, D denotes a distance to the next lens surface as a distance from each optical surface to the next optical surface (or image surface) on an optical axis, vd denotes the Abbe number of a material of an optical material as a reference based on the d-line, and nd denotes a refractive index of the material of the optical member for the d-line. Moreover, (Variable) denotes a variable distance to the next lens surface, "∞" of a radius of curvature indicates a flat surface or an aperture, and (Stop S) denotes an aperture stop S. A refractive index of air (d-line) "1.000000" is omitted. When an optical surface is aspherical, "*" is placed on a left side of a surface number, and a paraxial radius of curvature is shown in a column of a radius of curvature R.

In "Aspherical Surface Data" in the Table, a shape of an aspherical surface shown in "Lens Data" is expressed by the following expression (b). Here, y denotes a height in a direction perpendicular to an optical axis, X(y) denotes an amount of displacement (amount of sag) in an optical axis direction at a height y, r denotes a radius of curvature (paraxial radius of curvature) of a reference spherical surface, κ denotes a conical coefficient, and An represents the n-th aspherical coefficient. In addition, "E-n" represents "×10$^{-n}$," and for example, "1.234E-05" represents "1.234× 10$^{-5}$."

$$X(y)=(y^2/r)/[1+\{1-\kappa(y^2/r^2)\}^{1/2}]+A4 \times y^4+A6 \times y^6+A8 \times y^8+A10 \times y^{10} \tag{b}$$

In "Various Data" in the Table, f denotes a focal length of the zoom lens, Fno denotes an F-number, ω denotes a half angle of view (unit: °), Y denotes an image height, TL denotes a total length (a distance from a lens forefront surface to an image surface I on an optical axis) of a lens system, and Bf denotes a back focus (a distance from a lens final surface to the image surface I on the optical axis).

In "Variable Distance Data" in the Table, f denotes a focal length of the zoom lens, R denotes an imaging distance, DO denotes a distance from an object surface to the first surface, Di (where, i is an integer) denotes a variable distance between the i-th surface and the (i+1)-th surface.

In "Lens Group Data" in the Table, a start surface number (surface number on a side closest to an object) of each group is shown in a group first surface, and a focal length of each group is shown in a group focal length.

In "Conditional Expression Corresponding Value" in the Table, values corresponding to the conditional expressions (19) to (33) are shown.

In the following, in all the values of the specifications, unless otherwise stated, "mm" is generally used for a focal length f, a radius of curvature R, a distance to the next lens surface D and other lengths, and the like entered therein.

However, equivalent optical performance can be obtained even though an optical system is proportionally scaled up or scaled down, and therefore the values are not limited thereto. Moreover, the unit is not limited to "mm," and other appropriate units can be used.

The description with regard to Table so far is common in all Examples, and the description in the following is omitted.

Example 5

Example 5 will be described using FIG. 20, FIGS. 21A-21C, FIGS. 22A-22C, FIGS. 23A-23C and Table 5. As shown in FIG. 20, a zoom lens ZL (ZL5) according to Example 5 is configured of, disposed in order from an object, a first lens group G1 having positive refractive power, a second lens group G2 having negative refractive power, a third lens group G3 having negative refractive power, and a fourth lens group G4 having positive refractive power.

The first lens group G1 is formed of, disposed in order from the object, a cemented positive lens formed by cementing a negative meniscus lens L11 having a concave surface facing an image and a positive meniscus lens L12 having a convex surface facing the object.

The second lens group G2 is formed of, disposed in order from the object, a negative meniscus lens L21 having a concave surface facing the image, a biconcave lens L22, and a biconvex lens L23.

The third lens group G3 is formed of a negative meniscus lens L31 having a concave surface facing the object.

The fourth lens group G4 is formed of, disposed in order from the object, a biconvex lens L41, a cemented lens composed of a biconvex L42 and a biconcave L43, an aperture stop S determining an F-number, and a cemented lens formed of a positive meniscus lens L44 having a convex surface facing the image and a negative meniscus lens L45 having a concave surface facing the object, and a biconvex lens L46. A surface of the positive meniscus lens L44 to the object is an aspherical surface.

An image surface I is formed on an imaging element (not shown), and the imaging element is configured of a CCD, a CMOS, and the like.

In the zoom lens ZL5 according to Example 5, zooming from a wide-angle end state to a telephoto end state is made by varying an air distance between the first lens group G1 and the second lens group G2, an air distance between the second lens group G2 and the third lens group G3 and an air distance between the third lens group G3 and the fourth lens group G4. At this time, relative to the image surface I, the first lens group G1 to the fourth lens group G4 move to the object. The aperture stop S moves to the object integrally with the fourth lens group G4 upon zooming.

The zoom lens ZL5 according to Example 5 has a configuration in which focusing is made by moving the third lens group G3 along an optical axis direction. As shown by an arrow in FIG. 20, upon causing a change from a state focusing on an infinite distant object to a state of focusing on a short distant object, the third lens group G3 moves from the image to the object.

Upon occurrence of an image blur, correction of the image blur (vibration proofing) on the image surface I is made by moving, as a vibration-proof lens, the biconvex lens L41 of the fourth lens group G4 so as to have a component in a direction perpendicular to the optical axis.

Table 5 below shows values of each of specifications in Example 5. Surface numbers 1 to 22 in Table 5 correspond to optical surfaces m1 to m22 shown in FIG. 20, respectively.

TABLE 5

[Lens Data]

| Surface Number | r | D | νd | nd |
|---|---|---|---|---|
| 1 | 43.6089 | 0.8000 | 56.06 | 1.846663 |
| 2 | 26.7076 | 8.7676 | 27.04 | 1.804199 |
| 3 | 168.7089 | D3(Variable) | | |
| 4 | 60.1788 | 0.8000 | 41.64 | 1.903658 |
| 5 | 13.1274 | 6.8449 | | |
| 6 | −40.4915 | 0.8000 | 23.57 | 1.739905 |
| 7 | 22.2763 | 0.2000 | | |
| 8 | 20.5255 | 3.7229 | 64.97 | 1.922860 |
| 9 | −63.7521 | D9(Variable) | | |
| 10 | −21.8570 | 0.8000 | 38.96 | 1.806099 |
| 11 | −58.8880 | D11(Variable) | | |
| 12 | 2824.2386 | 1.3308 | 27.04 | 1.804199 |
| 13 | −46.2898 | 0.2000 | | |
| 14 | 19.5419 | 2.8008 | 28.71 | 1.785897 |
| 15 | −21.4622 | 0.8000 | 56.06 | 1.846663 |
| 16 | 88.8419 | 1.0643 | | |
| 17 | ∞ | 13.9355 | (Stop S) | |
| *18 | −164.5357 | 5.8435 | 17.31 | 1.487496 |
| 19 | −10.4013 | 0.8000 | 33.08 | 1.758900 |
| 20 | −44.2438 | 0.2000 | | |
| 21 | 42.0115 | 2.6551 | 33.02 | 1.890489 |
| 22 | −765.8628 | Bf(Variable) | | |

[Aspherical Surface Data]
The 18th Surface

κ = 1.0000
A4 = −3.13683E−05
A6 = −3.13787E−08
A8 = −1.62732E−09
A10 = 3.69350E−12

TABLE 5-continued

[Various Data]

| | | | |
|---|---|---|---|
| f | 18.50 | 29.99 | 53.29 |
| Fno | 3.27 | 4.24 | 4.65 |
| ω | 41.98 | 26.95 | 15.03 |
| TL | 87.66 | 92.68 | 113.67 |
| Bf | 19.36 | 32.55 | 38.06 |
| Y | 14.25 | 14.25 | 14.25 |

[Variable Distance Data]

| | (Infinity) | | | (Imaging Distance 1 m) | | |
|---|---|---|---|---|---|---|
| | Wide-Angle End | Intermediate | Telephoto End | Wide-Angle End | Intermediate | Telephoto End |
| f&β | 18.50490 | 29.99155 | 53.29045 | −0.01970 | −0.03208 | −0.05496 |
| D0 | 0.0000 | 0.0000 | 0.0000 | 912.3355 | 907.3154 | 886.3268 |
| D3 | 0.20000 | 0.53995 | 18.55691 | 0.20000 | 0.53995 | 18.55691 |
| D9 | 2.68588 | 2.97437 | 4.48690 | 2.20641 | 2.48985 | 3.43365 |
| D11 | 13.05009 | 4.25341 | 0.20000 | 13.52956 | 4.73793 | 1.25325 |
| Bf | 19.36323 | 32.55157 | 38.06404 | 19.36323 | 32.55157 | 38.06404 |

[Lens Group Data]

| Group Number | Group First Surface | Group Focal Length |
|---|---|---|
| G1 | 1 | 73.938 |
| G2 | 4 | −26.003 |
| G3 | 10 | −43.538 |
| G4 | 12 | 22.176 |

[Conditional Expression Corresponding Value]

Conditional Expression (19): fw/f1 = 0.250
Conditional Expression (20): fw/f4 = 0.834
Conditional Expression (21): f1/(−f3) = 1.698
Conditional Expression (22): (−f2)/f4 = 1.173
Conditional Expression (23): ft/(−f2) = 2.049
Conditional Expression (24): ft/f1 = 0.721
Conditional Expression (25): ωw = 41.98
Conditional Expression (26): ft/fw = 2.880
Conditional Expression (27): f1/f4 = 3.334
Conditional Expression (28): ft/(−f2) = 2.049
Conditional Expression (29): ft/f1 = 0.721
Conditional Expression (30): f1/(−f3) = 1.698
Conditional Expression (31): (−f2)/f4 = 1.173
Conditional Expression (32): ωt = 15.03
Conditional Expression (33): ft/fw = 2.880

Table 5 shows that the zoom lens ZL5 according to Example 5 satisfies the conditional expressions (19) to (33).

Figure 21A:
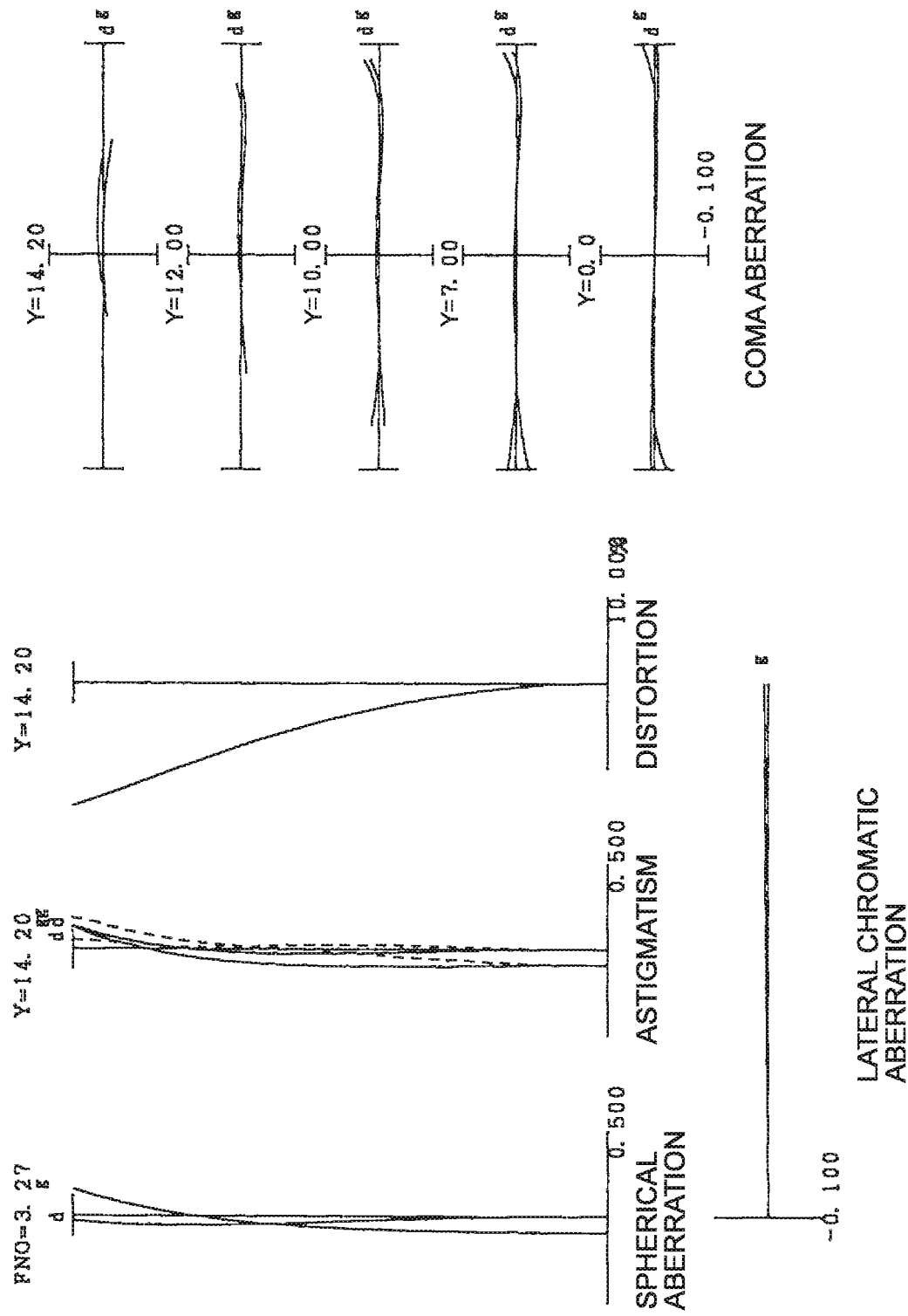
Figure 21B:
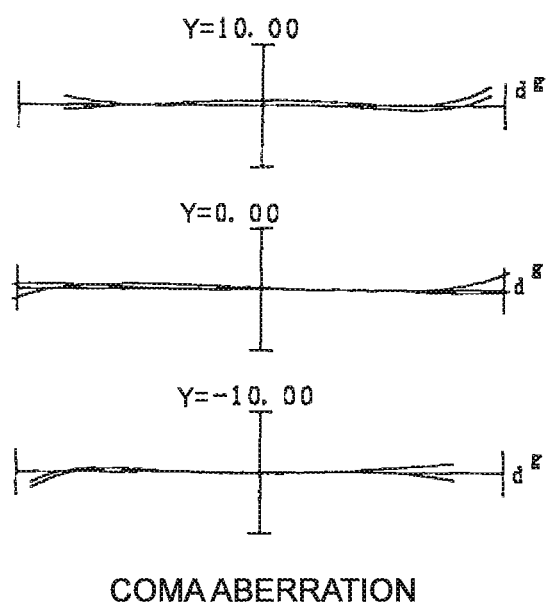
Figure 21C:
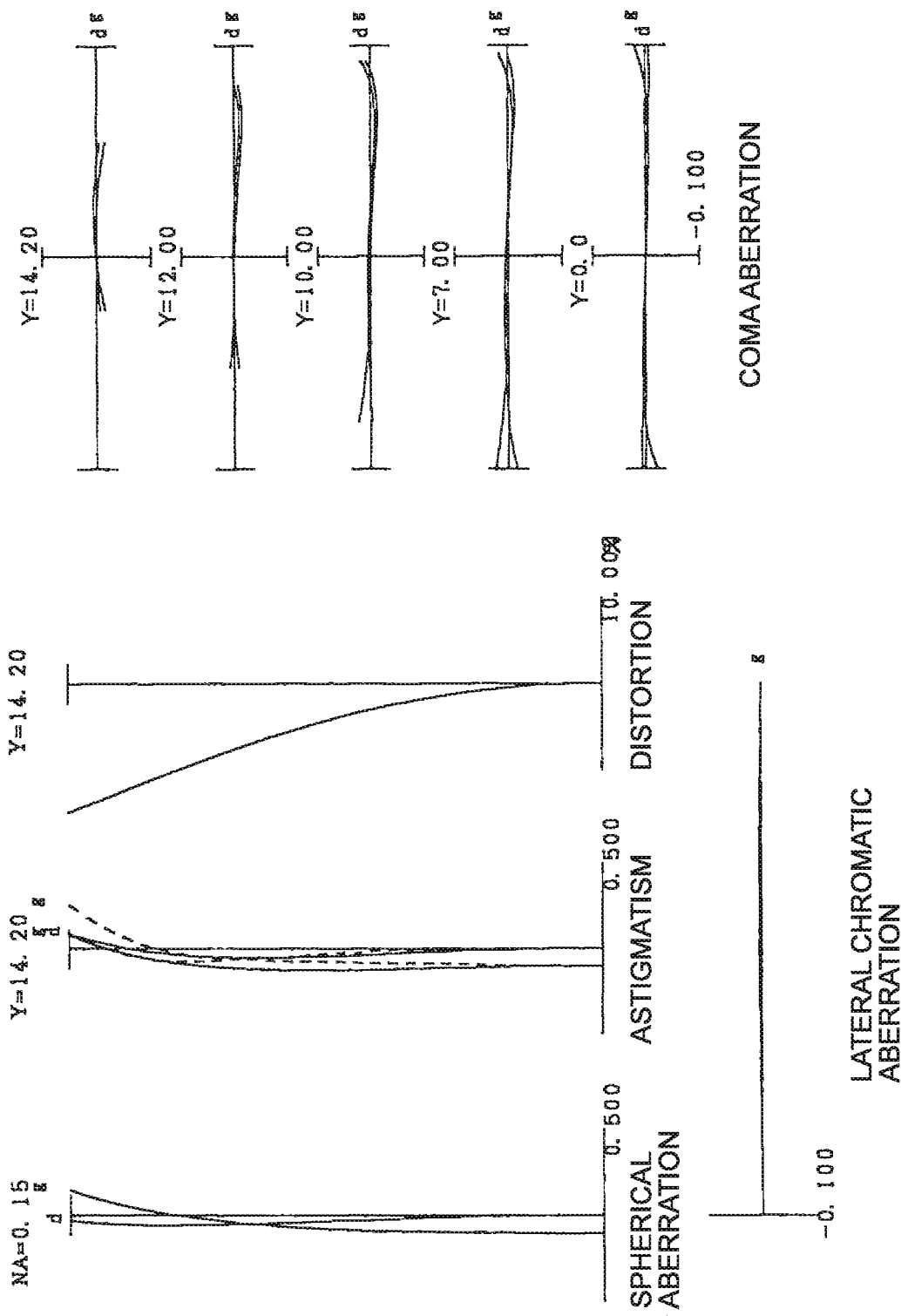
Figure 22A:
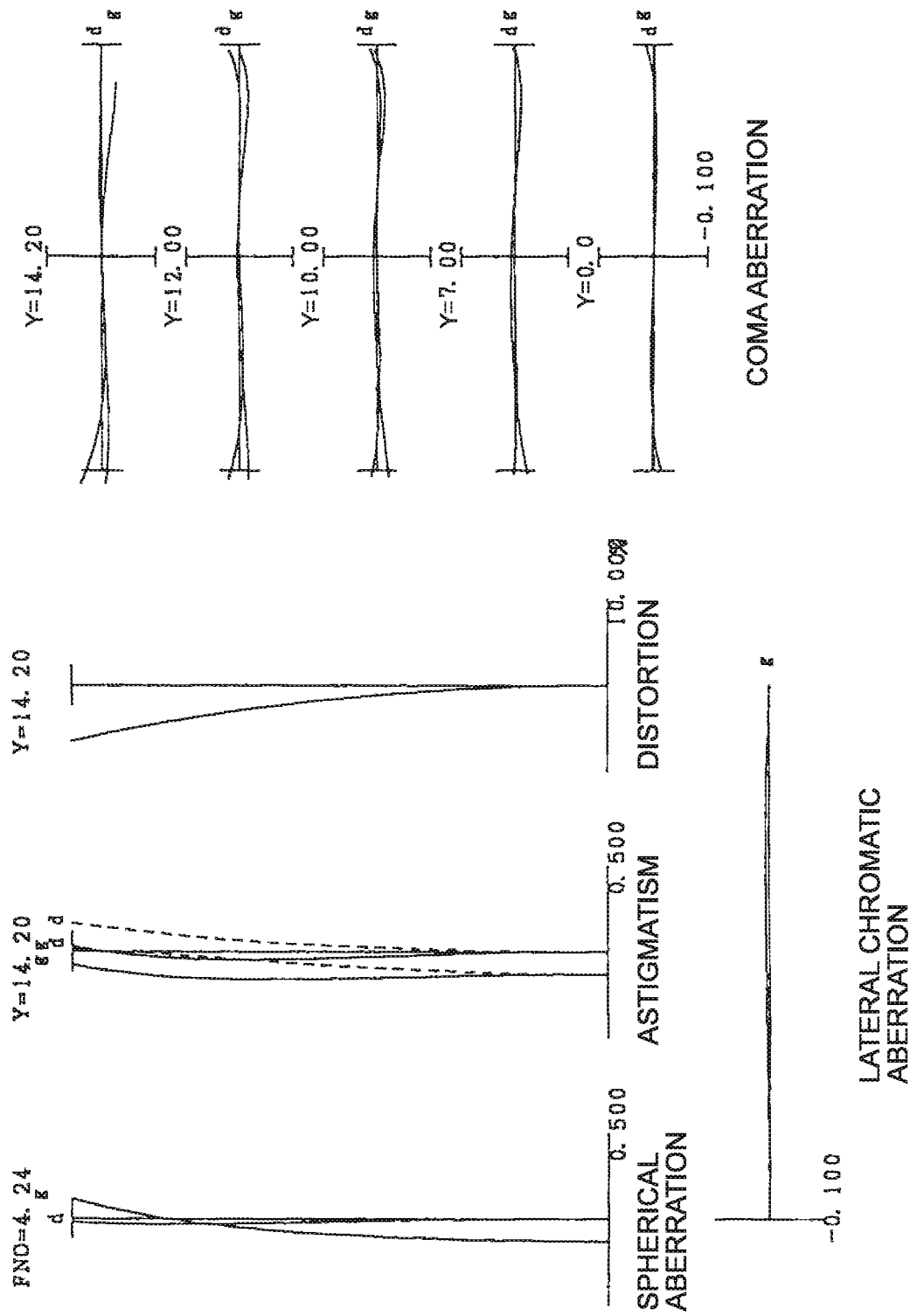
Figure 22B:
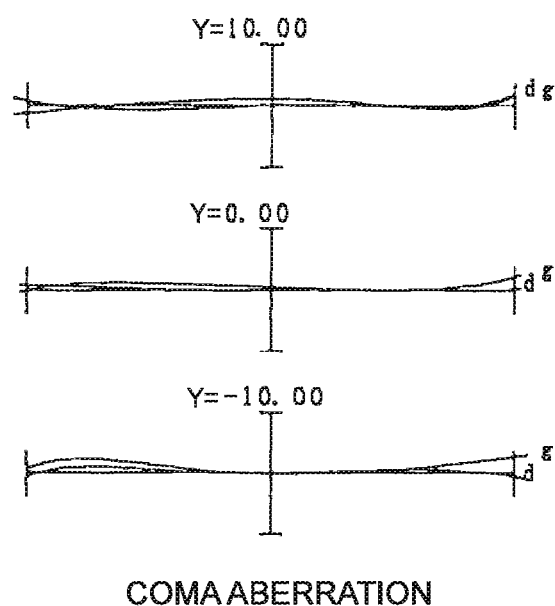
Figure 23B:
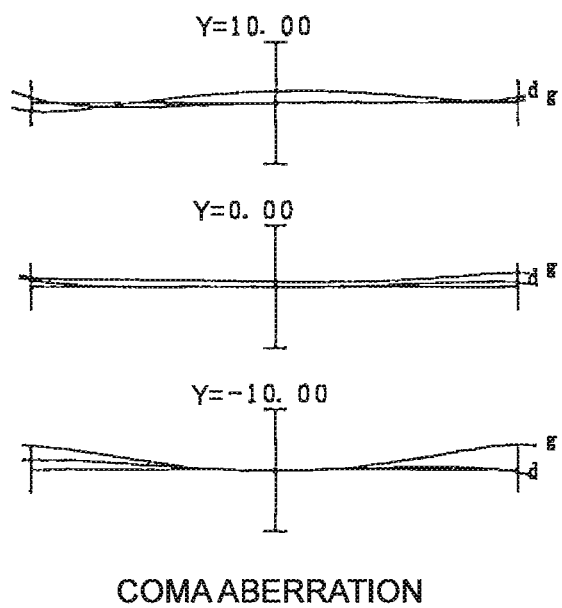

FIGS. 21A, 21B and 21C are graphs showing aberrations of the zoom lens ZL5 according to Example 5 in a wide-angle end state (f=18.50), in which FIG. 21A is graphs showing various aberrations upon focusing on infinity, FIG. 21B is graphs showing coma aberration when an image blur is corrected upon focusing on infinity (a correction angle θ=0.30°), and FIG. 21C is graphs showing various aberrations upon focusing on a short distant object (an imaging distance of the zoom lens R=1 m). FIGS. 22A, 22B and 22C are graphs showing aberrations of the zoom lens ZL5 according to Example 5 in an intermediate focal length state (f=29.99), in which FIG. 22A is graphs showing various aberrations upon focusing on infinity, FIG. 22B is graphs showing coma aberration when an image blur is corrected upon focusing on infinity (a correction angle θ=0.30°), and FIG. 22C is graphs showing various aberrations upon focusing on a short distant object (an imaging distance of the zoom lens R=1 m). FIGS. 23A, 23B and 23C are graphs showing aberrations of the zoom lens ZL5 according to Example 5 in a telephoto end state (f=53.29), in which FIG. 23A is graphs showing various aberrations upon focusing on infinity, FIG. 23B is graphs showing coma aberration when an image blur is corrected upon focusing on infinity (a correction angle θ=0.30°), and FIG. 23C is graphs showing various aberrations upon focusing on a short distant object (an imaging distance of the zoom lens R=1 m). In Example 5, as shown in FIG. 21B, FIG. 22B and FIG. 23B, optical performance upon vibration proofing is shown in graphs showing coma aberration, centering on an image height y=0.0, corresponding to image heights of vertically plus 10.0 and minus 10.0.

In each of the graphs showing aberration, FNO denotes an F-number, Y denotes an image height, d denotes aberration in a d-line, and g denotes aberration in a g-line. A column without description of d or g indicates aberration in the d-line. In the graphs showing spherical aberration, a value of the F-number corresponding to a maximum aperture is shown, and in the graphs showing astigmatism and distortion, a maximum value of the image height is shown. In the graphs showing astigmatism, a solid line indicates a sagittal image surface and a broken line indicates a meridional image surface. In the graphs showing coma aberration, a solid line indicates meridional coma, and a broken line indicates sagittal coma. The description of the graphs showing aberration above is deemed to be the same also in other Examples, and the description is omitted.

From each of the graphs showing aberration shown in FIGS. 21A-21C, FIGS. 22A-22C and FIGS. 23A-23C, the zoom lens ZL5 according to Example 5 is found to have high optical performance in which various aberrations from the wide-angle end state to the telephoto end state are successfully corrected. Moreover, the zoom lens LZ5 is found to have high imaging performance even when the image blur is corrected.

Example 6

Example 6 will be described using FIG. 24, FIGS. 25A-25C, FIGS. 26A-26C, FIGS. 27A-27C and Table 6. As shown in FIG. 24, a zoom lens ZL (ZL6) according to Example 6 is configured of, disposed in order from an object, a first lens group G1 having positive refractive power, a second lens group G2 having negative refractive power, a third lens group G3 having negative refractive power, and a fourth lens group G4 having positive refractive power.

The first lens group G1 is formed of, in order from the object, a cemented positive lens formed of a negative meniscus lens L11 having a concave surface facing an image and a positive meniscus lens L12 having a convex surface facing the object.

The second lens group G2 is formed of, disposed in order from the object, a negative meniscus lens L21 having a concave surface facing the image, a biconcave lens L22, and a biconvex lens L23.

The third lens group G3 is formed of a negative meniscus lens L31 having a concave surface facing the object.

The fourth lens group G4 is formed of, disposed in order from the object, a positive meniscus lens L41 having a convex surface facing the image, a cemented lens composed of a biconvex lens L42 and a biconcave lens L43, an aperture stop S determining an F-number, a cemented lens formed of a biconvex lens L44 and a negative meniscus lens L45 having a concave surface facing the object, and a positive meniscus lens L46 having a convex surface facing the object. A surface of the biconvex lens L44 to the object is an aspherical surface.

An image surface I is formed on an imaging element (not shown), and the imaging element is configured of a CCD, a CMOS, and the like.

In the zoom lens ZL6 according to Example 6, zooming from a wide-angle end state to a telephoto end state is made by varying an air distance between the first lens group G1 and the second lens group G2, an air distance between the second lens group G2 and the third lens group G3 and an air distance between the third lens group G3 and the fourth lens group G4. At this time, relative to the image surface I, the first lens group G1 to the fourth lens group G4 move to the object. The aperture stop S moves to the object integrally with the fourth lens group G4 upon zooming.

The zoom lens ZL6 according to Example 6 has a configuration in which focusing is made by moving the third lens group G3 along an optical axis direction. As shown by an arrow in FIG. 24, upon causing a change from a state of focusing on an infinite distant object to a state of focusing on a short distant object, the third lens group G3 moves from the image to the object.

Upon occurrence of an image blur, correction of the image blur (vibration proofing) on the image surface I is made by moving, as a vibration-proof lens, the positive meniscus lens L41 of the fourth lens group G4 so as to have a component in a direction perpendicular to the optical axis.

Table 6 below shows values of each of specifications in Example 6. Surface numbers 1 to 22 in Table 6 correspond to optical surfaces m1 to m22 shown in FIG. 24, respectively.

TABLE 6

[Lens Data]

| Surface Number | r | D | vd | nd |
|---|---|---|---|---|
| 1 | 36.2988 | 0.8000 | 56.06 | 1.846663 |
| 2 | 22.9300 | 6.9961 | 26.97 | 1.816000 |
| 3 | 114.2134 | D3(Variable) | | |
| 4 | 35.9155 | 0.8000 | 36.55 | 1.910822 |
| 5 | 10.5558 | 7.1298 | | |
| 6 | −82.0417 | 0.8000 | 25.39 | 1.743197 |
| 7 | 20.5024 | 0.2000 | | |
| 8 | 17.2134 | 3.1607 | 64.97 | 1.922860 |
| 9 | −4490.3075 | D9(Variable) | | |
| 10 | −29.7462 | 0.8000 | 38.96 | 1.806099 |
| 11 | −109.4759 | D11(Variable) | | |
| 12 | −377.5996 | 1.0745 | 27.04 | 1.804199 |
| 13 | −63.0373 | 0.2000 | | |
| 14 | 13.6966 | 2.6756 | 25.19 | 1.772500 |
| 15 | −24.3635 | 0.8000 | 56.06 | 1.846663 |
| 16 | 116.0533 | 1.0643 | | |
| 17 | ∞ | 7.5048 | (Stop S) | |
| *18 | 65996.0514 | 2.4131 | 24.74 | 1.658440 |
| 19 | −9.9097 | 0.8000 | 31.23 | 1.883000 |
| 20 | −696.0403 | 5.3367 | | |
| 21 | 28.8802 | 2.0264 | 22.66 | 1.680436 |
| 22 | 93.8568 | Bf(Variable) | | |

[Aspherical Surface Data]
The 18th Surface

κ = −0.6712E+09
A4 = −1.46479E−04

TABLE 6-continued

A6 = −5.44840E−07
A8 = −2.43857E−08
A10 = −1.48292E−10

[Various Data]

| f | 18.57 | 30.16 | 53.65 |
|---|---|---|---|
| Fno | 3.86 | 5.01 | 5.71 |
| ω | 38.88 | 25.76 | 14.66 |
| TL | 77.82 | 82.22 | 98.84 |
| Bf | 17.65 | 28.15 | 34.48 |
| Y | 14.25 | 14.25 | 14.25 |

[Variable Distance Data]

| | (Infinity) | | | (Imaging Distance 1 m) | | |
|---|---|---|---|---|---|---|
| | Wide-Angle End | Intermediate | Telephoto End | Wide-Angle End | Intermediate | Telephoto End |
| f&β | 18.56510 | 30.16136 | 53.64561 | −0.01959 | −0.03187 | −0.05511 |
| D0 | 0.0000 | 0.0000 | 0.0000 | 922.1816 | 917.7766 | 901.1552 |
| D3 | 0.20000 | 1.76658 | 15.19035 | 0.20000 | 1.76658 | 15.19035 |
| D9 | 4.00268 | 3.19861 | 4.39731 | 3.50042 | 2.64674 | 3.29926 |
| D11 | 11.38347 | 4.52189 | 0.19742 | 11.88573 | 5.07376 | 1.29547 |
| Bf | 17.65025 | 28.15431 | 34.47771 | 17.65025 | 28.15431 | 34.47771 |

[Lens Group Data]

| Group Number | Group First Surface | Group Focal Length |
|---|---|---|
| G1 | 1 | 64.373 |
| G2 | 4 | −21.741 |
| G3 | 10 | −50.897 |
| G4 | 12 | 19.226 |

[Conditional Expression Corresponding Value]

Conditional Expression (19): fw/f1 = 0.288
Conditional Expression (20): fw/f4 = 0.966
Conditional Expression (21): f1/(−f3) = 1.265
Conditional Expression (22): (−f2)/f4 = 1.131
Conditional Expression (23): ft/(−f2) = 2.467
Conditional Expression (24): ft/f1 = 0.833
Conditional Expression (25): ωw = 38.88
Conditional Expression (26): ft/fw = 2.890
Conditional Expression (27): f1/f4 = 3.348
Conditional Expression (28): ft/(−f2) = 2.467
Conditional Expression (29): ft/f1 = 0.833
Conditional Expression (30): f1/(−f3) = 1.265
Conditional Expression (31): (−f2)/f4 = 1.131
Conditional Expression (32): ωt = 14.66
Conditional Expression (33): ft/fw = 2.890

Table 6 shows that the zoom lens ZL6 according to Example 6 satisfies the conditional expressions (19) to (33).

Figure 25A:
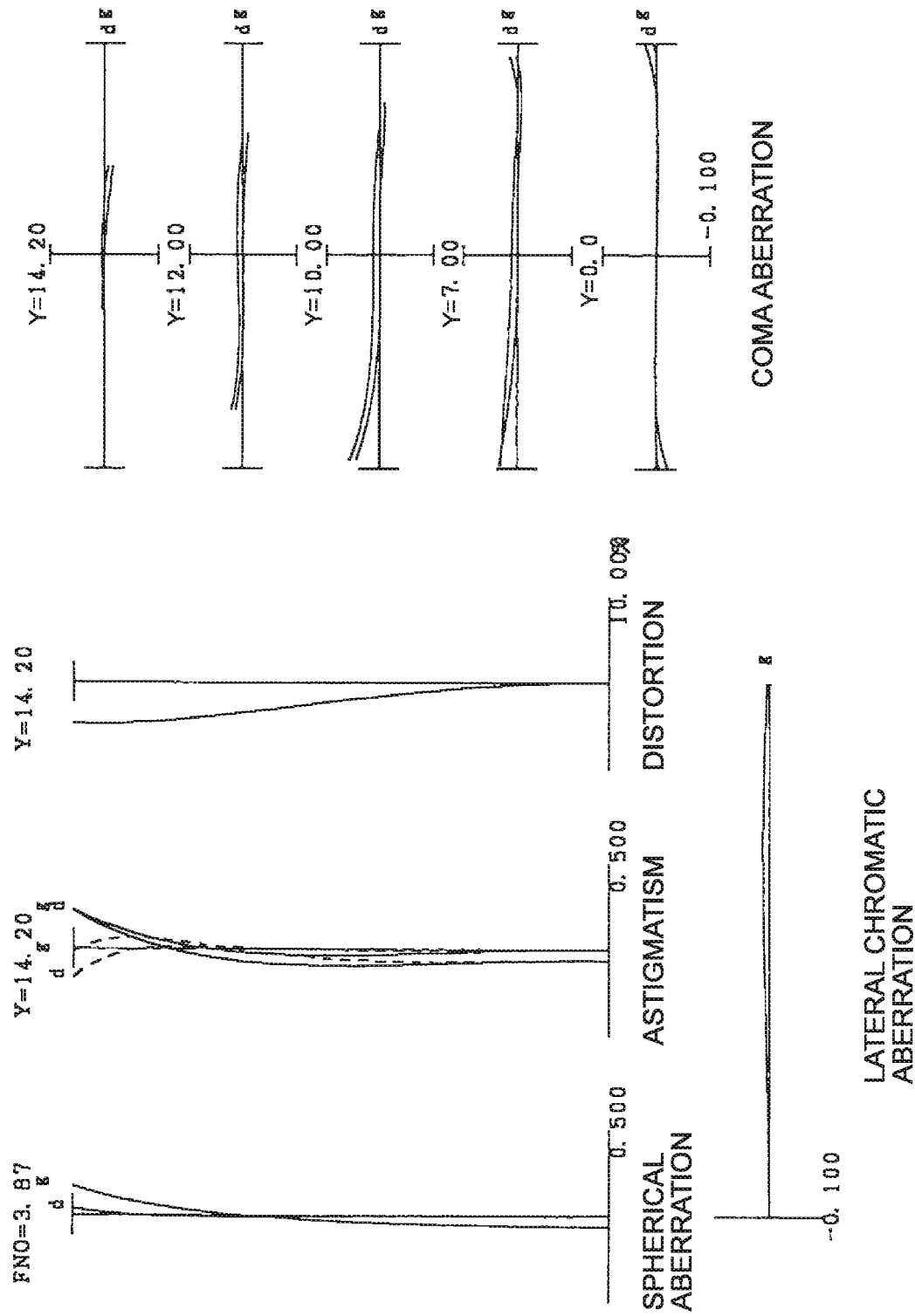
Figure 25B:
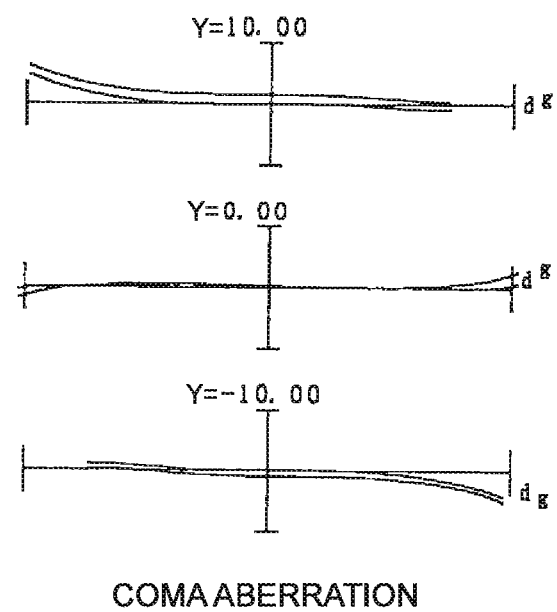
Figure 26B:
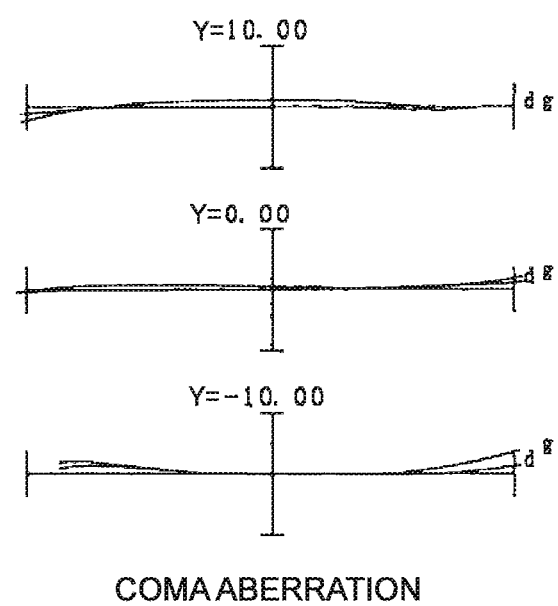
Figure 27B:
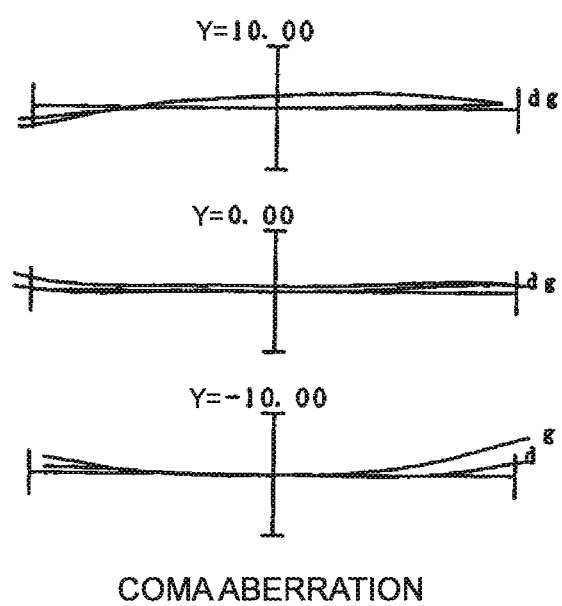

FIGS. 25A, 25B and 25C are graphs showing aberrations of the zoom lens ZL6 according to Example 6 in a wide-angle end state (f=18.57), in which FIG. 25A is graphs showing various aberrations upon focusing on infinity, FIG. 25B is graphs showing coma aberration when an image blur is corrected upon focusing on infinity (a correction angle θ=0.30°), and FIG. 25C is graphs showing various aberrations upon focusing on a short distant object (an imaging distance of the zoom lens R=1 m). FIGS. 26A, 26B and 26C are graphs showing aberrations of the zoom lens ZL6 according to Example 6 in an intermediate focal length state (f=30.16), in which FIG. 26A is graphs showing various aberrations upon focusing on infinity, FIG. 26B is graphs showing coma aberration when an image blur is corrected upon focusing on infinity (a correction angle θ=0.30°), and FIG. 26C is graphs showing various aberrations upon focusing on a short distant object (an imaging distance of the zoom lens R=1 m). FIGS. 27A, 27B and 27C are graphs showing aberrations of the zoom lens ZL6 according to Example 6 in a telephoto end state (f=53.65), in which FIG. 27A is graphs showing various aberrations upon focusing on infinity, FIG. 27B is graphs showing coma aberration when an image blur is corrected upon focusing on infinity (a correction angle θ=0.30°), and FIG. 27C is graphs showing various aberrations upon focusing on a short distant object (an imaging distance of the zoom lens R=1 m). In Example 6, as shown in FIG. 25B, FIG. 26B and FIG. 27B, optical performance upon vibration proofing is shown in graphs showing coma aberration, centering on an image height y=0.0, corresponding to image heights of vertically plus 10.0 and minus 10.0.

From each of the graphs showing aberration shown in FIGS. 25A-25C, FIGS. 26A-26C and FIGS. 27A-27C, the zoom lens ZL6 according to Example 6 is found to have high optical performance in which various aberrations from the wide-angle end state to the telephoto end state are successfully corrected. The zoom lens LZ6 is found to have high imaging performance even when the image blur is corrected.

Example 7

Example 7 will be described using FIG. 28, FIGS. 29A-29C, FIGS. 30A-30C, FIGS. 31A-31C and Table 7. As shown in FIG. 28, a zoom lens ZL (ZL7) according to Example 7 is configured of, disposed in order from an object, a first lens group G1 having positive refractive power, a second lens group G2 having negative refractive power, a third lens group G3 having negative refractive power, and a fourth lens group G4 having positive refractive power.

The first lens group G1 is formed of, disposed in order from the object, a cemented positive lens composed of a negative meniscus lens L11 having a concave surface facing an image and a positive meniscus lens L12 having a convex surface facing the object. A surface of the positive meniscus lens L12 to the image is an aspherical surface.

The second lens group G2 is formed of, disposed in order from the object, a negative meniscus lens L21 having a concave surface facing the image, a biconcave lens L22, and a biconvex lens L23.

The third lens group G3 is formed of a negative meniscus lens L31 having a concave surface facing the object.

The fourth lens group G4 is formed of, disposed in order from the object, a cemented lens composed of a biconvex lens L41 and a biconcave lens L42, an aperture stop S determining an F-number, a positive meniscus lens L43 having an convex surface facing the object, a cemented lens composed of a biconvex lens L44 and a biconcave lens L45, and a positive meniscus lens L46 having a convex surface facing the image. A surface of the biconvex lens L44 to the object is an aspherical surface.

An image surface I is formed on an imaging element (not shown), and the imaging element is configured of a CCD, a CMOS, and the like.

In the zoom lens ZL7 according to Example 7, zooming from a wide-angle end state to a telephoto end state is made by varying an air distance between the first lens group G1 and the second lens group G2, an air distance between the second lens group G2 and the third lens group G3 and an air distance between the third lens group G3 and the fourth lens group G4. At this time, relative to the image surface I, the first lens group G1, the third lens group G3 and the fourth lens group G4 move to the object. The second lens group moves along an optical axis so as to draw a convex track to the image. The aperture stop S moves to the object integrally with the fourth lens group G4 upon zooming.

The zoom lens ZL7 according to Example 7 has a configuration in which focusing is made by moving the third lens group G3 along an optical axis direction. As shown by an arrow in FIG. 28, upon causing a change from a state of focusing on an infinite distant object to a state of focusing on a short distant object, the third lens group G3 moves from the image to the object.

Upon occurrence of an image blur, correction of the image blur (vibration proofing) on the image surface I is made by moving, as a vibration-proof lens, the positive meniscus lens L43 of the fourth lens group G4 so as to have a component in a direction perpendicular to the optical axis.

Table 7 below shows values of each of specifications in Example 7. Surface numbers 1 to 22 in Table 7 correspond to optical surfaces m1 to m22 shown in FIG. 28, respectively.

TABLE 7

[Lens Data]

| Surface Number | r | D | νd | nd |
|---|---|---|---|---|
| 1 | 35.1980 | 0.8000 | 56.15 | 1.846660 |
| 2 | 24.4358 | 7.3655 | 22.71 | 1.729160 |
| *3 | 211.9356 | D3(Variable) | | |
| 4 | 82.8733 | 0.8000 | 31.23 | 1.883000 |
| 5 | 10.8309 | 6.4839 | | |
| 6 | −75.6483 | 0.8000 | 26.51 | 1.788000 |
| 7 | 27.8532 | 0.2000 | | |
| 8 | 19.3959 | 3.8899 | 56.15 | 1.846660 |
| 9 | −68.0805 | D9(Variable) | | |
| 10 | −27.8595 | 0.8000 | 38.96 | 1.806099 |
| 11 | −122.2398 | D11(Variable) | | |
| 12 | 12.8893 | 3.0252 | 23.57 | 1.741000 |
| 13 | −32.2900 | 0.8000 | 56.06 | 1.846663 |
| 14 | 422.4616 | 0.8347 | | |
| 15 | ∞ | 2.6582 | (Stop S) | |
| 16 | 24.2267 | 1.3307 | 27.81 | 1.795000 |
| 17 | 72.2003 | 1.3014 | | |
| *18 | 56.1806 | 2.7586 | 23.57 | 1.741000 |
| 19 | −8.2233 | 0.8000 | 31.23 | 1.883000 |
| 20 | 23.9411 | 1.71720 | | |
| 21 | −25.3892 | 1.3324 | 38.58 | 1.647690 |
| 22 | −17.5029 | Bf(Variable) | | |

[Aspherical Surface Data]

The 3rd Surface

κ = −39.7100
A4 = −9.89369E−09
A6 = −2.05283E−09
A8 = 1.18853E−11
A10 = −1.78987E−14

TABLE 7-continued

The 18th Surface

κ = 4.8409
A4 = −1.61115E−04
A6 = 1.91543E−07
A8 = −6.86409E−08
A10 = 1.23380E−09

[Various Data]

| | | | |
|---|---|---|---|
| f | 18.50 | 30.00 | 53.30 |
| Fno | 3.63 | 4.27 | 5.55 |
| ω | 38.65 | 24.10 | 14.09 |
| TL | 76.66 | 83.75 | 96.53 |
| Bf | 22.79 | 28.26 | 39.05 |
| Y | 14.25 | 14.25 | 14.25 |

[Variable Distance Data]

| | (Infinity) | | | (Imaging Distance 1 m) | | |
|---|---|---|---|---|---|---|
| | Wide-Angle End | Intermediate | Telephoto End | Wide-Angle End | Intermediate | Telephoto End |
| f&β | 18.50000 | 30.00231 | 53.29585 | −0.01949 | −0.03121 | −0.05478 |
| D0 | 0.0000 | 0.0000 | 0.0000 | 923.3407 | 916.2461 | 903.4746 |
| D3 | 0.80000 | 8.47829 | 14.74203 | 0.80000 | 8.47829 | 14.74203 |
| D9 | 4.20131 | 2.95126 | 4.23229 | 3.76248 | 2.28904 | 3.28726 |
| D11 | 11.16869 | 6.36877 | 0.80000 | 11.60752 | 7.03100 | 1.74503 |
| Bf | 22.79163 | 28.25792 | 39.05340 | 22.79163 | 28.25792 | 39.05340 |

[Lens Group Data]

| Group Number | Group First Surface | Group Focal Length |
|---|---|---|
| G1 | 1 | 61.828 |
| G2 | 4 | −24.305 |
| G3 | 10 | −44.933 |
| G4 | 12 | 22.921 |

[Conditional Expression Corresponding Value]

Conditional Expression (19): fw/f1 = 0.299
Conditional Expression (20): fw/f4 = 1.032
Conditional Expression (21): f1/(−f3) = 1.376
Conditional Expression (22): (−f2)/f4 = 1.356
Conditional Expression (23): ft/(−f2) = 2.193
Conditional Expression (24): ft/f1 = 0.862
Conditional Expression (25): ωw = 38.65
Conditional Expression (26): ft/fw = 2.881
Conditional Expression (27): f1/f4 = 3.450
Conditional Expression (28): ft/(−f2) = 2.193
Conditional Expression (29): ft/f1 = 0.862
Conditional Expression (30): f1/(−f3) = 1.376
Conditional Expression (31): (−f2)/f4 = 1.356
Conditional Expression (32): ωt = 14.09
Conditional Expression (33): ft/fw = 2.881

Table 7 shows that the zoom lens ZL7 according to Example 7 satisfies the conditional expressions (19) to (33).

Figure 29B:
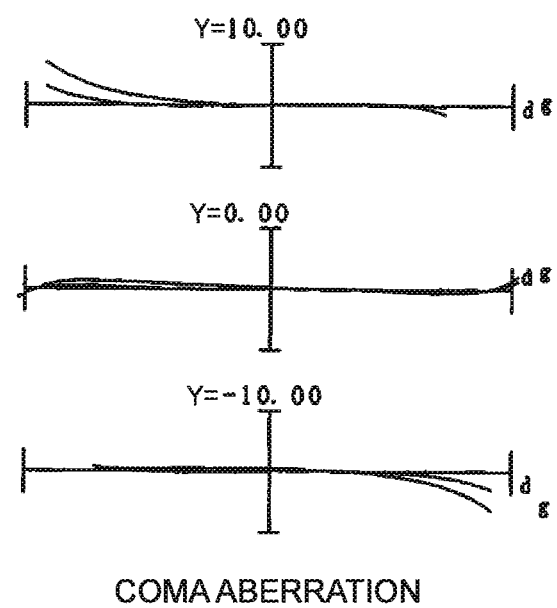
Figure 30A:
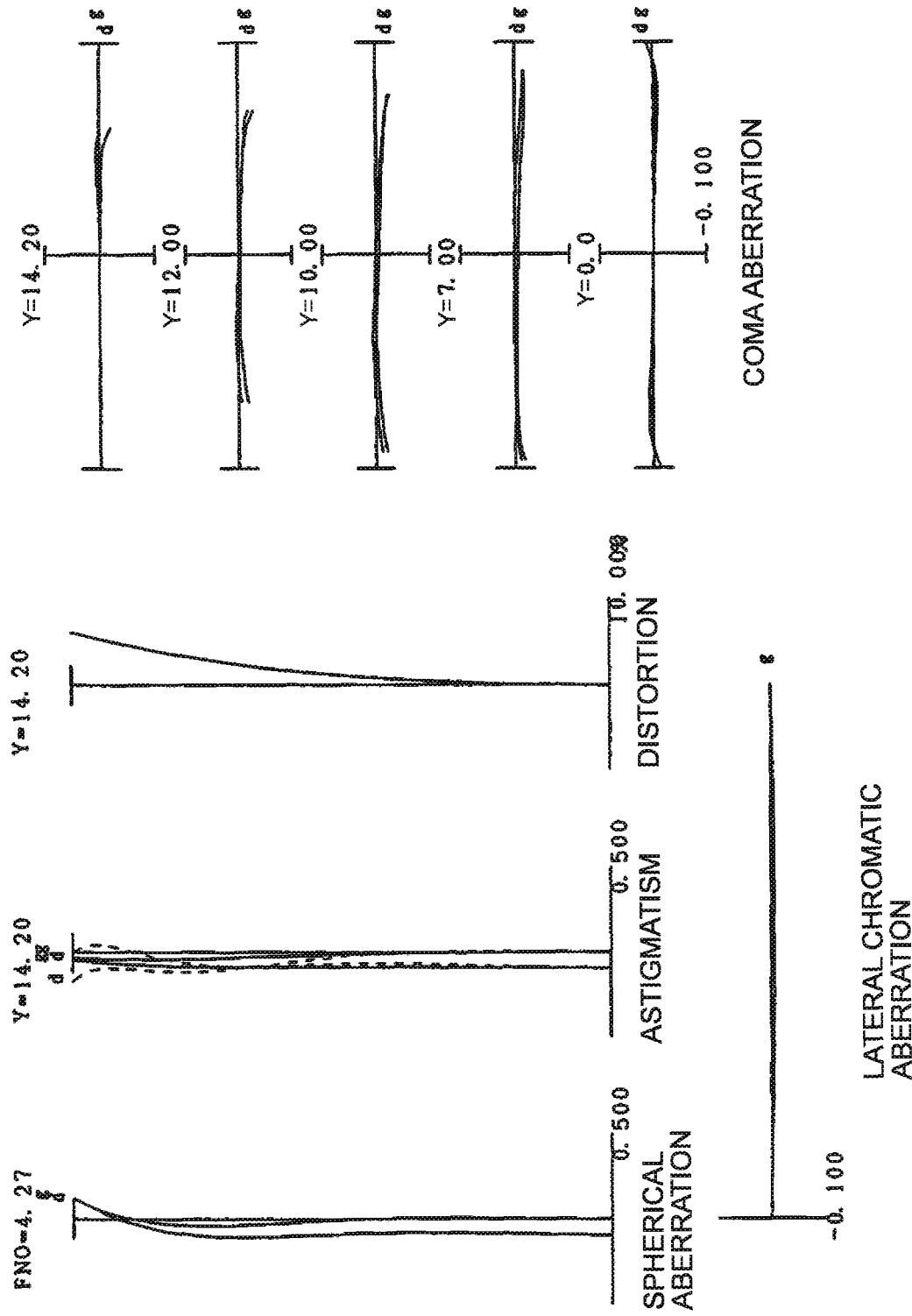
Figure 30B:
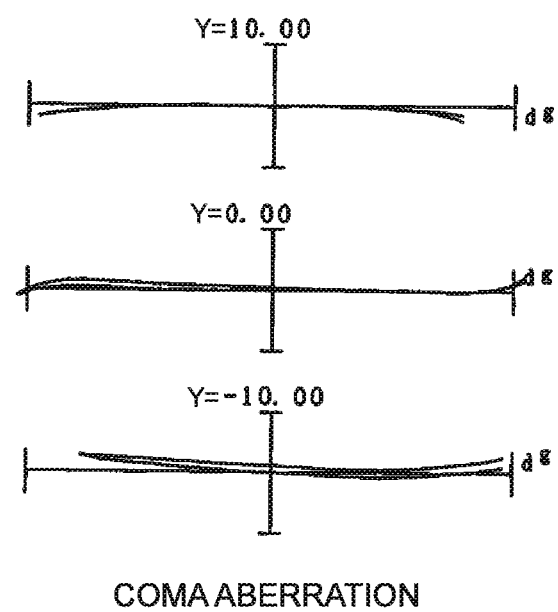
Figure 30C:
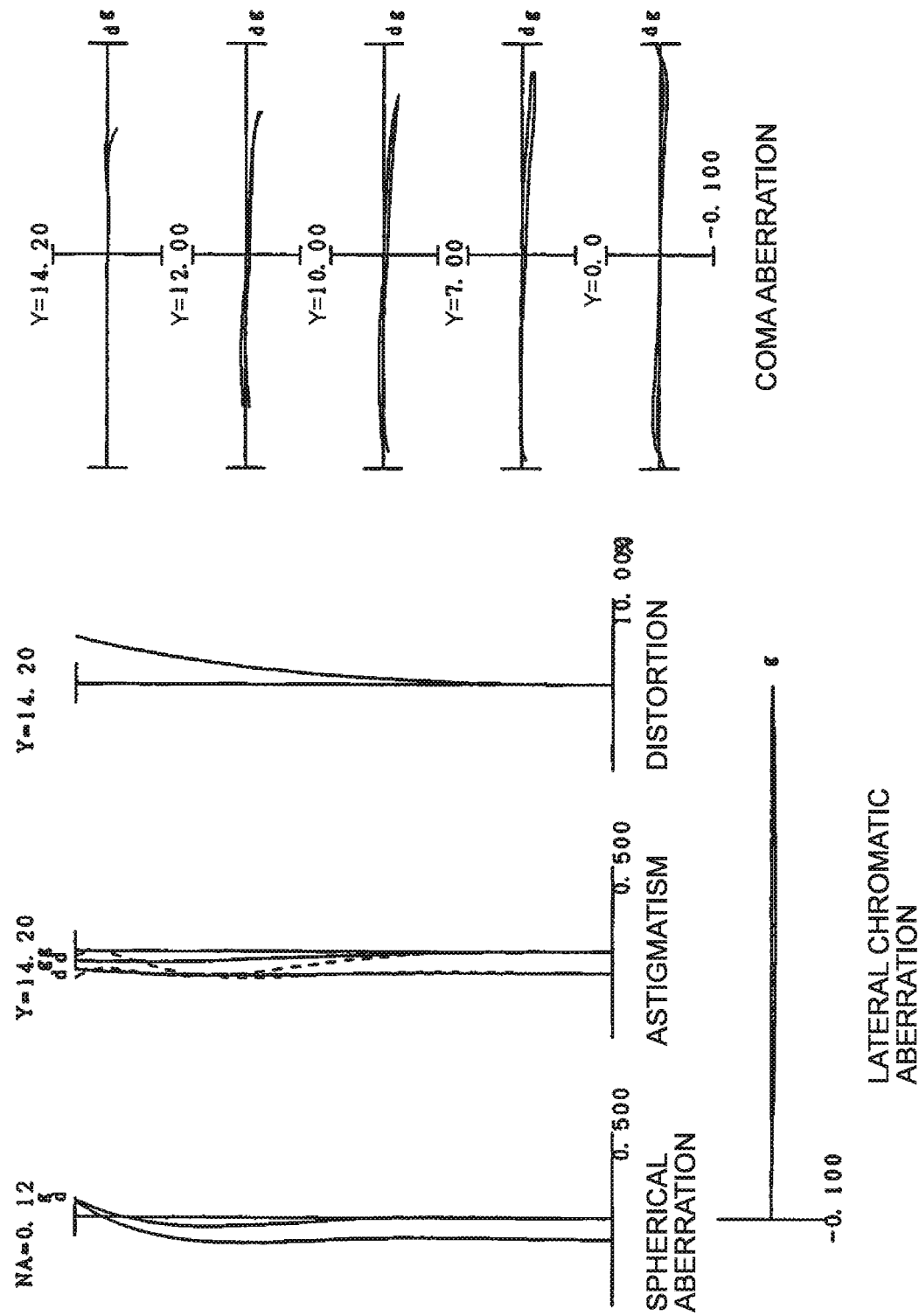
Figure 31B:
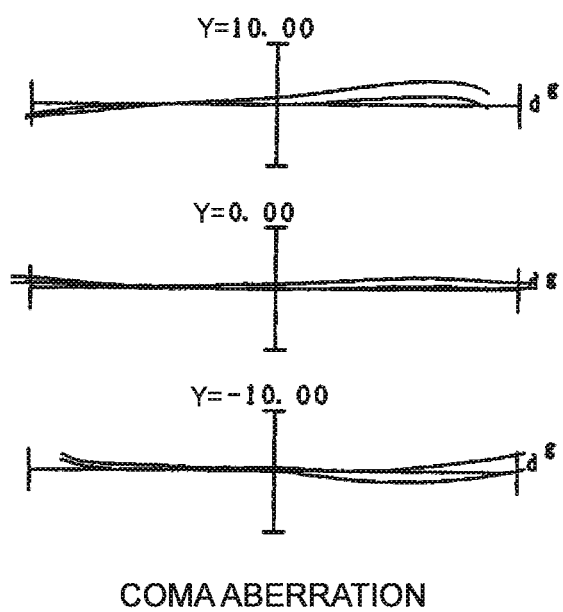

FIGS. 29A, 29B and 29C are graphs showing aberrations of the zoom lens ZL7 according to Example 7 in a wide-angle end state (f=18.50), in which FIG. 29A is graphs showing various aberrations upon focusing on infinity, FIG. 29B is graphs showing coma aberration when an image blur is corrected upon focusing on infinity (a correction angle θ=0.30°), and FIG. 29C is graphs showing various aberrations upon focusing on a short distant object (an imaging distance of the zoom lens R=1 m). FIGS. 30A, 30B and 30C are graphs showing aberrations of the zoom lens ZL7 according to Example 7 in an intermediate focal length state (f=30.00), in which FIG. 30A is graphs showing various aberrations upon focusing on infinity, FIG. 30B is graphs showing coma aberration when an image blur is corrected upon focusing on infinity (a correction angle θ=0.30°), and FIG. 30C is graphs showing various aberrations upon focusing on a short distant object (an imaging distance of the zoom lens R=1 m). FIGS. 31A, 31B and 31C are graphs showing aberrations of the zoom lens ZL7 according to Example 7 in a telephoto end state (f=53.30), in which FIG. 31A is graphs showing various aberrations upon focusing on infinity, FIG. 31B is graphs showing coma aberration when an image blur is corrected upon focusing on infinity (a correction angle θ=0.30°), and FIG. 31C is graphs showing various aberrations upon focusing on a short distant object (an imaging distance of the zoom lens R=1 m). In Example 7, as shown in FIG. 29B, FIG. 30B and FIG. 31B, optical performance upon vibration proofing is shown in graphs showing coma aberration, centering on an image height y=0.0, corresponding to image heights of vertically plus 10.0 and minus 10.0.

From each of the graphs showing aberration shown in FIGS. 29A-29C, FIGS. 30A-30C and FIGS. 31A-31C, the zoom lens ZL7 according to Example 7 is found to have high optical performance in which various aberrations from the wide-angle end state to the telephoto end state are successfully corrected. Moreover, the zoom lens LZ7 is found to have high imaging performance, even if the image blur is corrected.

According to each Example described above, the zoom lens having successful optical performance can be realized.

In addition, each Example described above shows one specific example of the zoom lens according to each of the third and fourth embodiments, and the zoom lens according to each of the third and fourth embodiments is not limited thereto. In the third and fourth embodiments, the following content can be appropriately adopted within the range in which the optical performance is not adversely affected.

In Examples using numerical values according to the third and fourth embodiments, a four-group configuration was shown as the zoom lens. However, the present invention can also be applied to other configurations such as a five-group configuration. For example, a configuration in which a lens or lens group is added thereto on a side closest to the object, or a configuration is allowed in which a lens or lens group is added thereto on a side closest to the image. Moreover, the lens group represents a part which is separated by the air distances which change upon zooming or focusing and have at least one lens.

In the third and fourth embodiments, the zoom lens may be formed into a focusing lens group in which focusing on an infinite distant object to a short distant object is made by moving a single lens group or a plurality of lens groups, or a partial lens group in the optical axis direction. The focusing lens group can be applied to autofocusing, and is also suitable for a motor drive (using an ultrasonic motor, or the like) for autofocusing. Particularly, at least a part of the third lens group G3 is preferably applied as the focusing lens group.

In the third and fourth embodiments, the zoom lens may be formed into a vibration-proof lens group in which the image blur caused by camera shake is corrected by vibrating the lens group or the partial lens group in the direction perpendicular to the optical axis, or rotationally moving (swinging) the lens group or the partial lens group in an in-plane direction including the optical axis. Particularly, at least a part of the fourth lens group G4 is preferably applied as the vibration-proof lens group.

In the third and fourth embodiments, a lens surface may be formed of a spherical surface or a flat surface, or formed of an aspherical surface. When the lens has the spherical surface or the flat surface, lens processing and assembly and adjustment are facilitated, and deterioration of optical performance by an error of the processing and assembly and adjustment can be prevented. Thus, such a case is preferable. When the lens has the aspherical surface, the aspherical surface may be any aspherical surface of an aspherical surface by grinding, a glass mold aspherical surface in which glass is formed into an aspherical surface shape by using a mold, and a composite type aspherical surface in which a resin is formed into the aspherical surface shape on a surface of glass. Moreover, the lens surface may be formed into a diffraction surface, or the lens may be formed into a gradient index lens (GRIN lens) or a plastic lens.

In the third and fourth embodiments, the aperture stop S is preferably arranged in a neighborhood of the fourth lens group G4 or within the fourth lens group G4. However, a lens frame may be used as substitution for such a role without providing a member as the aperture stop.

In the third and fourth embodiments, an antireflection film having high transmittance in a wide wavelength range may be applied to each lens surface in order to reduce a flare and a ghost to achieve high optical performance with high contrast.

The zoom lens ZL according to the third and fourth embodiments has a zoom ratio of about 2 to 7.

EXPLANATION OF NUMERALS AND CHARACTERS

ZL (ZL1 to ZL7) Zoom lens
G1 First lens group
G2 Second lens group
G3 Third lens group
G4 Fourth lens group
S Aperture stop
I Image surface
1 Camera (imaging device)
2 Imaging lens (zoom lens)

The invention claimed is:

1. A zoom lens, comprising:
in order from an object, a first lens group having positive refractive power; a second lens group having negative refractive power; a third lens group having negative refractive power; and a fourth lens group having positive refractive power, wherein
upon zooming, an air distance between the first lens group and the second lens group is varied, and
the following conditional expressions are satisfied:

$0.60 < f4/fw < 1.15$ $4.00 < f1/f4 \leq 8.902$ $2.00 < ft/fw < 7.00$ where f4 denotes a focal length of the fourth lens group,
fw denotes a focal length of the zoom lens in a wide-angle end state upon focusing on infinity,
f1 denotes a focal length of the first lens group, and
ft denotes a focal length of the zoom lens in a telephoto end state upon focusing on infinity.

2. The zoom lens according to claim 1, wherein, upon zooming, an air distance between the second lens group and the third lens group, and an air distance between the third lens group and the fourth lens group are varied.

3. The zoom lens according to claim 1, wherein, upon focusing, the third lens group is moved along an optical axis, and
upon changing from a state of focusing at a longer distance to a state of focusing a shorter distance, the third lens group moves toward the object.

4. The zoom lens according to claim 1, wherein the following conditional expression is satisfied:

$0.80 < (-f3)/fw < 6.00$ where f3 denotes a focal length of the third lens group.

5. The zoom lens according to claim 1, wherein the following conditional expression is satisfied:

$0.10 < f2/f3 < 20.00$ where f2 denotes a focal length of the second lens group, and
f3 denotes a focal length of the third lens group.

6. The zoom lens according to claim 1, wherein the third lens group consists of a negative lens.

7. The zoom lens according to claim 1, wherein the fourth lens group comprises a positive lens disposed closest to an image, and a cemented negative lens disposed next to the positive lens, the cemented negative lens having a convex cemented surface facing the image and formed by cementing a positive lens and a negative lens.

8. The zoom lens according to claim 1, wherein the following conditional expression is satisfied:

$$0.10<(-r)/fw<2.00$$

where r denotes a radius of curvature of a cemented surface of a cemented negative lens in the fourth lens group.

9. The zoom lens according to claim 1, wherein the following conditional expression is satisfied:

$$30.00°<\omega w<80.00°$$

where ωw denotes a half angle of view in the wide-angle end state.

10. The zoom lens according to claim 1, wherein a part of the fourth lens group is movable, as a vibration-proofing lens group for correcting an image blur, so as to have a movement component in a direction perpendicular to an optical axis.

11. The zoom lens according to claim 10, wherein the following conditional expression is satisfied:

$$0.10<VRT<2.00$$

where VRT denotes a vibration-proofing coefficient of the vibration-proofing lens group in a telephoto end state, and the vibration-proofing coefficient VRT is defined by the following conditional expression:

$$VRT=|(1-Bvr)\times Br|$$

where Bvr denotes lateral magnification of the vibration-proofing lens group, and Br denotes lateral magnification of an optical system constituted by all lenses disposed to an image side of the vibration-proofing lens group.

12. The zoom lens according to claim 1, wherein the following conditional expression is satisfied:

$$0.10<f1/(-f3)<2.00$$

where f1 denotes a focal length of the first lens group, and f3 denotes a focal length of the third lens group.

13. The zoom lens according to claim 1, wherein the following conditional expression is satisfied:

$$0.80<(-f2)/f4<5.00$$

where f2 denotes a focal length of the second lens group.

14. The zoom lens according to claim 1, wherein the following conditional expression is satisfied:

$$1.80<ft/(-f2)<3.50$$

where ft denotes a focal length of the zoom lens in a telephoto end state, and f2 denotes a focal length of the second lens group.

15. An imaging device, comprising the zoom lens according to claim 1.

16. A zoom lens, comprising:

in order from an object, a first lens group having positive refractive power; a second lens group having negative refractive power; a third lens group having negative refractive power; and a fourth lens group having positive refractive power, wherein upon zooming, an air distance between the first lens group and the second lens group is varied, and the following conditional expressions are satisfied:

$$0.65<f4/fw<1.10$$

$$3.00<f1/f4<11.00$$

$$2.00<ft/fw<7.00$$

$$0.80<(-f2)/f4<5.00$$

where f4 denotes a focal length of the fourth lens group, fw denotes a focal length of the zoom lens in a wide-angle end state upon focusing on infinity, f1 denotes a focal length of the first lens group, ft denotes a focal length of the zoom lens in a telephoto end state upon focusing on infinity, and f2 denotes a focal length of the second lens group.

17. The zoom lens according to claim 16, wherein the following conditional expression is satisfied:

$$0.80<(-f3)/fw<6.00$$

where f3 denotes a focal length of the third lens group.

18. The zoom lens according to claim 16, wherein the following conditional expression is satisfied:

$$0.10<f2/f3<20.00$$

where f2 denotes a focal length of the second lens group, and f3 denotes a focal length of the third lens group.

19. The zoom lens according to claim 16, wherein the following conditional expression is satisfied:

$$30.00°<\omega w<80.00°$$

where ωw denotes a half angle of view in the wide-angle end state.

20. The zoom lens according to claim 16, wherein a part of the fourth lens group is movable, as a vibration-proofing lens group for correcting an image blur, so as to have a movement component in a direction perpendicular to an optical axis, and the following conditional expression is satisfied:

$$0.10<VRT<2.00$$

where VRT denotes a vibration-proofing coefficient of the vibration-proofing lens group in a telephoto end state, and the vibration-proofing coefficient VRT is defined by the following conditional expression:

$$VRT=|(1-Bvr)\times Br|$$

where Bvr denotes lateral magnification of the vibration-proofing lens group, and Br denotes lateral magnification of an optical system constituted by all lenses disposed to an image side of the vibration-proofing lens group.

21. An imaging device, comprising the zoom lens according to claim 16.

22. A method for manufacturing a zoom lens, comprising:

disposing, in order from an object, a first lens group having positive refractive power, a second lens group having negative refractive power, a third lens group having negative refractive power, and a fourth lens group having positive refractive power, wherein the lens groups are arranged within a lens barrel in such a manner that an air distance between the first lens group and the second lens group is varied upon zooming, and further comprising at least one of the following features (A) or (B):

(A) satisfying the following conditional expressions:

$0.60 < f4/fw < 1.15$ $4.00 < f1/f4 \le 8.902$ $2.00 < ft/fw < 7.00$ where f4 denotes a focal length of the fourth lens group, fw denotes a focal length of the zoom lens in a wide-angle end state upon focusing on infinity, f1 denotes a focal length of the first lens group, and ft denotes a focal length of the zoom lens in a telephoto end state upon focusing on infinity, (b) satisfying the following conditional expressions:

$0.65 < f4/fw < 1.10$ $3.00 < f1/f4 < 11.00$ $2.00 < ft/fw < 7.00$ $0.80 < (-f2)/f4 < 5.00$ where f4 denotes the focal length of the fourth lens group, fw denotes the focal length of the zoom lens in the wide-angle end state upon focusing on infinity, f1 denotes the focal length of the first lens group, ft denotes the focal length of the zoom lens in the telephoto end state upon focusing on infinity, and f2 denotes a focal length of the second lens group.

* * * * *